United States Patent
Hoshino et al.

(10) Patent No.: US 12,130,457 B2
(45) Date of Patent: Oct. 29, 2024

(54) OPTICAL LAMINATE, VIEWING ANGLE CONTROL SYSTEM, IMAGE DISPLAY DEVICE

(71) Applicant: FUJIFILM Corporation, Tokyo (JP)

(72) Inventors: Wataru Hoshino, Kanagawa (JP); Naoyoshi Yamada, Kanagawa (JP); Shinichi Yoshinari, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/846,897

(22) Filed: Jun. 22, 2022

(65) Prior Publication Data
US 2023/0035147 A1    Feb. 2, 2023

(30) Foreign Application Priority Data

Jun. 25, 2021   (JP) ................. 2021-105723
Mar. 22, 2022   (JP) ................. 2022-045355

(51) Int. Cl.
*G02B 5/30*    (2006.01)
*C09K 19/38*    (2006.01)
*C09K 19/56*    (2006.01)
*C09K 19/60*    (2006.01)
*G02F 1/13*    (2006.01)

(52) U.S. Cl.
CPC ........ *G02B 5/3016* (2013.01); *C09K 19/3852* (2013.01); *C09K 19/56* (2013.01); *C09K 19/601* (2013.01); *G02F 1/1323* (2013.01); *G02F 2202/043* (2013.01)

(58) Field of Classification Search
CPC .... G02F 1/1323; G02B 5/3016; G92F 1/1323
See application file for complete search history.

(56) References Cited

U.S. PATENT DOCUMENTS

| | | | |
|---|---|---|---|
| 8,982,300 B2 | 3/2015 | Umemoto | |
| 2005/0208231 A1* | 9/2005 | Nimura | G02F 1/134363 428/1.3 |
| 2009/0153783 A1* | 6/2009 | Umemoto | G02B 27/28 359/487.01 |
| 2018/0067232 A1* | 3/2018 | Tan | G02B 5/3033 |
| 2019/0322937 A1* | 10/2019 | Matsuyama | C09K 19/60 |

FOREIGN PATENT DOCUMENTS

| | | | |
|---|---|---|---|
| JP | 2009-145776 A | 7/2009 | |
| WO | WO-2017199656 A1 * | 11/2017 | ............... G02B 5/23 |
| WO | WO-2020066833 A1 * | 4/2020 | ........... B32B 27/308 |

\* cited by examiner

*Primary Examiner* — Jessica M Merlin
(74) *Attorney, Agent, or Firm* — Edwards Neils LLC; Jean C. Edwards, Esq.

(57) ABSTRACT

Provided is an optical laminate used for a viewing angle control system, and an image display device, including a light absorption anisotropic layer formed of a liquid crystal composition containing a liquid crystal compound and a dichroic substance, a first adjacent layer in contact with one surface of the light absorption anisotropic layer, and a second adjacent layer in contact with a surface of the light absorption anisotropic layer opposite to the one surface, in which a content of the dichroic substance is 7.0% by mass or greater, an angle θs between a transmittance central axis of the light absorption anisotropic layer and a surface of the light absorption anisotropic layer in a normal direction is in a range of 5° to 60°, and both refractive indices n1 and n2 of the first and second adjacent layers, respectively, are in a range of 1.46 to 1.72.

16 Claims, 1 Drawing Sheet

OPTICAL LAMINATE, VIEWING ANGLE CONTROL SYSTEM, IMAGE DISPLAY DEVICE

CROSS-REFERENCE TO RELATED APPLICATIONS

The present application claims priority under 35 U.S.C. § 119 to Japanese Patent Application No. 2021-105723, filed on Jun. 25, 2021 and Japanese Patent Application No. 2022-045355, filed on Mar. 22, 2022. The above applications are hereby expressly incorporated by reference, in their entirety, into the present application.

BACKGROUND OF THE INVENTION

1. Field of the Invention

The present invention relates to an optical laminate, a viewing angle control system, and an image display device.

2. Description of the Related Art

In order to prevent peeping into an image display device and control the viewing angle, a technique of using a light absorption anisotropic layer having an absorption axis in the thickness direction is known. For example, JP2009-145776A discloses a viewing angle control system including a polarizer (light absorption anisotropic layer) which contains a dichroic substance and in which the angle between an absorption axis and a normal line of a film surface is in a range of 0° to 45°.

SUMMARY OF THE INVENTION

Meanwhile, in a case where the viewing angle control system is used for in-vehicle applications, the screen is unlikely to be seen in a direction from a driver or a person in a passenger seat, that is, in a direction in which the screen is desired to be visually recognized accurately and quickly to obtain information, but the screen may be slightly visible in a direction from a window, that is, a direction in which reflected glare is desired to be eliminated.

In this manner, in applications for transmitting light in a specific direction, the angle control is important, and the light absorption anisotropic layer is required to have sufficient absorption in order to block the transmission of light at angles other than the specific direction.

With reference to the viewing angle control system described in JP2009-145776A, the present inventors clarified that in a case where a light absorption anisotropic layer with a high concentration of a dichroic substance is used to allow the light absorption anisotropic layer to have sufficient absorption, the contrast of an image as observed in a direction in which the image is desired to be seen (desired direction) is satisfactory, but there is room for improvement in the clearness of the image as observed in the desired direction.

Therefore, an object of the present invention is to provide an optical laminate used for a viewing angle control system, a viewing angle control system, and an image display device, in which an image with excellent contrast and clearness can be visually recognized in a case of observation in a desired direction.

The present inventors found that the above-described problems can be solved by employing the following configurations.

[1] An optical laminate comprising: a light absorption anisotropic layer formed of a liquid crystal composition containing a liquid crystal compound and a dichroic substance; a first adjacent layer disposed in contact with one surface of the light absorption anisotropic layer; and a second adjacent layer disposed in contact with a surface of the light absorption anisotropic layer opposite to the one surface, in which a content of the dichroic substance is 7.0% by mass or greater with respect to a total mass of a solid content of the liquid crystal composition, an angle $\theta s$ between a transmittance central axis of the light absorption anisotropic layer and a surface of the light absorption anisotropic layer in a normal direction is in a range of 5° to 60°, and both a refractive index n1 of the first adjacent layer and a refractive index n2 of the second adjacent layer are in a range of 1.46 to 1.72.

[2] The optical laminate according to [1], in which a relationship between the angle $\theta s$ and the refractive index n1 and the refractive index n2 satisfies Expression (N1) and Expression (N2), $$0.037 \leq n1/\theta s \leq 0.083 \quad (N1)$$

$$0.037 \leq n2/\theta s \leq 0.083 \quad (N2).$$

[3] The optical laminate according to [1] or [2], in which the content of the dichroic substance is 10.0% by mass or greater with respect to the total mass of the solid content of the liquid crystal composition.

[4] The optical laminate according to any one of [1] to [3], in which at least one of the refractive index n1 or the refractive index n2 is in a range of 1.50 to 1.65.

[5] The optical laminate according to any one of [1] to [4], in which both the refractive index n1 and the refractive index n2 are in a range of 1.50 to 1.65.

[6] The optical laminate according to any one of [1] to [5], in which an absolute value of a difference between the refractive index n1 and the refractive index n2 is 0.21 or less.

[7] The optical laminate according to any one of [1] to [6], in which at least one of the first adjacent layer or the second adjacent layer contains polyvinyl alcohol, polyimide, or a derivative thereof.

[8] A viewing angle control system comprising: a polarizer having an absorption axis in an in-plane direction; and the optical laminate according to any one of [1] to [7].

[9] An image display device comprising: a display element; and the viewing angle control system according to [8], in which the viewing angle control system is disposed on at least one main surface of the display element.

[10] The image display device according to [9], in which the optical laminate of the viewing angle control system is disposed on a viewing side with respect to the polarizer of the viewing angle control system.

According to the present invention, it is possible to provide an optical laminate used for a viewing angle control system, a viewing angle control system, and an image display device, in which an image with excellent contrast and clearness can be visually recognized in a case of observation in a desired direction.

DESCRIPTION OF THE PREFERRED EMBODIMENTS

Figure 1:
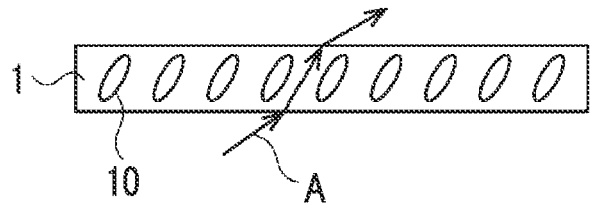
FIG. 1 is a schematic view describing a refraction state of light in a case where polarized light is incident on a light absorption anisotropic layer containing a dichroic substance that is tilted and aligned.

Hereinafter, the present invention will be described in detail.

The description of configuration requirements described below may be made based on typical embodiments of the present invention, but the present invention is not limited to such embodiments.

Further, in the present specification, the numerical ranges shown using "to" indicate ranges including the numerical values described before and after "to" as the lower limits and the upper limits. In a numerical range described in a stepwise manner in the present disclosure, an upper limit or a lower limit described in a certain numerical range may be replaced with an upper limit or a lower limit in another numerical range described in a stepwise manner. Further, in a numerical range described in the present disclosure, an upper limit or a lower limit described in a certain numerical range may be replaced with a value described in an example.

Further, in the present specification, parallel and orthogonal do not indicate parallel and orthogonal in a strict sense, but respectively indicate a range of parallel ±5° and a range of orthogonal ±5°.

Further, in the present specification, the concepts of the liquid crystal composition and the liquid crystal compound also include those that no longer exhibit liquid crystallinity due to curing or the like.

Further, in the present specification, materials corresponding to respective components may be used alone or in combination of two or more kinds thereof. Here, in a case where two or more kinds of materials corresponding to respective components are used in combination, the content of the components indicates the total content of the combined materials unless otherwise specified.

Further, in the present specification, "(meth)acrylate" is a notation representing "acrylate" or "methacrylate", "(meth) acryl" is a notation representing "acryl" or "methacryl", and "(meth)acryloyl" is a notation representing "acryloyl" or "methacryloyl".

In the present invention, a combination of two or more preferred embodiments is a more preferred embodiment.

Substituent W

A substituent W used in the present specification represents any of the following groups.

Examples of the substituent W include a halogen atom, an alkyl group having 1 to 20 carbon atoms, a halogenated alkyl group having 1 to 20 carbon atoms, a cycloalkyl group having 1 to 20 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an alkylaminocarbonyl group having 1 to 10 carbon atoms, an alkylaminocarbonyl group, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), and other known substituents.

The details of the substituent are described in paragraph [0023] of JP2007-234651A.

Further, the substituent W may be a group represented by Formula (W1).

*-LW-SPW-Q  (W1)

In Formula (W1), LW represents a single bond or a divalent linking group, SPW represents a divalent spacer group, Q represents Q1 or Q2 in Formula (LC) described below, and * represents a bonding position.

Examples of the divalent linking group represented by LW include —O—, —(CH$_2$)$_g$—, —(CF$_2$)$_g$—, —Si (CH$_3$)$_2$—, —(Si(CH$_3$)$_2$O)$_r$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O) O—, —O—C(O)—C(Z)=C(Z')—, —C(Z)=N—, —N=C (Z)—, —C(Z)=C(Z')—C(O)N(Z")—, —N(Z")—C(O)—C (Z)=C(Z')—, —C(Z)=C(Z')—C(O)—S—, —S—C(O)— C(Z)=C(Z')—, —C(Z)=N—N=C(Z')— (Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O) O—, —O(O)S(O)O—, —SC(O)—, and —C(O)S—. LW may represent a group in which two or more of these groups are combined (hereinafter, also referred to as "L-C").

Examples of the divalent spacer group represented by SPW include a linear, branched, or cyclic alkylene group having 1 to 50 carbon atoms, and a heterocyclic group having 1 to 20 carbon atoms.

The carbon atoms of the alkylene group and the heterocyclic group may be substituted with —O—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N (Z)—, —C(Z)=C(Z')—C(O)O—, —O—C(O)—C(Z)=C (Z')—, —C(Z)=N—, —N=C(Z)—, —C(Z)=C(Z')—C (O)N(Z")—, —N(Z")—C(O)—C(Z)=C(Z')—, —C(Z)=C (Z')—C(O)—S—, —S—C(O)—C(Z)=C(Z')—, —C(Z) =N—N=C(Z')— (Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —C(S)—, —S(O)—, —SO$_2$—, —(O)S(O)O—, —O(O)S(O)O—, —SC(O)—, —C(O)S—, or a group obtained by combining two or more of these groups (hereinafter, also referred to as "SP—C").

Further, the hydrogen atom of the alkylene group and the hydrogen atom of the heterocyclic group may be substituted with a halogen atom, a cyano group, —Z$^H$, —OH—, —OZ$^H$, —COOH, —C(O)Z$^H$— C(O)OZ$^H$, —OC(O)Z$^H$, —OC(O)OZ$^H$, —NZ$^H$Z$^{H'}$, —NZ$^H$C(O)Z$^{H'}$, —NZ$^H$C(O)OZ$^{H'}$, —C(O)NZ$^H$Z$^{H'}$, —OC(O)NZHZ$^{H'}$, —NZHC(O)NZ$^H$OZ$^{H''}$, —SH, —SZ$^H$, —C(S)Z$^H$, —C(O)SZ$^H$, or —SC(O)Z$^H$ (hereinafter, also referred to as "SP—H"). Here, Z$^H$ and Z$^{H'}$ represent an alkyl group having 1 to 10 carbon atoms, a halogenated alkyl group, or -L-CL (L represents a single bond or a linking group, specific examples of the divalent linking group are the same as those of LW and SPW described above, CL represents a crosslinkable group, and examples thereof include a group represented by Q1 or Q2 in Formula (LC), and a crosslinkable group represented by Formulae (P-1) to (P-30) is preferable).

Optical Laminate

An optical laminate according to the embodiment of the present invention is an optical laminate including a light absorption anisotropic layer formed of a liquid crystal composition containing a liquid crystal compound and a dichroic substance, a first adjacent layer disposed in contact with one surface of the light absorption anisotropic layer, and a second adjacent layer disposed in contact with a surface of the light absorption anisotropic layer opposite to the one surface.

Further, the content of the dichroic substance in the optical laminate according to the embodiment of the present invention is 7.0% by mass or greater with respect to the total mass of the solid content of the liquid crystal composition.

Further, in the optical laminate according to the embodiment of the present invention, the angle θs between a transmittance central axis of the light absorption anisotropic layer and a surface of the light absorption anisotropic layer in the normal direction (hereinafter, also referred to as "transmittance central axis angle θs") is in a range of 5° to 60°.

Further, in the optical laminate according to the embodiment of the present invention, both a refractive index n1 of the first adjacent layer and a refractive index n2 of the second adjacent layer are in a range of 1.46 to 1.72.

Here, the transmittance central axis is the direction in which the highest transmittance is exhibited in a case where the transmittance is measured by changing the inclination angle (polar angle) and the inclination direction (azimuthal angle) with respect to the normal direction of the surface of the light absorption anisotropic layer.

Specifically, the Mueller matrix at a wavelength of 550 nm is measured using AxoScan OPMF-1 (manufactured by Opto Science Inc.). More specifically, in the measurement, the azimuthal angle at which the transmittance central axis is inclined is first searched for, the Mueller matrix at a wavelength of 550 nm is measured while the polar angle which is the angle with respect to the surface of the light absorption anisotropic layer in the normal direction is changed from −70° to 70° for each angle in the surface (the plane that has the transmittance central axis and is orthogonal to the layer surface) having the normal direction of the light absorption anisotropic layer along the azimuth angle thereof, and the transmittance of the light absorption anisotropic layer is derived. As a result, the direction at which the highest transmittance is exhibited is defined as the transmittance central axis.

Further, the transmittance central axis denotes the direction of the absorption axis (major axis direction of a molecule) of the dichroic substance contained in the light absorption anisotropic layer.

A viewing angle control system that enables visual recognition of an image with excellent contrast and excellent clearness as observed in a desired direction can be prepared by using the optical laminate according to the embodiment of the present invention. The details of the reason for this are not clear, but it is assumed as follows.

First, in the light absorption anisotropic layer according to the embodiment of the present invention, the transmittance central axis angle θs is adjusted by tilting and aligning the liquid crystal compound and the dichroic substance.

It is considered that the light absorption anisotropic layer according to the embodiment of the present invention has a high content of the dichroic substance and thus sufficient absorption is exhibited. In this manner, it is presumed that the contrast of the image as observed in a desired direction is improved as a result of suppressing the transmission of light in directions other than the desired direction.

Here, in the light absorption anisotropic layer having a high content of the dichroic substance, it is considered that since the dichroic substance having a high refractive index is tilted or aligned, the refractive index and the transmittance greatly differ depending on the direction. The reason for this will be described with reference to FIGS. 1 to 4.

FIGS. 1 to 4 are schematic views describing a refraction state of light in a case where polarized light is incident on a light absorption anisotropic layer containing a dichroic substance that is tilted and aligned.

Figure 2:
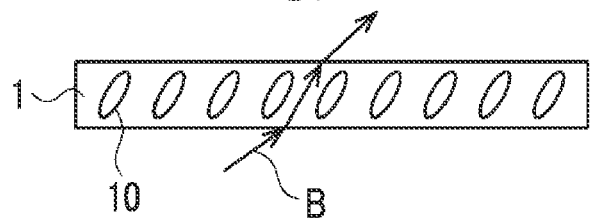
FIG. 2 is a schematic view describing a refraction state of light in a case where polarized light is incident on a light absorption anisotropic layer containing a dichroic substance that is tilted and aligned.
Figure 3:
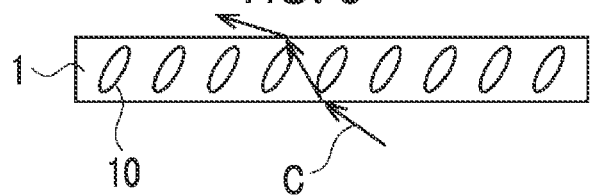
FIG. 3 is a schematic view describing a refraction state of light in a case where polarized light is incident on a light absorption anisotropic layer containing a dichroic substance that is tilted and aligned.

Specifically, FIG. 1 shows a case where polarized light A (light in a vibration direction parallel to an axis at which the absorption axis of a dichroic substance 10 is orthogonally projected in the plane) is incident on a light absorption anisotropic layer 1 in the inclination direction of the dichroic substance 10. Further, FIG. 2 shows a case where polarized light B (light in the vibration direction intersecting with the axis at which the absorption axis of the dichroic substance 10 is orthogonally projected in the plane) is incident on the light absorption anisotropic layer 1 in the inclination direction of the dichroic substance 10. Further, FIG. 3 shows a case where polarized light C (light in the vibration direction parallel to the axis at which the absorption axis of the dichroic substance 10 is orthogonally projected in the plane) is incident on the light absorption anisotropic layer 1 in a direction intersecting with the inclination direction of the dichroic substance 10. Further, FIG. 4 shows a case where polarized light D (light in the vibration direction intersecting with the axis at which the absorption axis of the dichroic substance 10 is orthogonally projected in the plane) is incident on the light absorption anisotropic layer 1 in the direction intersecting with the inclination direction of the dichroic substance 10.

Figure 4:
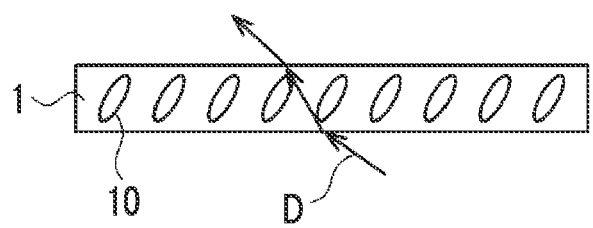
FIG. 4 is a schematic view describing a refraction state of light in a case where polarized light is incident on a light absorption anisotropic layer containing a dichroic substance that is tilted and aligned.

In a case of comparison of the degree of refraction and absorption of incident light between FIGS. 1 to 4, the degree of refraction and absorption of light is medium in FIG. 1, the degree of refraction and absorption of light is low in FIG. 2, the degree of refraction and absorption of light in the example of FIG. 3 is high, and the degree of the refraction and absorption of light is low in the example of FIG. 4.

In this manner, in the light absorption anisotropic layer containing a dichroic substance with a high refractive index at a high concentration, in which the dichroic substance is tilted and aligned, the refractive index greatly changes depending on the incident direction and the polarization state of the light. Here, the refraction of light occurs at the interface between the light absorption anisotropic layer and the adjacent layer, but the refraction and transmission of light in an unintended direction are suppressed by setting the refractive index of the adjacent layer to be in the above-described range, and as a result, the clearness of the image is assumed to be improved.

Light Absorption Anisotropic Layer

The light absorption anisotropic layer of the optical laminate according to the embodiment of the present invention is a light absorption anisotropic layer formed of a liquid crystal composition containing a liquid crystal compound and a dichroic substance.

The transmittance central axis angle θs of the light absorption anisotropic layer is in a range of 5 to 60°. Further, from the viewpoint that an image with more excellent clearness can be visually recognized in a case of observation in a desired direction, the transmission central axis angle is preferably in a range of 10° to 50°, more preferably in a range of 13° to 45°, and still more preferably in a range of 15° to 40°.

As the technique of aligning the dichroic substance in a desired direction, a technique of preparing a polarizer formed of a dichroic substance or a technique of preparing a guest-host liquid crystal cell can be referred to.

For example, techniques used in the method of preparing a dichroic polarizing element described in JP1999-305036A (JP-H11-305036A) or JP2002-90526A and the method of preparing a guest-host type liquid crystal display device described in JP2002-99388A or JP2016-27387A can be used for preparation of the light absorption anisotropic layer of the present invention.

Specifically, in a case where the technique of a guest-host type liquid crystal cell is used, the light absorption anisotropic layer of the present invention can be prepared by mixing a dichroic substance serving as a guest with a rod-like liquid crystal compound serving as a host liquid crystal, aligning host liquid crystals, aligning molecules of the dichroic substance along the alignment of the liquid crystal molecules, and fixing the aligned state.

In order to prevent fluctuation in the light absorption characteristics of the light absorption anisotropic layer depending on the usage environment, it is preferable that the alignment of the dichroic substance is fixed by forming a chemical bond. For example, the alignment can be fixed by advancing the polymerization of the host liquid crystal, the dichroic substance, and the polymerizable component to be added as desired.

Liquid Crystal Composition

The light absorption anisotropic layer of the present invention is formed of a liquid crystal composition containing a liquid crystal compound and a dichroic substance.

In addition, the liquid crystal composition may contain an alignment agent, a solvent, a polymerization initiator, a polymerizable compound, an interface improver, and other additives.

Hereinafter, each component will be described.

Liquid Crystal Compound

The liquid crystal composition contains a liquid crystal compound. In a case where the composition contains a liquid crystal compound, the dichroic substances can be aligned with a high degree of alignment while the precipitation of the dichroic substances is suppressed.

Further, the liquid crystal compound contained in the liquid crystal composition can be generally classified into a rod-like type and a disk-like type according to the shape of the compound.

Further, a liquid crystal compound that does not exhibit dichroism in a visible region is preferable as the liquid crystal compound.

In the following description, the expression "the degree of alignment of the light absorption anisotropic layer to be formed is higher" is also referred to as "the effects of the present invention are more excellent".

As the liquid crystal compound, any of a low-molecular-weight liquid crystal compound or a polymer liquid crystal compound can be used.

Here, the "low-molecular-weight liquid crystal compound" indicates a liquid crystal compound having no repeating units in the chemical structure.

Here, the "polymer liquid crystal compound" indicates a liquid crystal compound having a repeating unit in the chemical structure.

Examples of the low-molecular-weight liquid crystal compound include liquid crystal compounds described in JP2013-228706A.

Examples of the polymer liquid crystal compound include thermotropic liquid crystal polymers described in JP2011-237513A. Further, the polymer liquid crystal compound may contain a crosslinkable group (such as an acryloyl group or a methacryloyl group) at a terminal.

From the viewpoint of easily realizing the effects of the present invention, the liquid crystal compound is preferably a rod-like liquid crystal compound and more preferably a polymer liquid crystal compound.

Further, from the viewpoint of easily realizing the effects of the present invention, it is preferable that the liquid crystal compound is a liquid crystal compound exhibiting thermotropic properties (hereinafter, also referred to as "thermotropic liquid crystal"). In addition, the thermotropic liquid crystal is a liquid crystal that shows transition to a liquid crystal phase due to a change in temperature.

The liquid crystal compound may be used alone or in combination of two or more kinds thereof.

From the viewpoint that the effects of the present invention are more excellent, the liquid crystal compound includes preferably a polymer liquid crystal compound and particularly preferably both a polymer liquid crystal compound and a low-molecular-weight liquid crystal compound.

It is preferable that the liquid crystal composition contains, as the liquid crystal compound, a liquid crystal compound represented by Formula (LC) or a polymer thereof. The liquid crystal compound represented by Formula (LC) or a polymer thereof is a compound exhibiting liquid crystallinity. The liquid crystallinity may be a nematic phase or a smectic phase, and may exhibit both a nematic phase and a smectic phase and preferably at least a nematic phase.

The smectic phase may be a higher-order smectic phase. The high-order smectic phase here denotes a smectic B phase, a smectic D phase, a smectic E phase, a smectic F phase, a smectic G phase, a smectic H phase, a smectic I phase, a smectic J phase, a smectic K phase, or a smectic L phase. Among these, a smectic B phase, a smectic F phase, or a smectic I phase is preferable.

In a case where the smectic liquid crystal phase exhibited by the liquid crystal compound is any of these higher-order smectic liquid crystal phases, a light absorption anisotropic layer with a higher degree of alignment order can be prepared. Further, the light absorption anisotropic layer prepared from such a high-order smectic liquid crystal phase with a high degree of alignment order is a layer in which a Bragg peak derived from a high-order structure such as a hexatic phase or a crystal phase in X-ray diffraction measurement is obtained. The Bragg peak is a peak derived from a plane periodic structure of molecular alignment, and according to the liquid crystal composition of the present invention, a light absorption anisotropic layer having a periodic interval of 3.0 to 5.0 Å can be obtained.

$$Q1-S1-MG-S2-Q2 \quad (LC)$$

In Formula (LC), Q1 and Q2 each independently represent a hydrogen atom, a halogen atom, a linear, branched, or cyclic alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), or a crosslinkable group represented by any of Formulae (P-1) to (P-30), and it is preferable that at least one of Q1 or Q2 represents a crosslinkable group represented by any of the following formulae.

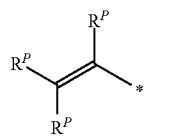
(P-1)

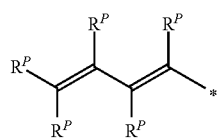
(P-2)

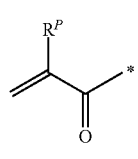
(P-3)

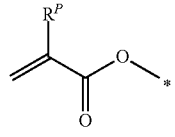
(P-4)

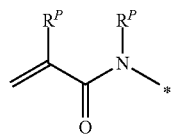
(P-5)

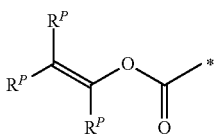
(P-6)

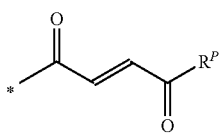
(P-7)

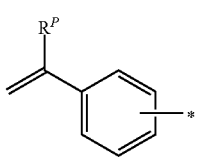
(P-8)

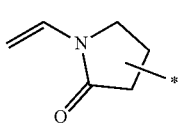
(P-9)

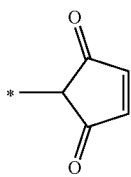
(P-10)

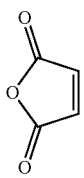
(P-11)

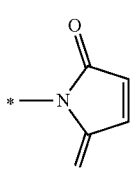
(P-12)

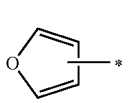
(P-13)

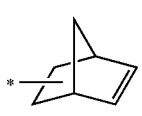
(P-14)

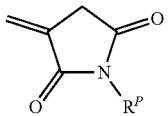
(P-15)

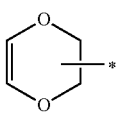
(P-16)

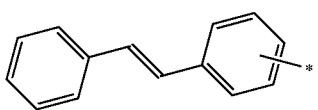
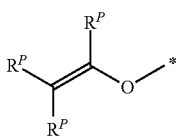
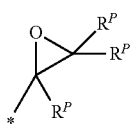
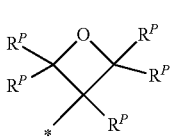
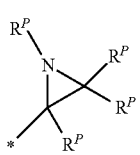
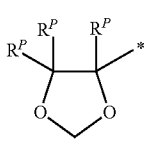
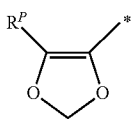
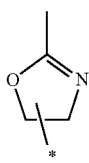
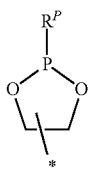
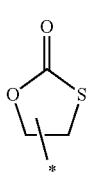

(P-17)
(P-18)
(P-19)
(P-20)
(P-21)
(P-22)
(P-23)
(P-24)
(P-25)
(P-26)

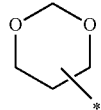
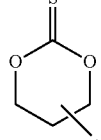
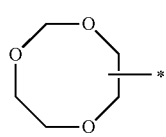

(P-27)
(P-28)
(P-29)
(P-30)

In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H), and a plurality of $R^P$'s may be the same as or different from each other.

Preferred embodiments of the crosslinkable group include a radically polymerizable group and a cationically polymerizable group. As the radically polymerizable group, a vinyl group represented by Formula (P-1), a butadiene group represented by Formula (P-2), a (meth)acryl group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride group represented by Formula (P-11), or a maleimide group represented by Formula (P-12) is preferable. As the cationically polymerizable group, a vinyl ether group represented by Formula (P-18), an epoxy group represented by Formula (P-19), or an oxetanyl group represented by Formula (P-20) is preferable.

In Formula (LC), S1 and S2 each independently represent a divalent spacer group, and preferred embodiments of S1 and S2 include the same structures as those for SPW in Formula (W1), and thus the description thereof will not be repeated.

In Formula (LC), MG represents a mesogen group described below. The mesogen group represented by MG is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited, and for example, particularly description on pages 7 to 16 of "FlussigeKristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystals Handbook Editing Committee can be referred to.

The mesogen group represented by MG has preferably 2 to 10 cyclic structures and more preferably 3 to 7 cyclic structures.

Specific examples of the cyclic structure include an aromatic hydrocarbon group, a heterocyclic group, and an alicyclic group.

From the viewpoints of exhibiting the liquid crystallinity, adjusting the liquid crystal phase transition temperature, and the availability of raw materials and synthetic suitability and from the viewpoint that the effects of the present invention are more excellent, as the mesogen group represented by MG, a group represented by Formula (MG-A) or Formula (MG-B) is preferable, and a group represented by Formula (MG-B) is more preferable.

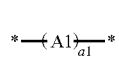
(MG-A)

(MG-B)

In Formula (MG-A), A1 represents a divalent group selected from the group consisting of an aromatic hydrocarbon group, a heterocyclic group, and an alicyclic group. These groups may be substituted with a substituent such as the substituent W.

It is preferable that the divalent group represented by A1 is a 4- to 15-membered ring. Further, the divalent group represented by A1 may be a monocycle or a fused ring.

Further, * represents a bonding position with respect to S1 or S2.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable.

The divalent heterocyclic group represented by A1 may be any of aromatic or non-aromatic, but a divalent aromatic heterocyclic group is preferable as the divalent heterocyclic group from the viewpoint of further improving the degree of alignment.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, a thienooxazole-diyl group, and the following structures (II-1) to (II-4).

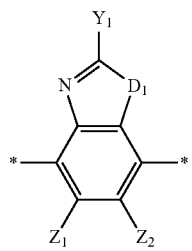
(II-1)

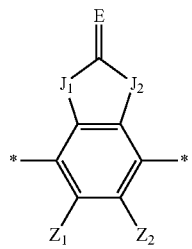
(II-2)

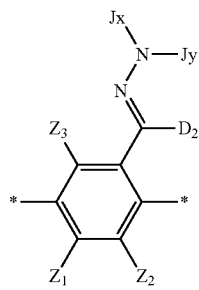
(II-3)

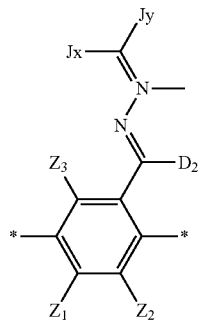
(II-4)

In Formulae (II-1) to (II-4), $D_1$ represents —S—, —O—, or $NR^{11}$—, $R^{11}$ represents a hydrogen atom or an alkyl group having 1 to 6 carbon atoms, $Y_1$ represents an aromatic hydrocarbon group having 6 to 12 carbon atoms or an aromatic heterocyclic group having 3 to 12 carbon atoms, $Z_1$, $Z_2$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, —$NR^{12}R^{13}$, or —$SR^{12}$, $Z_1$ and $Z_2$ may be bonded to each other to form an aromatic ring or an aromatic heterocyclic ring, $R^{12}$ and $R^{13}$ each independently represent a hydrogen atom or an alkyl group having 1 to 6 carbon atoms, $J_1$ and $J_2$ each independently represent a group selected from the group consisting of —O—, —$NR^{21}$— ($R^{21}$ represents a hydrogen atom or substituent), —S—, and —C(O)—, E represents a hydrogen atom or a non-metal atom of a Group 14 to a Group 16 to which a substituent may be bonded, Jx represents an organic group having 2 to 30 carbon atoms, which has at least one aromatic ring selected from the group consisting of an aromatic hydrocarbon ring and an aromatic heterocyclic ring, Jy represents a hydrogen atom, an alkyl group having 1 to 6 carbon atoms which may have a substituent, or an organic group having 2 to 30 carbon atoms which has at least one aromatic ring selected from the group consisting of an aromatic hydrocarbon ring and an aromatic heterocyclic ring, the aromatic ring of Jx and Jy may have a substituent, Jx and Jy may be bonded to each other to form a ring, and $D_2$ represents a hydrogen atom or an alkyl group having 1 to 6 carbon atoms which may have a substituent.

In Formula (II-2), in a case where $Y_1$ represents an aromatic hydrocarbon group having 6 to 12 carbon atoms, the aromatic hydrocarbon group may be monocyclic or polycyclic. In a case where $Y_1$ represents an aromatic heterocyclic group having 3 to 12 carbon atoms, the aromatic heterocyclic group may be monocyclic or polycyclic.

In Formula (II-2), in a case where $J_1$ and $J_2$ represent —$NR^{21}$—, as the substituent represented by $R^{21}$, for example, paragraphs 0035 to 0045 of JP2008-107767A can be referred to, and the content thereof is incorporated in the present specification.

In Formula (II-2), in a case where E represents a non-metal atom of a Group 14 to a Group 16 to which a substituent may be bonded, =O, —S, —NR', or —C(R')R' is preferable. R' represents a substituent, and as the substituent, for example, the description in paragraphs [0035] to [0045] of JP2008-107767A can be referred to, and —$NZ^{41}Z^{12}$ ($Z^{41}$ and $Z^{42}$ each independently represent a hydrogen atom, an alkyl group, or an aryl group) is preferable.

Specific examples of the divalent alicyclic group represented by A1 include a cyclopentylene group and a cyclohexylene group, and the carbon atoms thereof may be substituted with —O—, —Si(CH$_3$)$_2$—, —N(Z)— (Z represents a hydrogen atom, an alkyl group having 1 to 4 carbon atoms, a cycloalkyl group, an aryl group, a cyano group, or a halogen atom), —C(O)—, —S—, —C(S)—, —S(O)—, —SO$_2$—, or a group obtained by combining two or more of these groups.

In Formula (MG-A), a1 represents an integer of 2 to 10. The plurality of A1's may be the same as or different from each other.

In Formula (MG-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (MG-A), and thus description thereof will not be repeated.

In Formula (MG-B), a2 represents an integer of 1 to 10, a plurality of A2's may be the same as or different from each other, and a plurality of LA1's may be the same as or different from each other. From the viewpoint that the effects of the present invention are more excellent, it is preferable that a2 represents 2 or greater.

In Formula (MG-B), LA1 represents a single bond or divalent linking group. Here, LA1 represents a divalent linking group in a case where a2 represents 1, and at least one of the plurality of LA1's represents a divalent linking group in a case where a2 represents 2 or greater.

In Formula (MG-B), examples of the divalent linking group represented by LA1 are the same as those for LW, and thus the description thereof will not be repeated.

Specific examples of MG include the following structures, the hydrogen atoms on the aromatic hydrocarbon group, the heterocyclic group, and the alicyclic group in the following structures may be substituted with the substituent W described above.

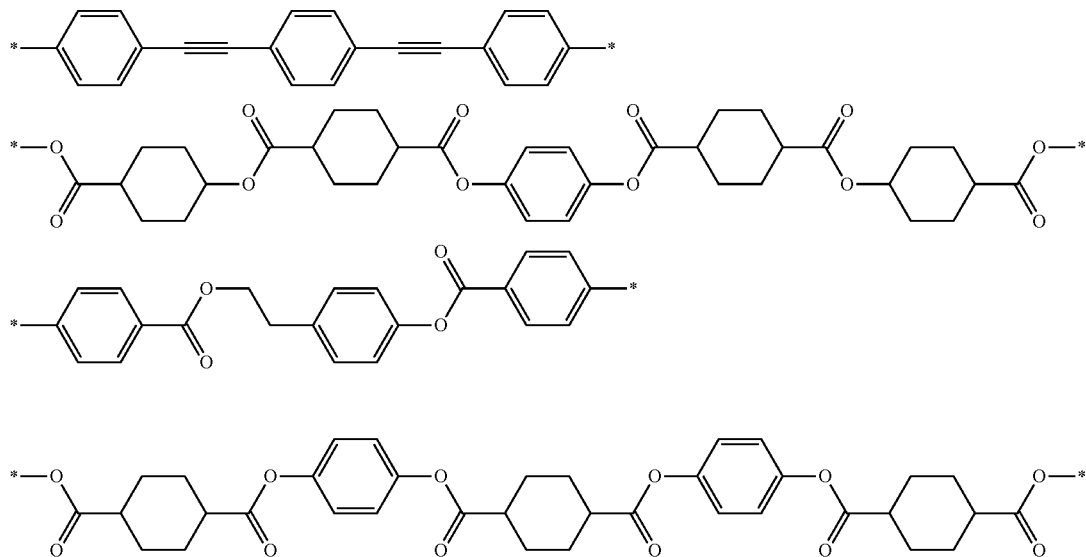

-continued
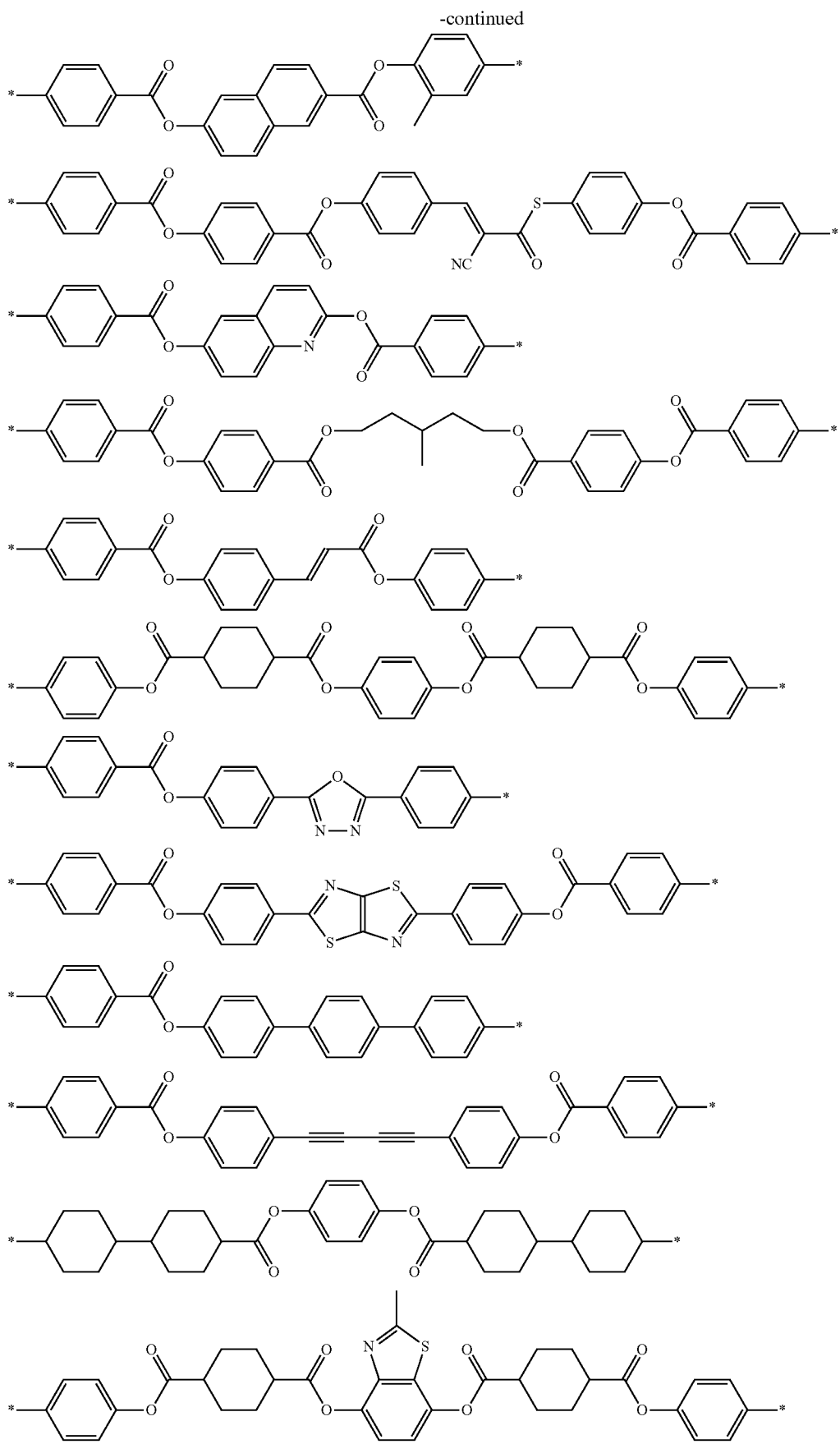

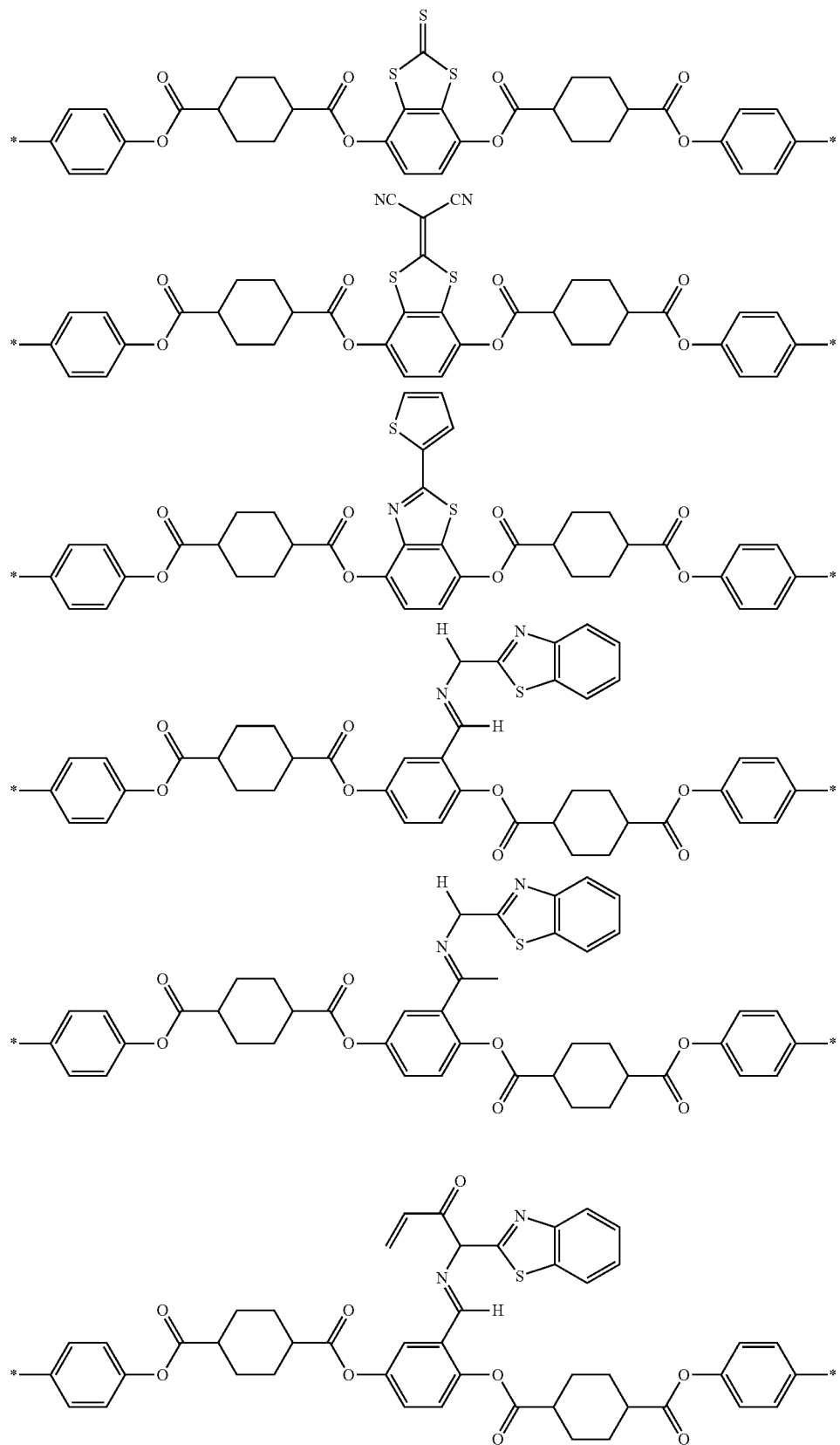

-continued
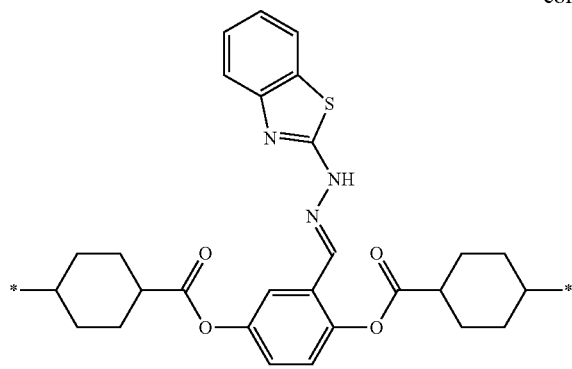
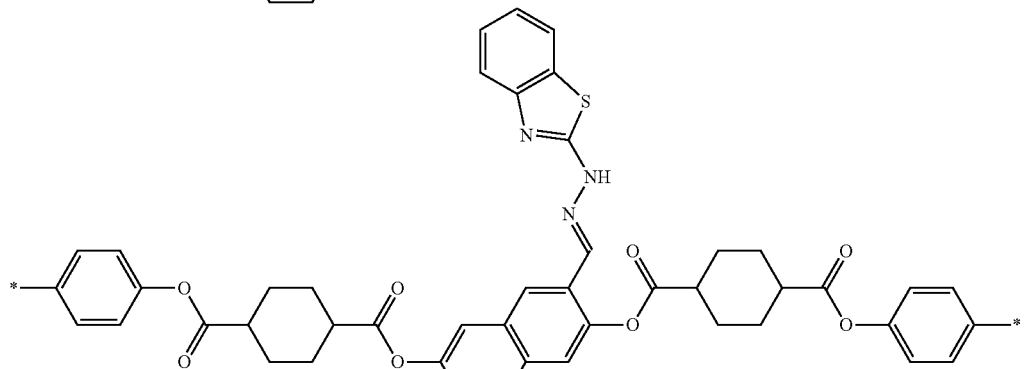
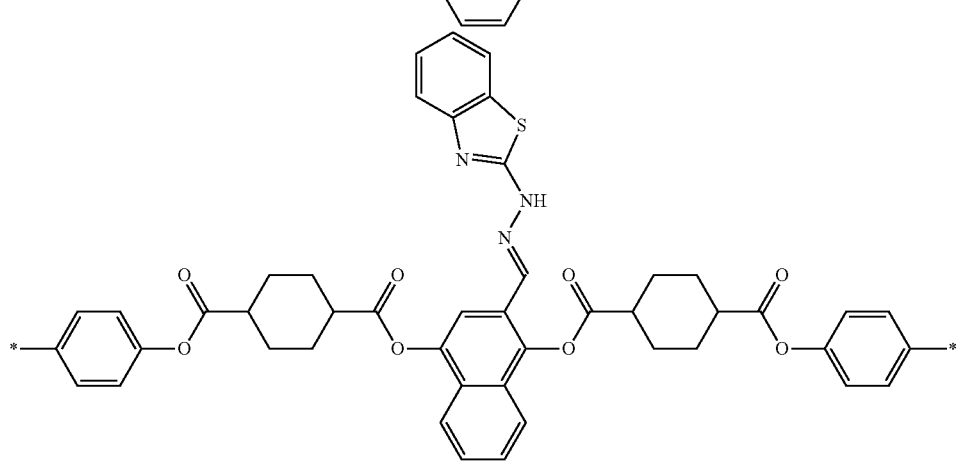
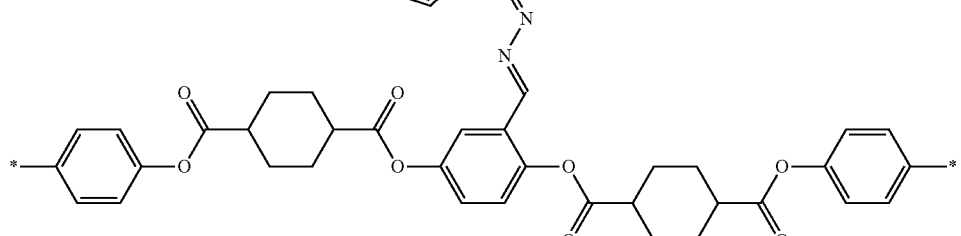
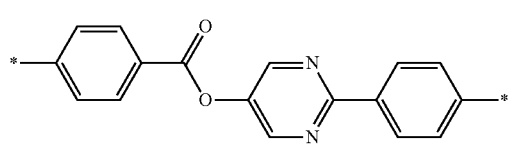
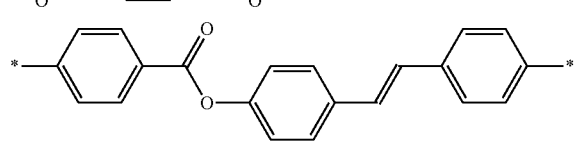

-continued
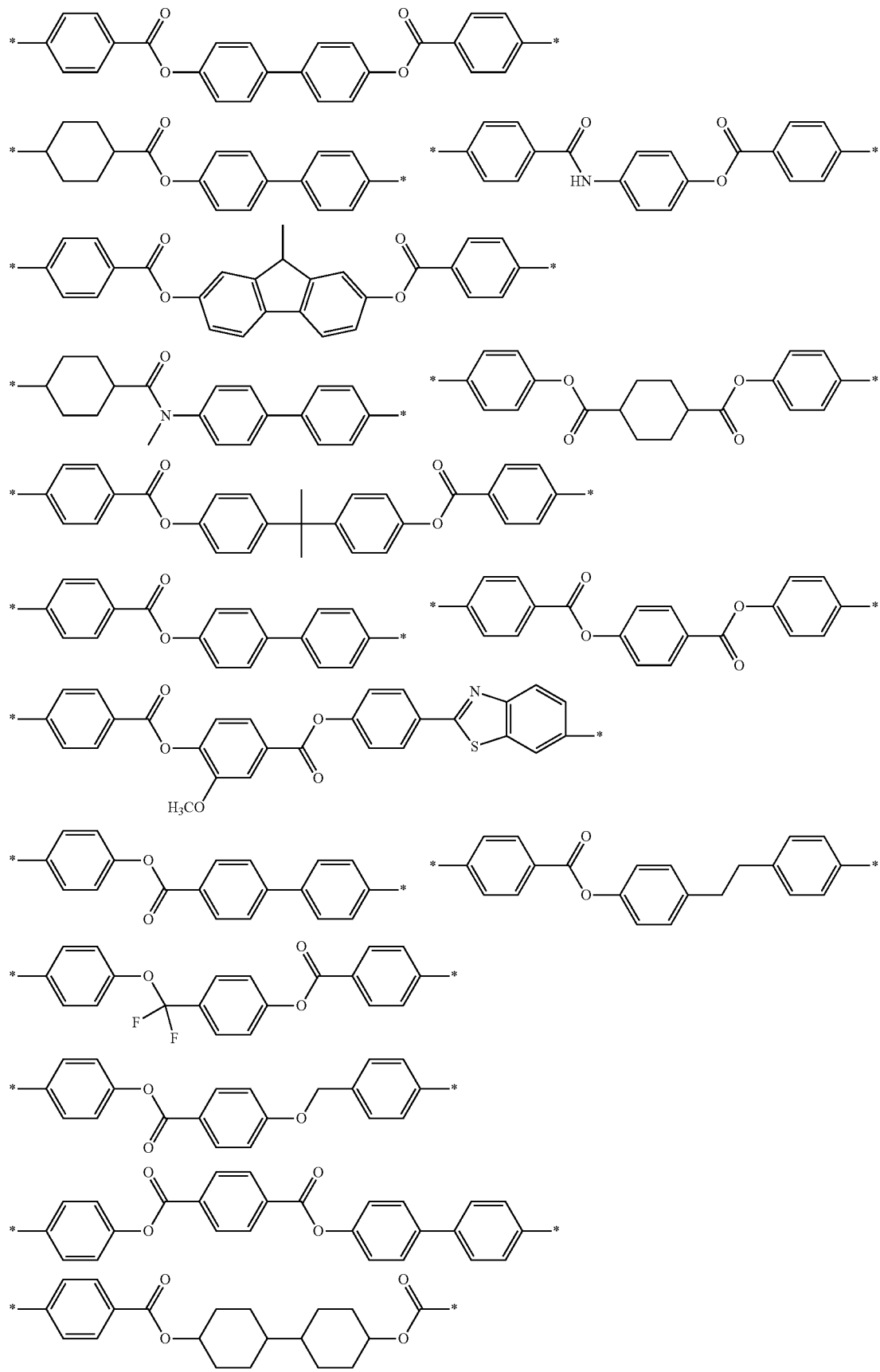

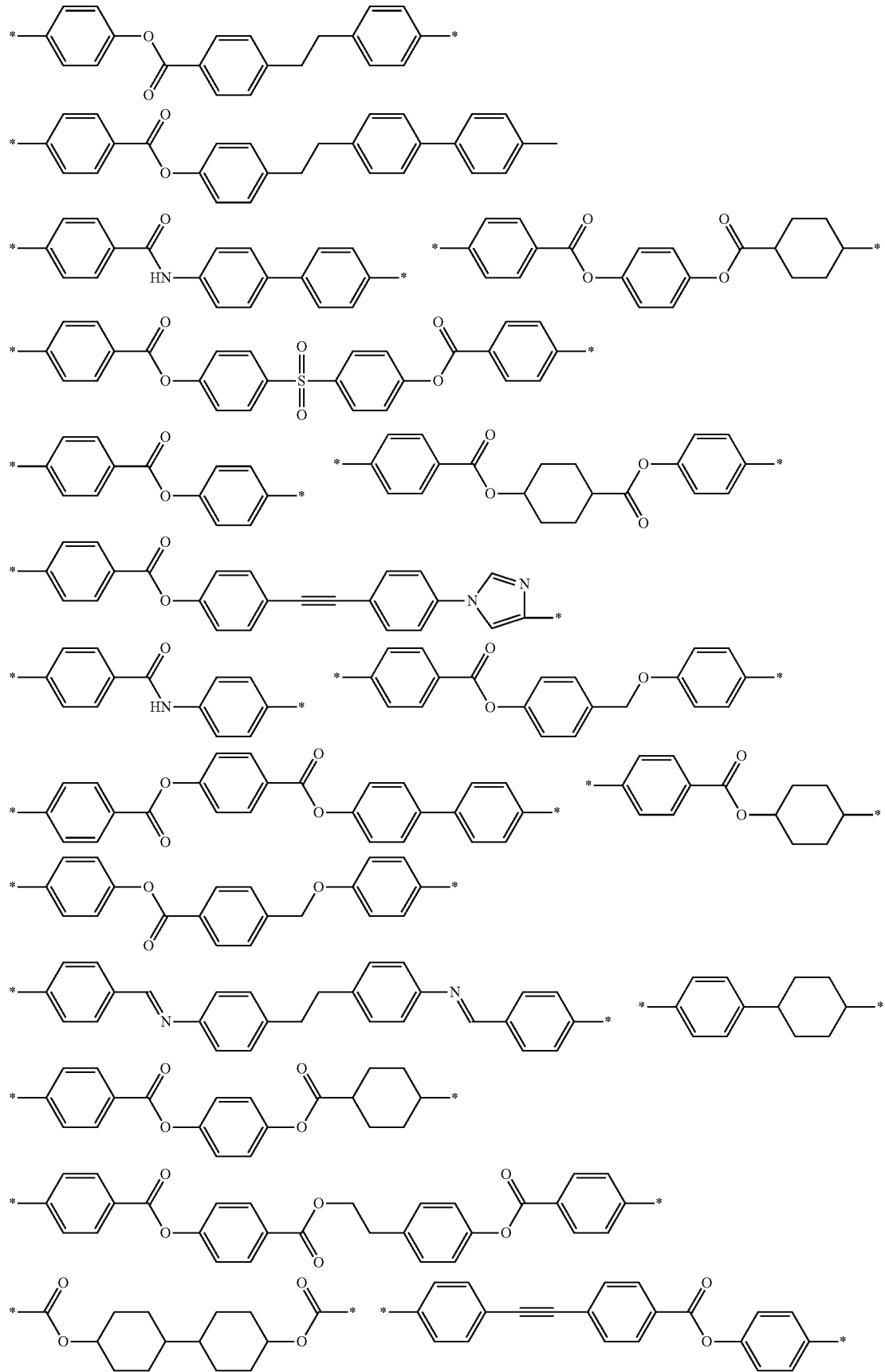

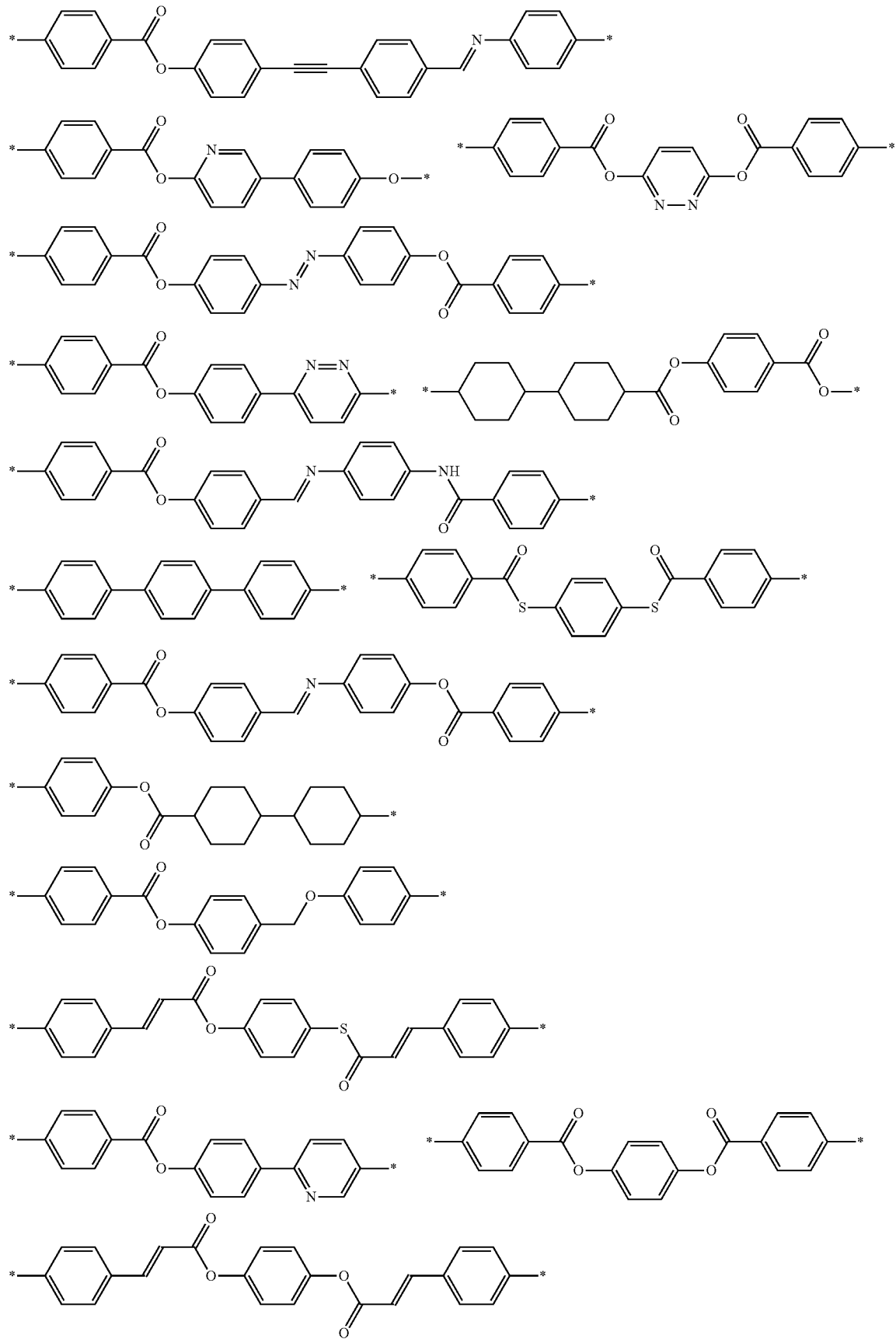

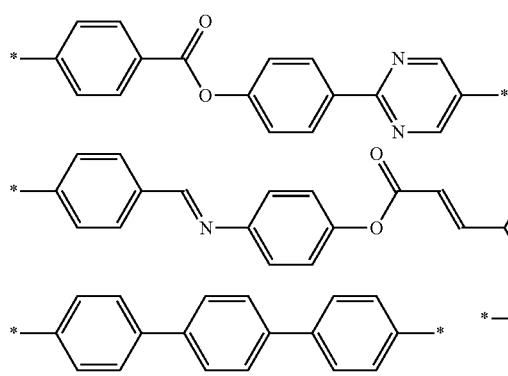
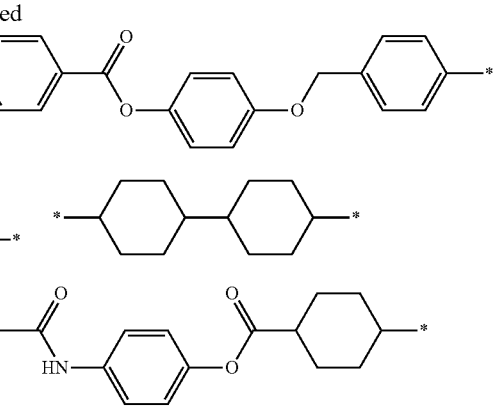

Low-Molecular-Weight Liquid Crystal Compound

In a case where the liquid crystal compound represented by Formula (LC) is a low-molecular-weight liquid crystal compound, examples of preferred embodiments of the cyclic structure of the mesogen group MG include a cyclohexylene group, a cyclopentylene group, a phenylene group, a naphthylene group, a fluorene-diyl group, a pyridine-diyl group, a pyridazine-diyl group, a thiophene-diyl group, an oxazole-diyl group, a thiazole-diyl group, and a thienothiophene-diyl group, and the number of cyclic structures is preferably in a range of 2 to 10 and more preferably in a range of 3 to 7.

Examples of preferred embodiments of the substituent W having a mesogen structure include a halogen atom, a halogenated alkyl group, a cyano group, a hydroxy group, a nitro group, a carboxy group, an alkoxy group having 1 to 10 carbon atoms, an alkylcarbonyl group having 1 to 10 carbon atoms, an alkyloxycarbonyl group having 1 to 10 carbon atoms, an alkylcarbonyloxy group having 1 to 10 carbon atoms, an amino group, an alkylamino group having 1 to 10 carbon atoms, an alkylaminocarbonyl group, and a group in which LW in the Formula (W1) represents a single bond, SPW represents a divalent spacer group, and Q represents a crosslinkable group represented by any of Formulae (P-1) to (P-30), and preferred examples of the crosslinkable group include a vinyl group, a butadiene group, a (meth)acryloyl group, a (meth)acrylamide group, a vinyl acetate group, a fumaric acid ester group, a styryl group, a vinylpyrrolidone group, a maleic acid anhydride group, a maleimide group, a vinyl ether group, an epoxy group, and an oxetanyl group.

Since the preferred embodiments of the divalent spacer groups S1 and S2 are the same as those of the SPW, the description thereof will not be repeated.

In a case where a low-molecular-weight liquid crystal compound exhibiting smectic properties is used, the number of carbon atoms of the spacer group (the number of atoms in a case where the carbon atoms are substituted "SP—C") is preferably 6 or more and more preferably 8 or more.

In a case where the liquid crystal compound represented by Formula (LC) is a low-molecular-weight liquid crystal compound, a plurality of low-molecular-weight liquid crystal compounds may be used in combination, preferably 2 to 6 kinds of low-molecular-weight liquid crystal compounds are used in combination, and more preferably 2 to 4 kinds of low-molecular-weight liquid crystal compounds are used in combination. By using low-molecular-weight liquid crystal compounds in combination, the solubility can be improved and the phase transition temperature of the liquid crystal composition can be adjusted.

Specific examples of the low-molecular-weight liquid crystal compound include compounds represented by Formulae (LC-1) to (LC-77), but the low-molecular-weight liquid crystal compound is not limited thereto.

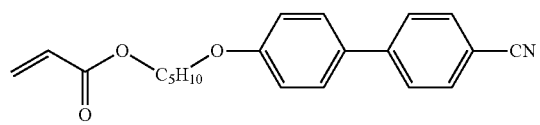

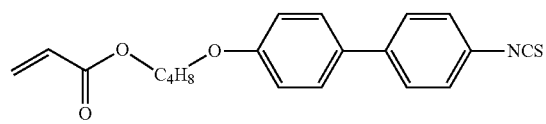

(LC-3)

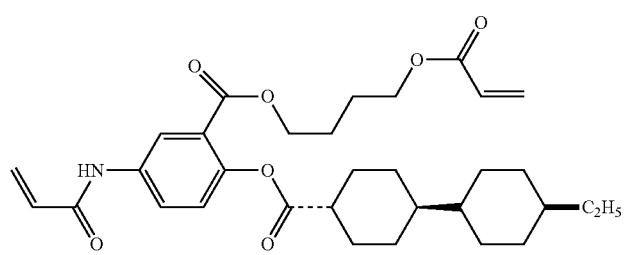

(LC-4)

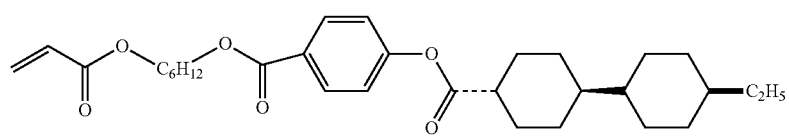

-continued
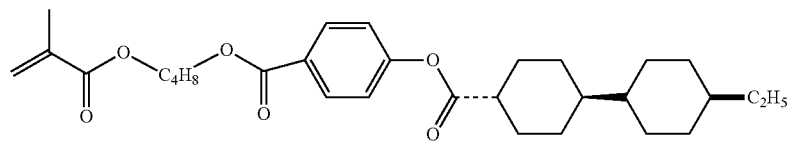
(LC-5)
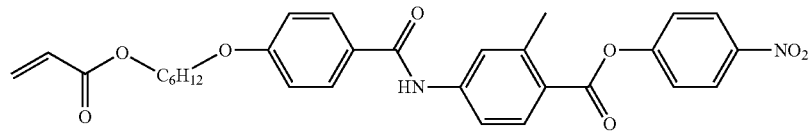
(LC-6)
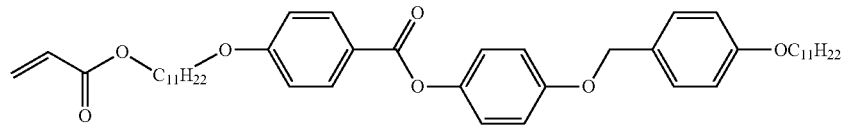
(LC-7)
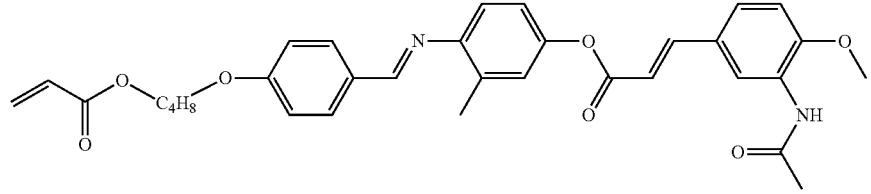
(LC-8)
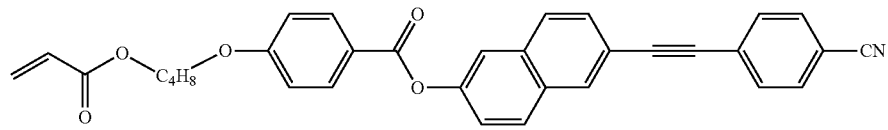
(LC-9)
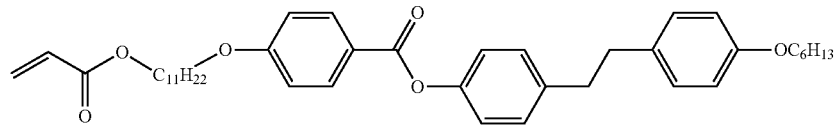
(LC-10)
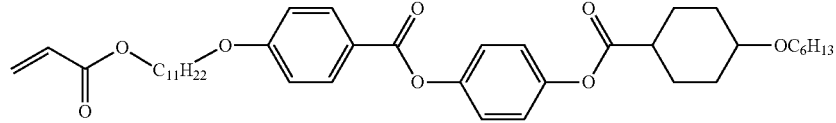
(LC-11)
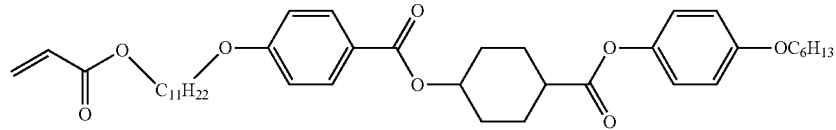
(LC-12)
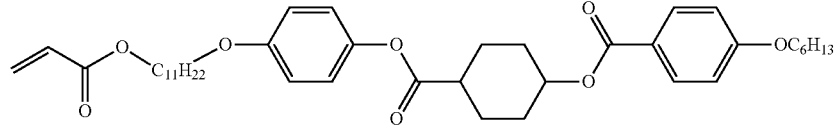
(LC-13)
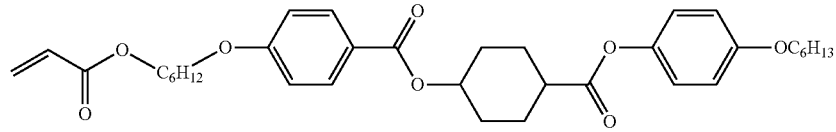
(LC-14)
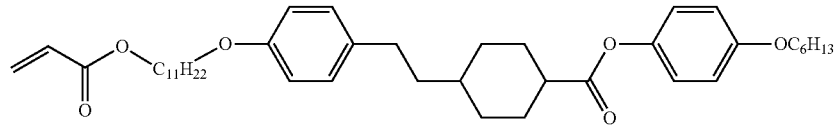
(LC-15)

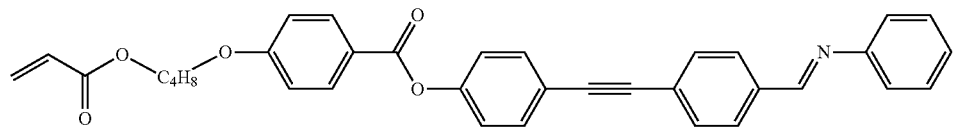
(LC-16)
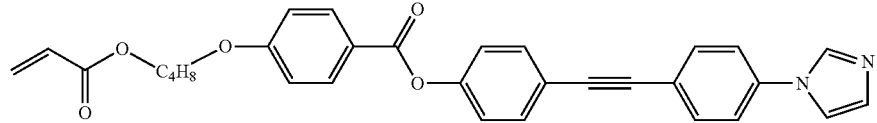
(LC-17)
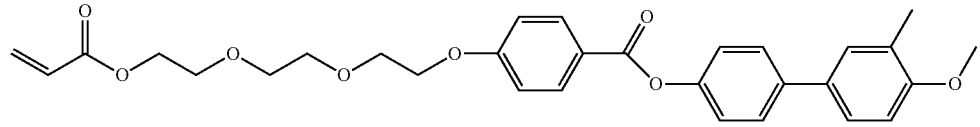
(LC-18)
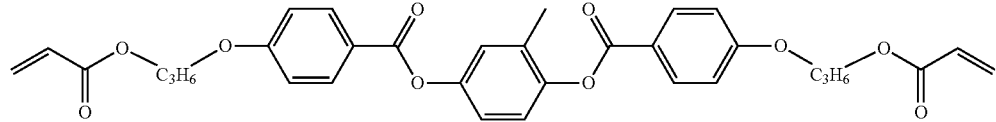
(LC-19)
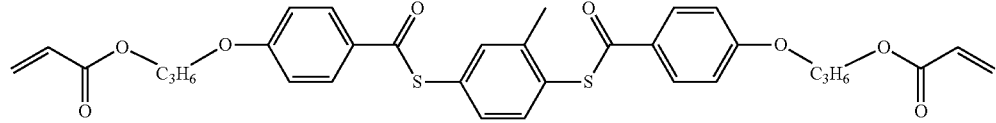
(LC-20)
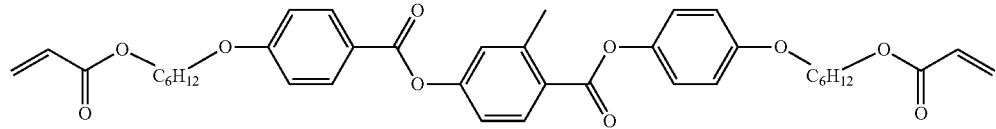
(LC-21)
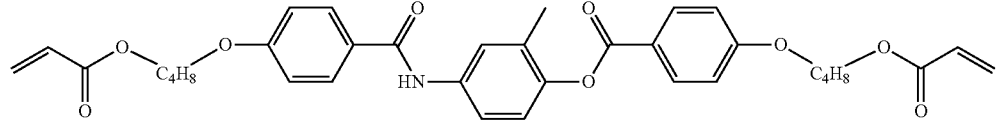
(LC-22)
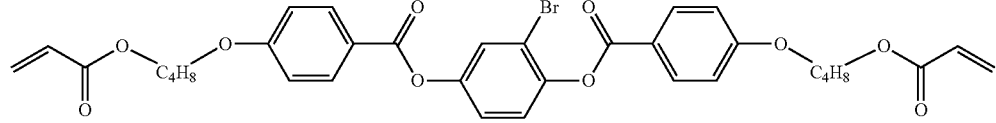
(LC-23)
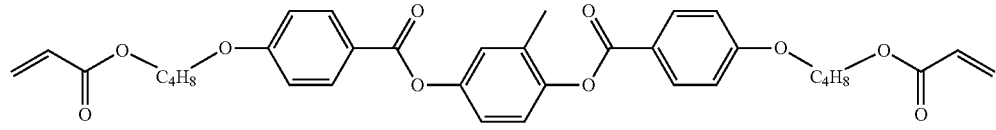
(LC-24)
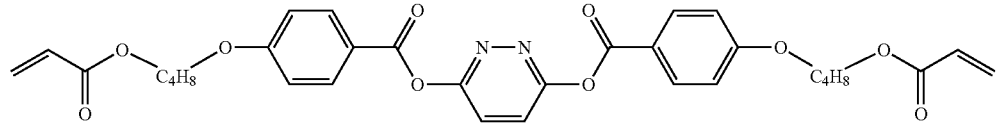
(LC-25)
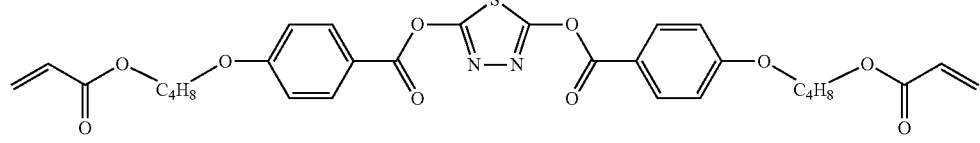
(LC-26)

-continued
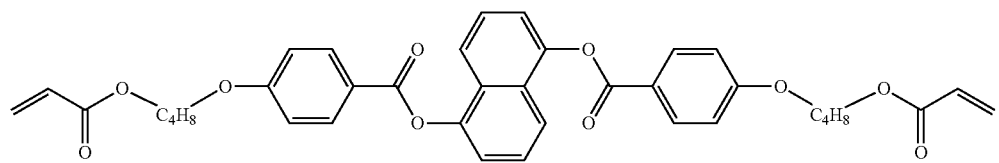
(LC-27)
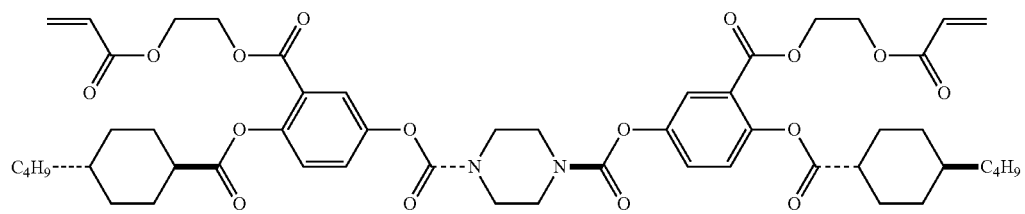
(LC-28)
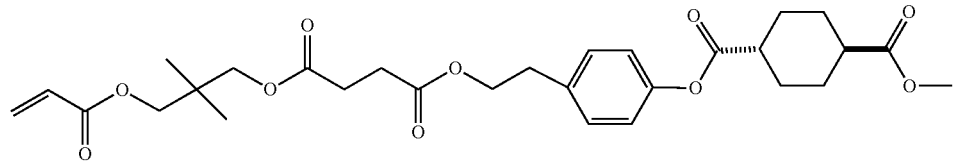
(LC-29)
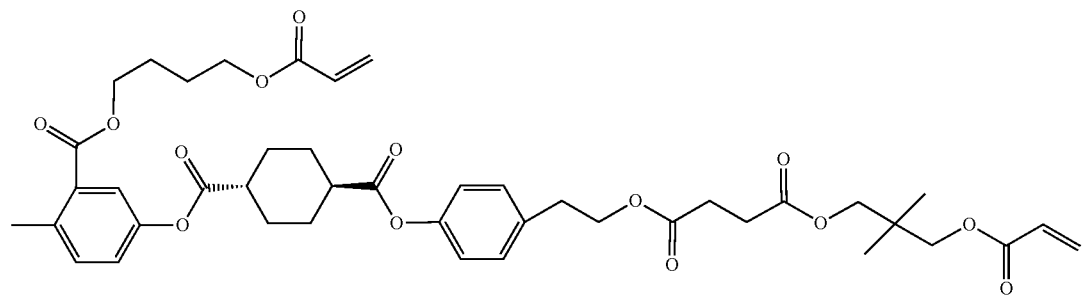
(LC-30)
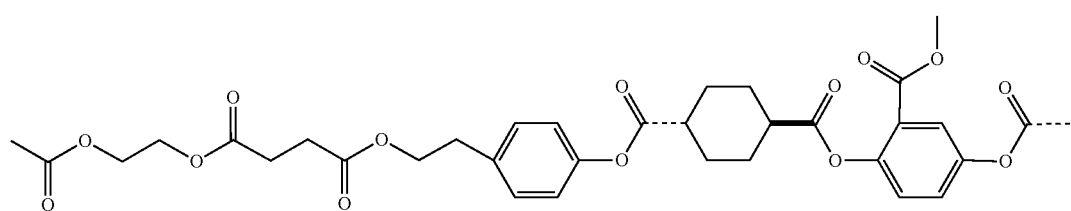
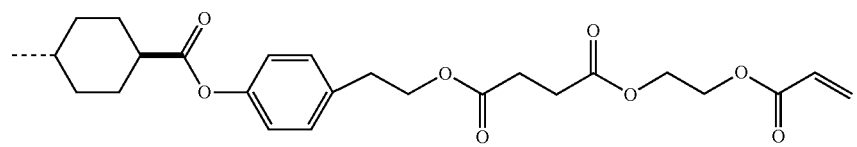
(LC-31)
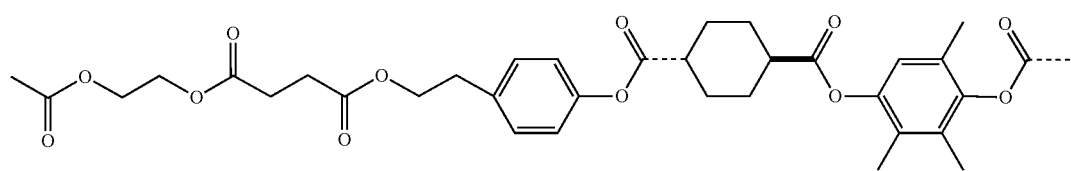
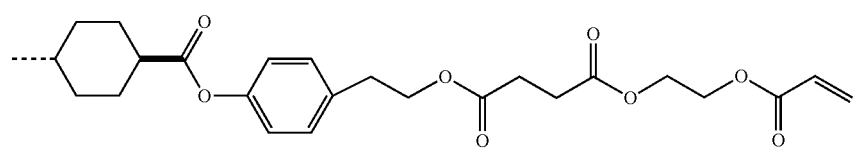

-continued
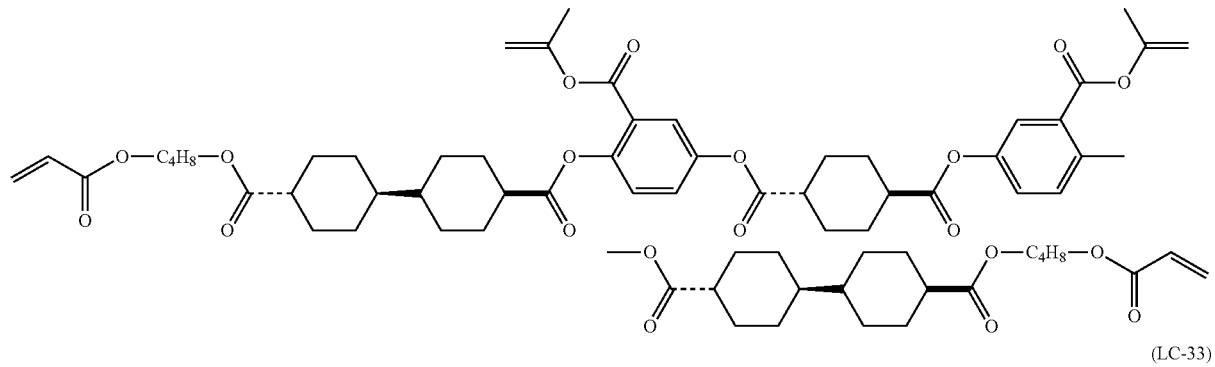
(LC-32)
(LC-33)
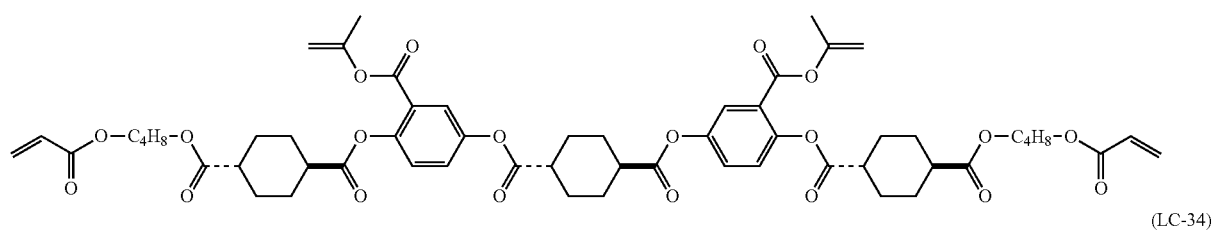
(LC-34)
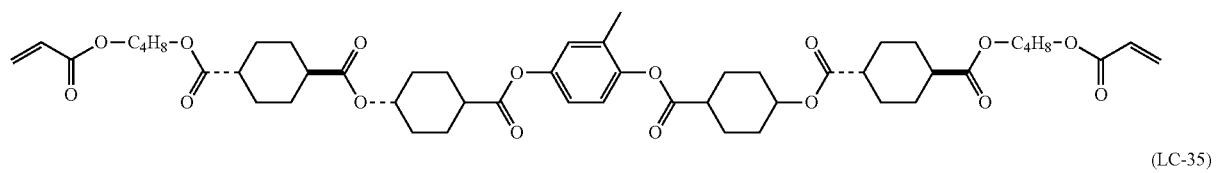
(LC-35)
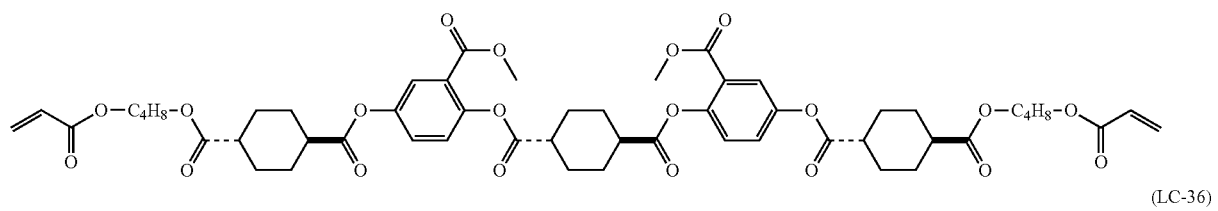
(LC-36)
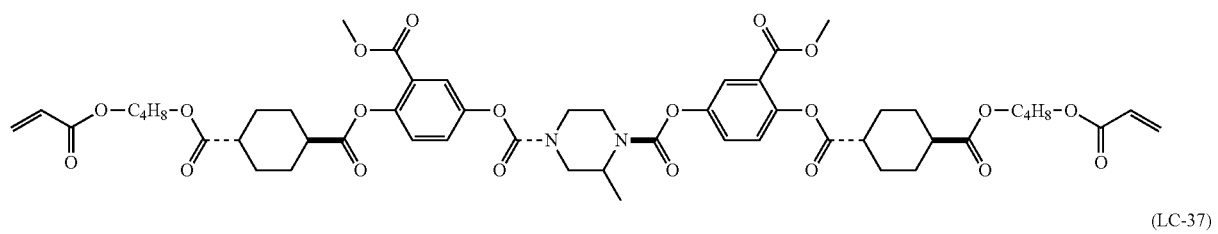
(LC-37)
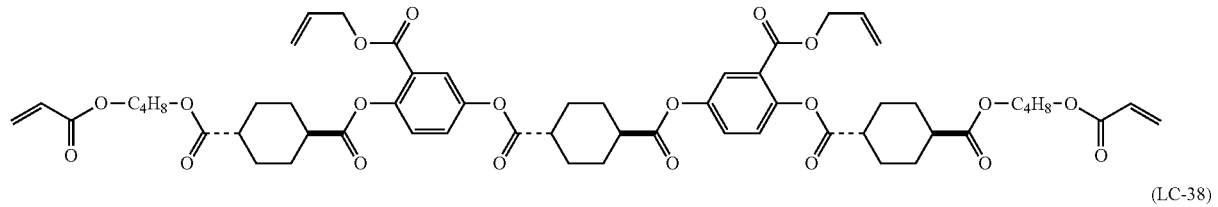
(LC-38)
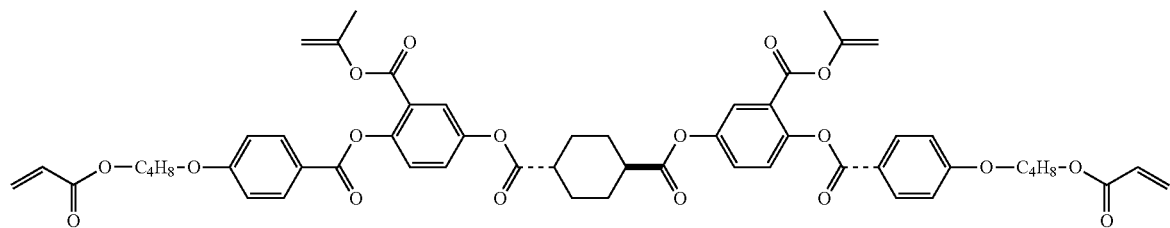

(LC-39)
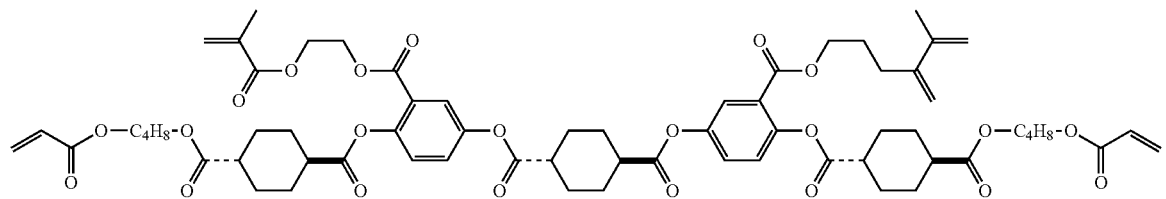
(LC-40)
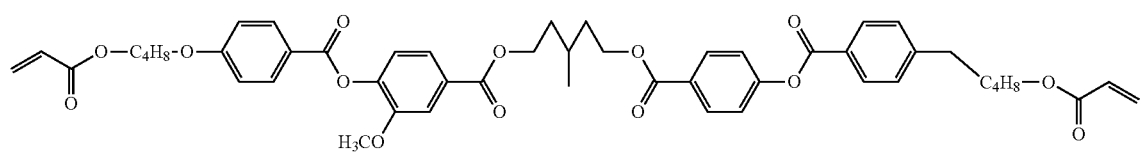
(LC-41)
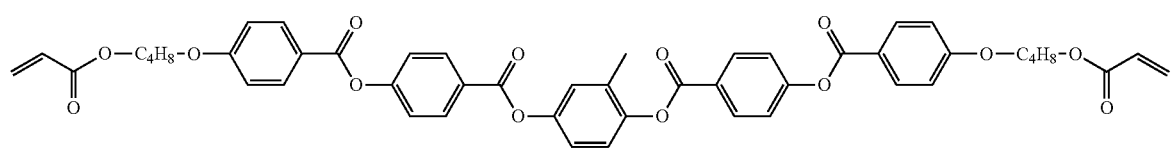
(LC-42)
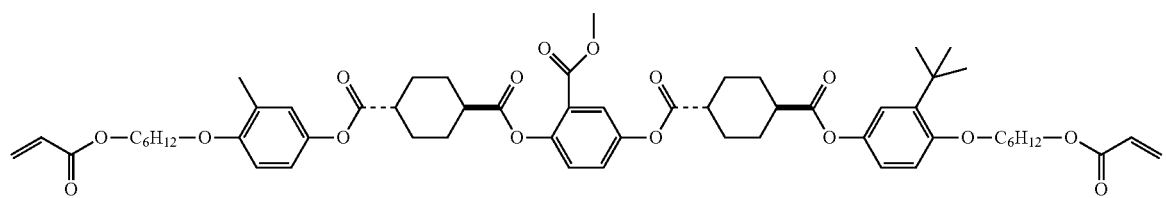
(LC-43)
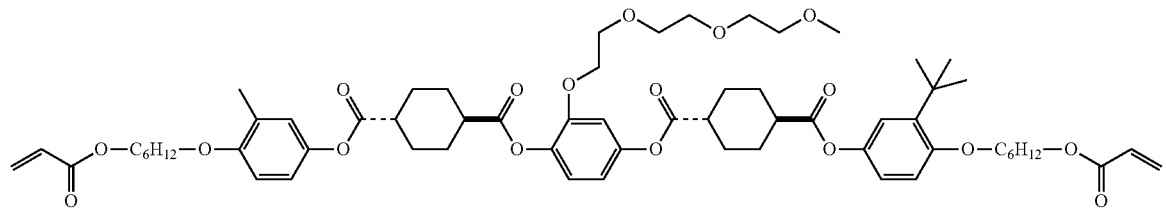
(LC-44)
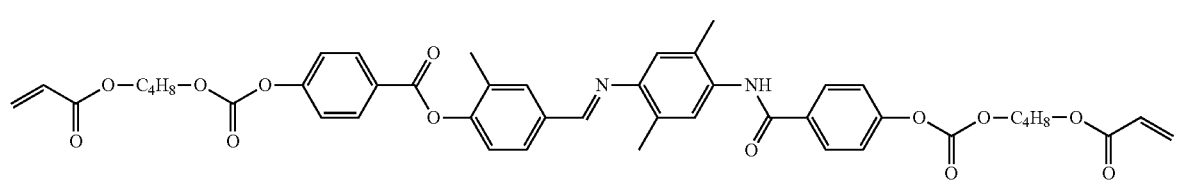
(LC-45)
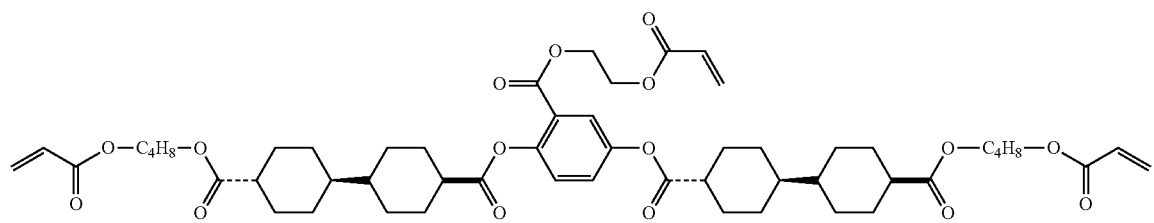

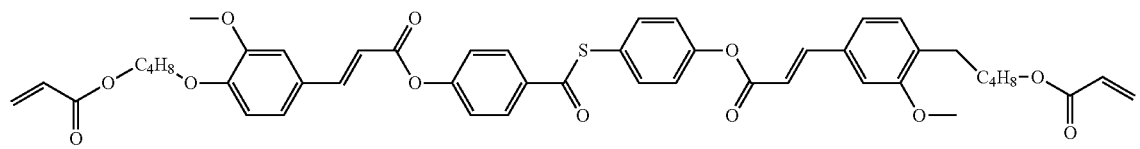
(LC-46)
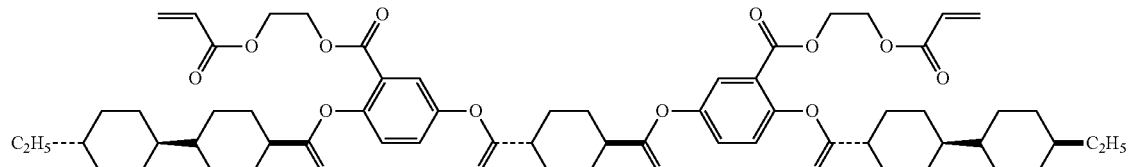
(LC-47)
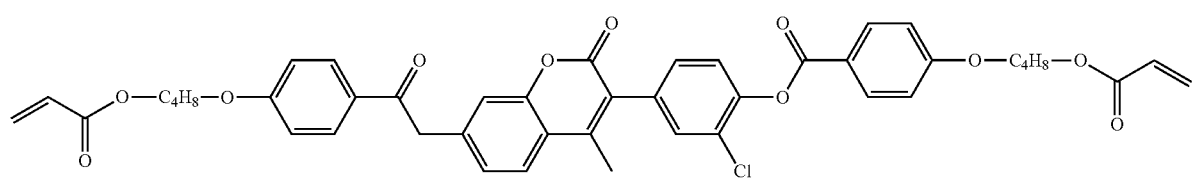
(LC-48)
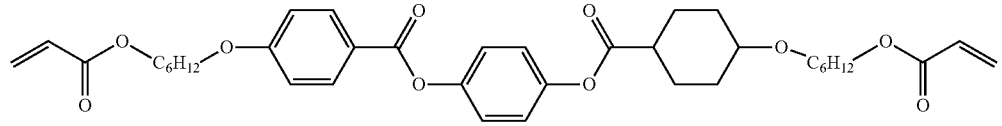
(LC-49)
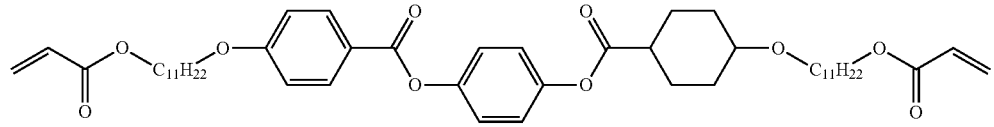
(LC-50)
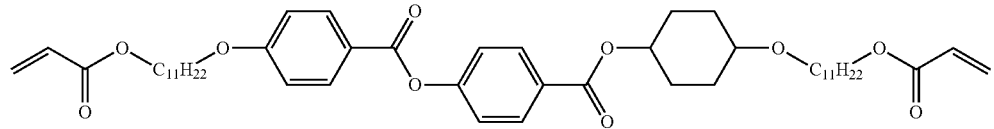
(LC-51)
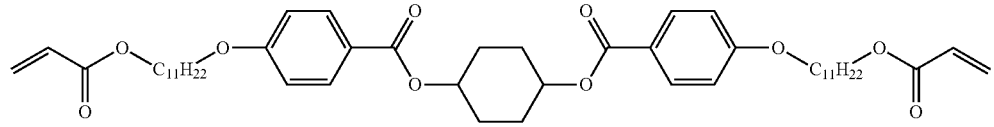
(LC-52)
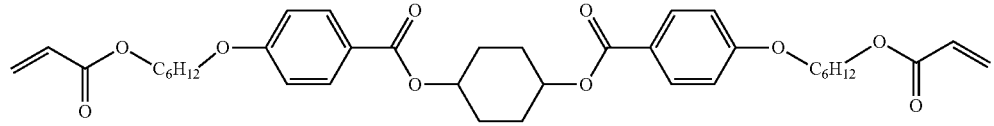
(LC-53)
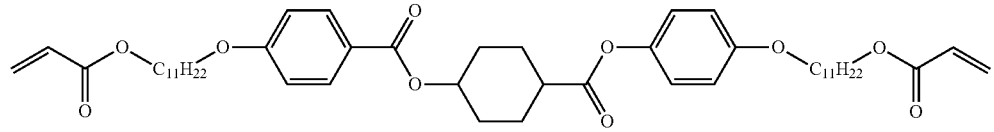
(LC-54)
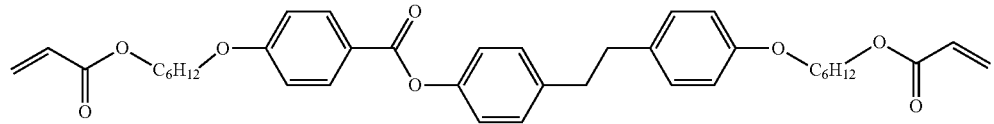
(LC-55)

-continued
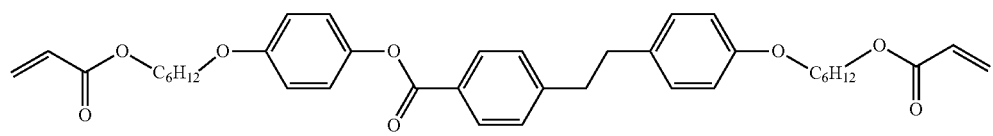
(LC-56)
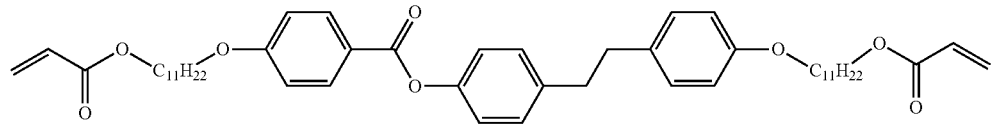
(LC-57)
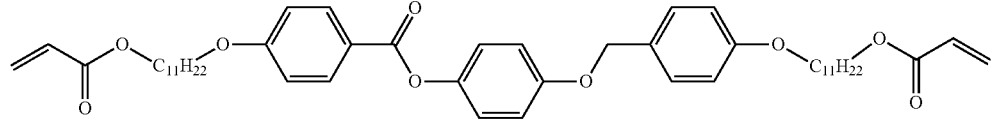
(LC-58)
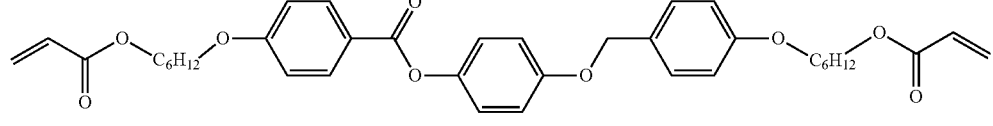
(LC-59)
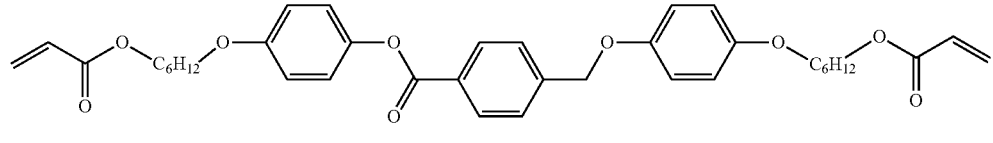
(LC-60)
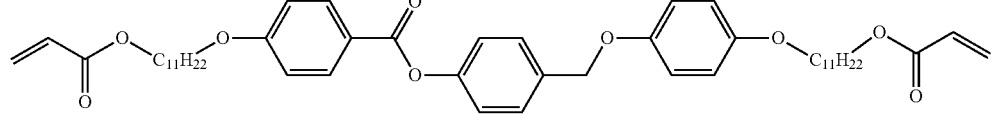
(LC-61)
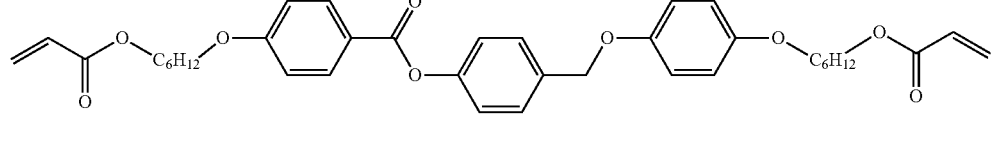
(LC-62)
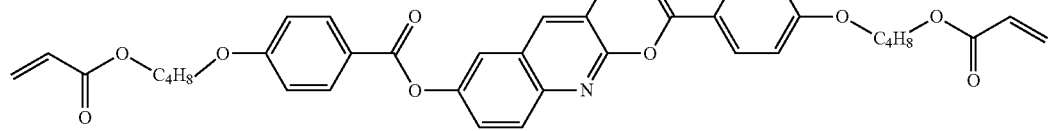
(LC-63)
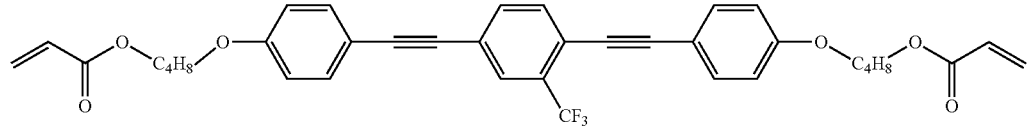
(LC-64)
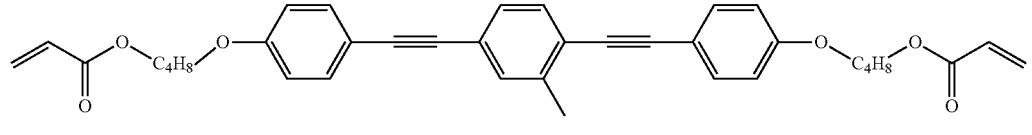
(LC-65)
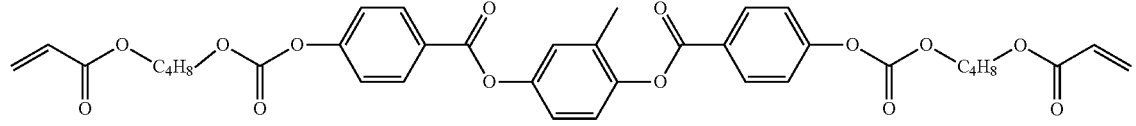
(LC-65)

-continued
(LC-66)
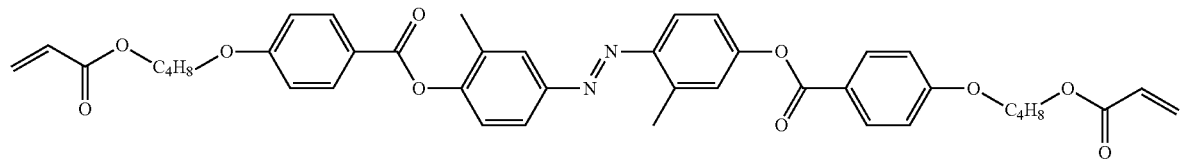
(LC-67)
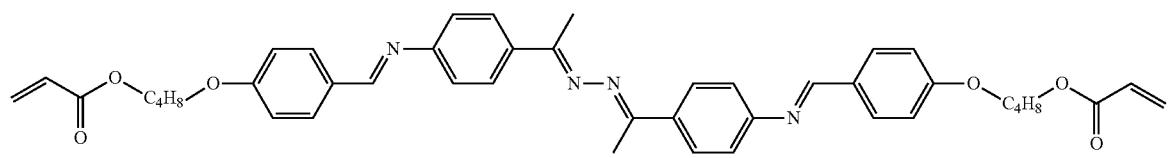
(LC-68)
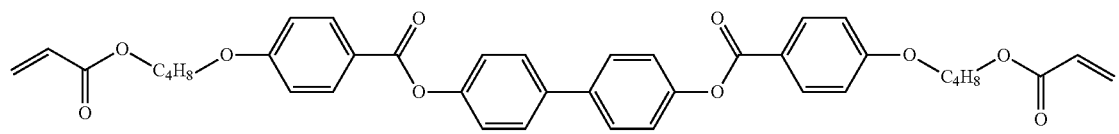
(LC-69)
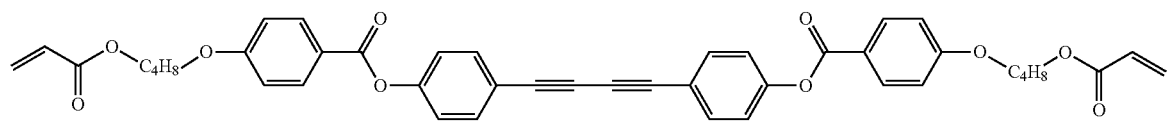
(LC-70)
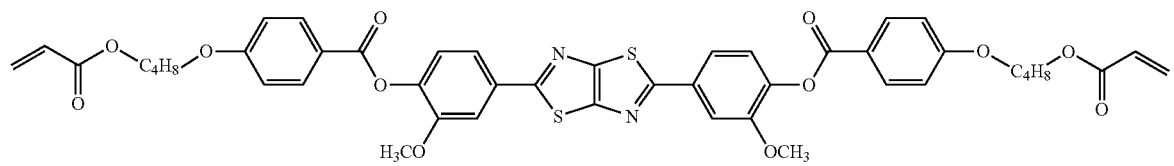
(LC-71)
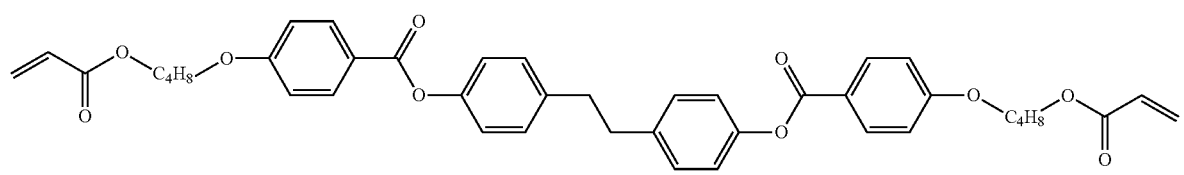
(LC-72)
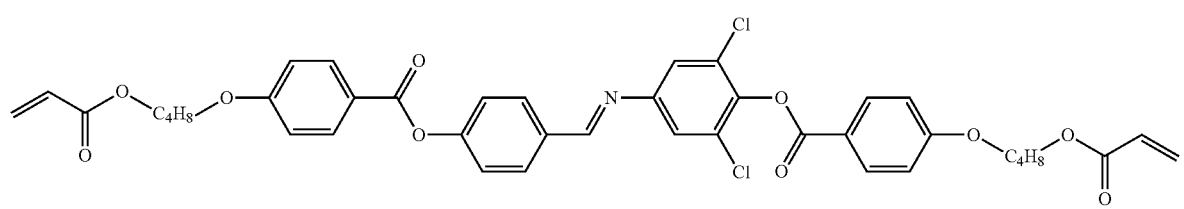
(LC-73)
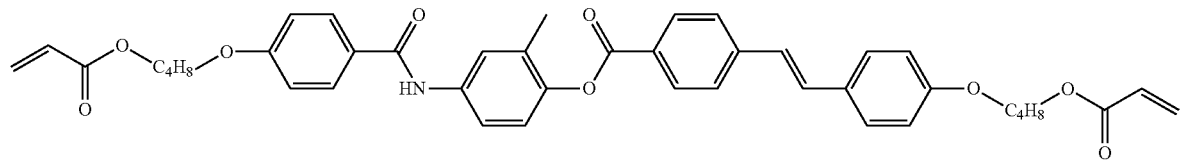

-continued

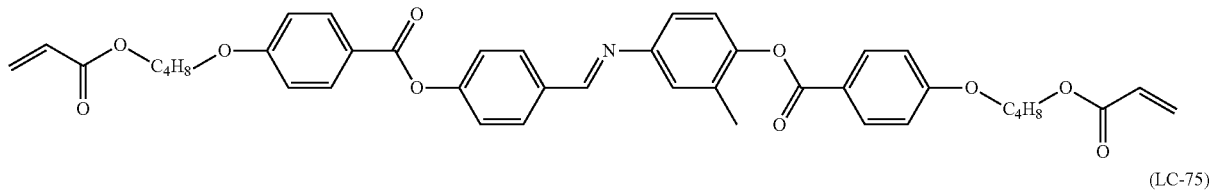
(LC-74)

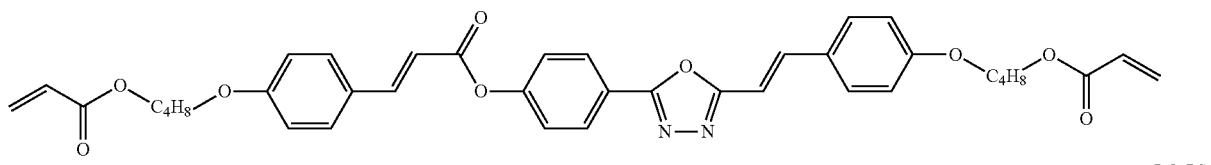
(LC-75)

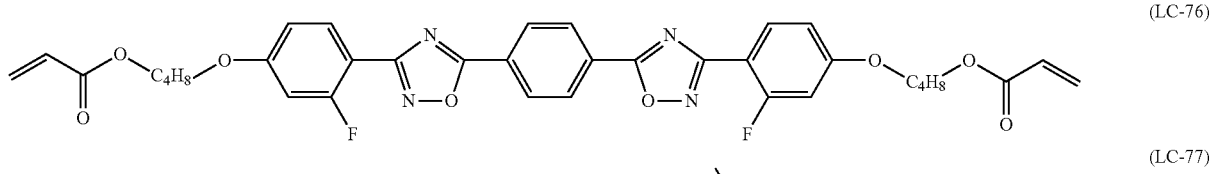
(LC-76)

(LC-77)

Polymer Liquid Crystal Compound

The polymer liquid crystal compound is preferably a homopolymer or a copolymner having a repeating unit described below, and may be any of a random polymer, a block polymer, a graft polymer, or a star polymer.

Repeating Unit (1)

It is preferable that the polymer liquid crystal compound has a repeating unit represented by Formula (1) (hereinafter, also referred to as "repeating unit (1)").

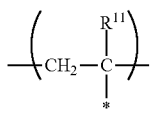
(1)

In Formula (1), PC1 represents a main chain of the repeating unit, L1 represents a single bond or a divalent linking group, SP1 represents a spacer group, MG1 represents a mesogen group MG in Formula (LC), and T1 represents a terminal group.

Examples of the main chain of the repeating unit represented by PC1 include groups represented by Formulae (P1-A) to (P1-D). Among these, from the viewpoints of diversity and handleability of a monomer serving as a raw material, a group represented by Formula (P1-A) is preferable.

(P1-A)

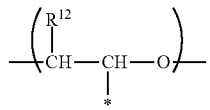

-continued (P1-B)

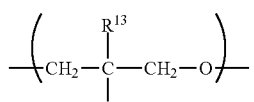

(P1-C)

(P1-D)

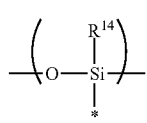

In Formulae (P1-A) to (P1-D), "*" represents a bonding position with respect to L1 in Formula (1). In Formulae (P1-A) to (P1-D), $R^{11}$, $R^{12}$, $R^{13}$, and $R^{14}$ each independently represent a hydrogen atom, a halogen atom, a cyano group, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

The divalent linking group represented by L1 is the same divalent linking group represented by LW in Formula (W1), and preferred embodiments thereof include —C(O)O—, —OC(O)—, —O—, —S—, —C(O)NR$^{16}$—, —NR$^{16}$C(O)—, —S(O)—, and —NR$^{16}$R$^{17}$—. In the formulae, R$^{16}$ and R$^{17}$ each independently represent a hydrogen atom or an alkyl group having 1 to 6 carbon atoms which may have a substituent (for example, the substituent W described above). In the specific examples of the divalent linking group described above, the bonding site on the left side is bonded to PC1 and the bonding site on the right side is bonded to SP1.

In a case where PC1 represents a group represented by Formula (P1-A), it is preferable that L1 represents a group represented by —C(O)O— or —C(O)NR$^{16}$—.

In a case where PC1 represents a group represented by any of Formulae (P1-B) to (P1-D), it is preferable that L1 represents a single bond.

Examples of the spacer group represented by SP1 are the same groups represented by S1 and S2 in Formula (LC), and from the viewpoint of the degree of alignment, a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. However, the alkylene group may contain —O—, —S—, —O—CO—, —CO—O—, —O—CO—O—, —O—CNR— (R represents an alkyl group having 1 to 10 carbon atoms), or —S(O)$_2$—.

From the viewpoints of easily exhibiting liquid crystallinity and the availability of raw materials, it is more preferable that the spacer group represented by SP1 is a group having at least one structure selected from the group consisting of an oxyethylene structure, an oxypropylene structure, a polysiloxane structure, and an alkylene fluoride structure.

Here, as the oxyethylene structure represented by SP1, a group represented by *—(CH$_2$—CH$_2$O)$_{n1}$—* is preferable. In the formula, n1 represents an integer of 1 to 20, and * represents a bonding position with respect to L1 or MG1. From the viewpoint that the effects of the present invention are more excellent, n1 represents preferably an integer of 2 to 10, more preferably an integer of 2 to 6, and most preferably an integer of 2 to 4.

Here, a group represented by *—(CH(CH$_3$)—CH$_2$O)$_{n2}$—* is preferable as the oxypropylene structure represented by SP1. In the formula, n2 represents an integer of 1 to 3, and * represents a bonding position with respect to L1 or MG1.

Further, a group represented by *—(Si(CH$_3$)$_2$—O)$_{n3}$—* is preferable as the polysiloxane structure represented by SP1. In the formula, n3 represents an integer of 6 to 10, and * represents a bonding position with respect to L1 or MG1.

Further, a group represented by *—(CF$_2$—CF$_2$)$_{n4}$—* is preferable as the alkylene fluoride structure represented by SP1. In the formula, n4 represents an integer of 6 to 10, and * represents a bonding position with respect to L1 or MG1.

Examples of the terminal group represented by T1 include a hydrogen atom, a halogen atom, a cyano group, a nitro group, a hydroxy group, —SH, a carboxyl group, a boronic acid group, —SO$_3$H—, —PO$_3$H$_2$—, —NR$^{11}$R$^{12}$ (here, R$^1$ and R$^{12}$ each independently represent a hydrogen atom, a substituted or unsubstituted alkyl group having 1 to 10 carbon atoms, a cycloalkyl group, or an aryl group), an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an acyloxy group having 1 to 10 carbon atoms, an acylamino group having 1 to 10 carbon atoms, an alkoxycarbonyl group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a crosslinkable group-containing group.

Examples of the crosslinkable group-containing group include -L-CL. L represents a single bond or a linking group. Specific examples of the linking group are the same groups represented by LW and SPW described above. CL represents a crosslinkable group, and examples thereof include a group represented by Q1 or Q2, and a group represented by Formulae (P-1) to (P-30) is preferable. Further, T1 may represent a group obtained by combining two or more of these groups.

From the viewpoint that the effects of the present invention are more excellent, T1 represents preferably an alkoxy group having 1 to 10 carbon atoms, more preferably an alkoxy group having 1 to 5 carbon atoms, and still more preferably a methoxy group. These terminal groups may be further substituted with these groups or the polymerizable groups described in JP2010-244038A.

From the viewpoint that the effects of the present invention are more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the degree of alignment of the light absorption anisotropic layer is further improved. Here, the "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

The content of the repeating unit (1) is preferably in a range of 40% to 100% by mass and more preferably in a range of 50% to 95% by mass with respect to all the repeating units (100% by mass) of the polymer liquid crystal compound. In a case where the content of the repeating unit (1) is 40% by mass or greater, an excellent light absorption anisotropic layer can be obtained due to satisfactory aligning properties. Further, in a case where the content of the repeating unit (1) is 100% by mass or less, an excellent light absorption anisotropic layer can be obtained due to satisfactory aligning properties.

The polymer liquid crystal compound may have only one or two or more kinds of the repeating units (1). In a case where the polymer liquid crystal compound has two or more kinds of repeating units (1), the content of the repeating unit (1) indicates the total content of the repeating units (1).

Log P Value

In Formula (1), a difference ($|\log P_1 - \log P_2|$) between the log P value of P1, L1, and SP1 (hereinafter, also referred to as "log $P_1$") and the log P value of M1 (hereinafter, also referred to as "log $P_2$") is 4 or greater. Further, from the viewpoint of further improving the degree of alignment of the light absorption anisotropic layer, the difference thereof is more preferably 4.25 or greater and still more preferably 4.5 or greater.

Further, from the viewpoints of adjusting the liquid crystal phase transition temperature and the synthetic suitability, the upper limit of the difference is preferably 15 or less, more preferably 12 or less, and still more preferably 10 or less.

Here, the log P value is an index for expressing the properties of the hydrophilicity and hydrophobicity of a chemical structure and is also referred to as a hydrophilic-hydrophobic parameter. The log P value can be calculated using software such as ChemBioDrawUltra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver. 4.1.07) is employed as the log P value unless otherwise specified.

The log Pt indicates the log P value of PC1, L1, and SP1 as described above. The "log P value of PC1, L1, and SP1" indicates the log P value of a structure in which PC1, L1, and SP1 are integrated and is not the sum of the log P values of PC1, L1, and SP1. Specifically, the log $P_1$ is calculated by inputting a series of structural formulae of PC1 to SP1 in Formula (1) into the above-described software.

Here, in the calculation of the log $P_1$, in regard to the part of the group represented by PC1 in the series of structural formulae of PC1 to SP1, the structure of the group itself represented by PC1 (for example, Formulae (P1-A) to (P1-D) described above) may be used or a structure of a group that can be PC1 after polymerization of a monomer used to obtain the repeating unit represented by Formula (1) may be used.

Here, specific examples of the latter (the group that can be PC1) are as follows. In a case where PC1 is obtained by polymerization of (meth)acrylic acid ester, PC1 represents a group represented by $CH_2=C(R^1)-$ ($R^1$ represents a hydrogen atom or a methyl group). Further, PC1 represents ethylene glycol in a case where PC1 is obtained by polymerization of ethylene glycol, and PC1 represents propylene glycol in a case where PC1 is obtained by polymerization of propylene glycol. Further, in a case where PC1 is obtained by polycondensation of silanol, PC1 represents silanol (a compound represented by Formula $Si(R^2)_3(OH)$, and a plurality of $R^2$'s each independently represent a hydrogen atom or an alkyl group, where at least one of the plurality of $R^2$'s represents an alkyl group).

The log $P_1$ may be smaller than the log $P_2$ or greater than the log $P_2$ in a case where the difference between log $P_1$ and log $P_2$ described above is 4 or greater.

Here, the log P value of a general mesogen group (the log $P_2$ described above) tends to be in a range of 4 to 6. In a case where the log $P_1$ is smaller than the log $P_2$, the value of log $P_1$ is preferably 1 or less and more preferably 0 or less. Further, in a case where the log $P_1$ is greater than the log $P_2$, the value of log $P_1$ is preferably 8 or greater and more preferably 9 or greater.

In a case where PC1 in Formula (1) is obtained by polymerization of (meth)acrylic acid ester and the log Pt is smaller than the log $P_2$, the log P value of SP1 in Formula (1) is preferably 0.7 or less and more preferably 0.5 or less. Further, in a case where PC1 in Formula (1) is obtained by polymerization of (meth)acrylic acid ester and the log $P_1$ is greater than the log $P_2$, the log P value of SP1 in Formula (1) is preferably 3.7 or greater and more preferably 4.2 or greater.

Further, examples of the structure having a log P value of 1 or less include an oxyethylene structure and an oxypropylene structure. Examples of the structure having a log P value of 6 or greater include a polysiloxane structure and an alkylene fluoride structure.

Repeating Units (21) and (22)

From the viewpoint of improving the degree of alignment, it is preferable that the polymer liquid crystal compound has a repeating unit having an electron-donating property and/or an electron-withdrawing property at the terminal. More specifically, it is more preferable that the side-chain type polymer liquid crystal compound has a repeating unit (21) containing a mesogen group and an electron-withdrawing group present at the terminal of the mesogen group and having a σp value of greater than 0 and a repeating unit (22) containing a mesogen group and a group present at the terminal of the mesogen group and having a σp value of 0 or less. As described above, in a case where the polymer liquid crystal compound has the repeating unit (21) and the repeating unit (22), the degree of alignment of the light absorption anisotropic layer to be formed using the polymer liquid crystal compound is further improved as compared with a case where the polymer liquid crystal compound has only one of the repeating unit (21) or the repeating unit (22). The details of the reason for this are not clear, but it is assumed as follows.

That is, it is assumed that since the opposite dipole moments generated in the repeating unit (21) and the repeating unit (22) interact between molecules, the interaction between the mesogen groups in the minor axis direction is strengthened, and the orientation in which the liquid crystals are aligned is more uniform, and as a result, the degree of order of the liquid crystals is considered to be high. In this manner, it is assumed that the aligning properties of the dichroic substance are enhanced, and thus the degree of alignment of the light absorption anisotropic layer to be formed increases.

Further, the repeating units (21) and (22) may be the repeating units represented by Formula (1).

The repeating unit (21) contains a mesogen group and an electron-withdrawing group present at the terminal of the mesogen group and having a σp value of greater than 0.

The electron-withdrawing group is a group that is positioned at the terminal of the mesogen group and has a σp value of greater than 0. Examples of the electron-withdrawing group (a group having a σp value of greater than 0) include a group represented by EWG in Formula (LCP-21) described below, and specific examples thereof are also the same as those described below.

The σp value of the electron-withdrawing group described above is greater than 0. From the viewpoint of further increasing the degree of alignment of the light absorption anisotropic layer, the σp value is preferably 0.3 or greater and more preferably 0.4 or greater. From the viewpoint that the uniformity of alignment is excellent, the upper limit of the σp value of the electron-withdrawing group is preferably 1.2 or less and more preferably 1.0 or less.

The σp value is a Hammett's substituent constant σp value (also simply referred to as "σp value") and is a parameter showing the intensity of the electron-donating property and the electron-withdrawing property of a substituent, which numerically expresses the effect of the substituent on the acid dissociation equilibrium constant of substituted benzoic acid. The Hammett's substituent constant σp value in the present specification indicates the substituent constant σ in a case where the substituent is positioned at the para position of benzoic acid.

As the Hammett's substituent constant σp value of each group in the present specification, the values described in the document "Hansch et al., Chemical Reviews, 1991, Vol, 91, No. 2, pp. 165 to 195" are employed. Further, the Hammett's substituent constant σp values can be calculated for groups whose Hammett's substituent constant σp values are not described in the document described above using software "ACD/ChemSketch (ACD/Labs 8.00 Release Product Version: 8.08)" based on a difference between the pKa of benzoic acid and the pKa of a benzoic acid derivative having a substituent at the para position.

The repeating unit (21) is not particularly limited as long as the repeating unit (21) contains, at a side chain thereof, a mesogen group and an electron-withdrawing group present at the terminal of the mesogen group and having a σp value of greater than 0, and from the viewpoint of further increasing the degree of alignment of the light absorption anisotropic layer, it is preferable that the repeating unit (21) is a repeating unit represented by Formula (LCP-21).

(LCP-21)

In Formula (LCP-21), PC21 represents the main chain of the repeating unit and more specifically the same structure as that for PC1 in Formula (1), L21 represents a single bond or a divalent linking group and more specifically the same structure as that for L1 in Formula (1), SP21A and SP21B each independently represent a single bond or a spacer group and more specifically the same structure as that for SP1 in Formula (1), MG21 represents a mesogen structure and more specifically a mesogen group MG in Formula (LC), and EWG represents an electron-withdrawing group having a σp value of greater than 0.

Examples of the spacer group represented by SP21A and SP21B are those represented by Formulae S1 and S2, and a group having at least one structure selected from the group consisting of an oxyethylene structure, an oxypropylene structure, a polysiloxane structure, and an alkylene fluoride structure or a linear or branched alkylene group having 2 to 20 carbon atoms is preferable. Here, the alkylene group may contain —O—, —O—CO—, —CO—O—, or —O—CO—O—.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

It is preferable that SP21B represents a single bond or a linear or branched alkylene group having 2 to 20 carbon atoms. Here, the alkylene group may contain —O—, —O—CO—, —CO—O—, or —O—CO—O—.

Among these, from the viewpoint of further increasing the degree of alignment of the light absorption anisotropic layer, a single bond is preferable as the spacer group represented by SP21B. In other words, it is preferable that the repeating unit (21) has a structure in which EWG that represents an electron-withdrawing group in Formula (LCP-21) is directly linked to MG21 that represents a mesogen group in Formula (LCP-21). In this manner, it is assumed that in a case where the electron-withdrawing group is directly linked to the mesogen group, the intermolecular interaction due to an appropriate dipole moment works more effectively in the polymer liquid crystal compound, and the orientation in which the liquid crystals are aligned is more uniform, and as a result, the degree of order of the liquid crystals and the degree of alignment are considered to be high.

EWG represents an electron-withdrawing group having a σp value of greater than 0. Examples of the electron-withdrawing group having a σp value of greater than 0 includes an ester group (specifically, a group represented by *—C(O)O—R$^E$), a (meth)acryloyl group, a (meth)acryloyloxy group, a carboxy group, a cyano group, a nitro group, a sulfo group, —S(O)(O)—OR$^E$, —S(O)(O)—R$^E$, —O—S(O)(O)—R$^E$, an acyl group (specifically, a group represented by *—C(O)R$^E$), an acyloxy group (specifically, a group represented by *—OC(O)R$^E$), an isocyanate group (—N=C(O)), *—C(O)N(R$^F$)$_2$, a halogen atom, and an alkyl group substituted with any of these groups (preferably having 1 to 20 carbon atoms). In each of the above-described groups, * represents a bonding position with respect to SP21B. R$^E$ represents an alkyl group having 1 to 20 carbon atoms (preferably 1 to 4 carbon atoms and more preferably 1 or 2 carbon atoms). R$^F$'s each independently represents a hydrogen atom or an alkyl group having 1 to 20 carbon atoms (preferably 1 to 4 carbon atoms and more preferably 1 or 2 carbon atoms).

Among the above-described groups, from the viewpoint of further exhibiting the effects of the present invention, it is preferable that EWG represents a group represented by *—C(O)O—R$^E$, a (meth)acryloyloxy group, a cyano group, or a nitro group.

From the viewpoint that the polymer liquid crystal compound and the dichroic substance can be uniformly aligned while a high degree of alignment of the light absorption anisotropic layer is maintained, the content of the repeating unit (21) is preferably 60% by mass or less, more preferably 50% by mass or less, and particularly preferably 45% by mass or less with respect to all the repeating units (100% by mass) of the polymer liquid crystal compound.

From the viewpoint of further exhibiting the effects of the present invention, the lower limit of the content of the repeating unit (21) is preferably 1% by mass or greater and more preferably 3% by mass or greater with respect to all the repeating units (100% by mass) of the polymer liquid crystal compound.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (21). In a case where the polymer liquid crystal compound has two or more kinds of repeating units (21), there is an advantage in that the solubility of the polymer liquid crystal compound in a solvent is improved and the liquid crystal phase transition temperature is easily adjusted. In the case where the polymer liquid crystal compound has two or more kinds of repeating units (21), it is preferable that the total amount thereof is in the above-described range.

In the case where the polymer liquid crystal compound has two or more kinds of repeating units (21), a repeating unit (21) that does not contain a crosslinkable group in EWG and a repeating unit (21) that contains a polymerizable group in EWG may be used in combination. In this manner, the curability of the light absorption anisotropic layer is further improved. Further, preferred examples of the crosslinkable group include a vinyl group, a butadiene group, a (meth) acryl group, a (meth)acrylamide group, a vinyl acetate group, a fumaric acid ester group, a styryl group, a vinylpyrrolidone group, a maleic acid anhydride group, a maleimide group, a vinyl ether group, an epoxy group, and an oxetanyl group.

In this case, from the viewpoint of the balance between the curability and the degree of alignment of the light absorption anisotropic layer, the content of the repeating unit (21) containing a polymerizable group in EWG is preferably in a range of 1% to 30% by mass with respect to all the repeating units (100% by mass) of the polymer liquid crystal compound.

Hereinafter, examples of the repeating unit (21) will be described, but the repeating unit (21) is not limited to the following repeating units.

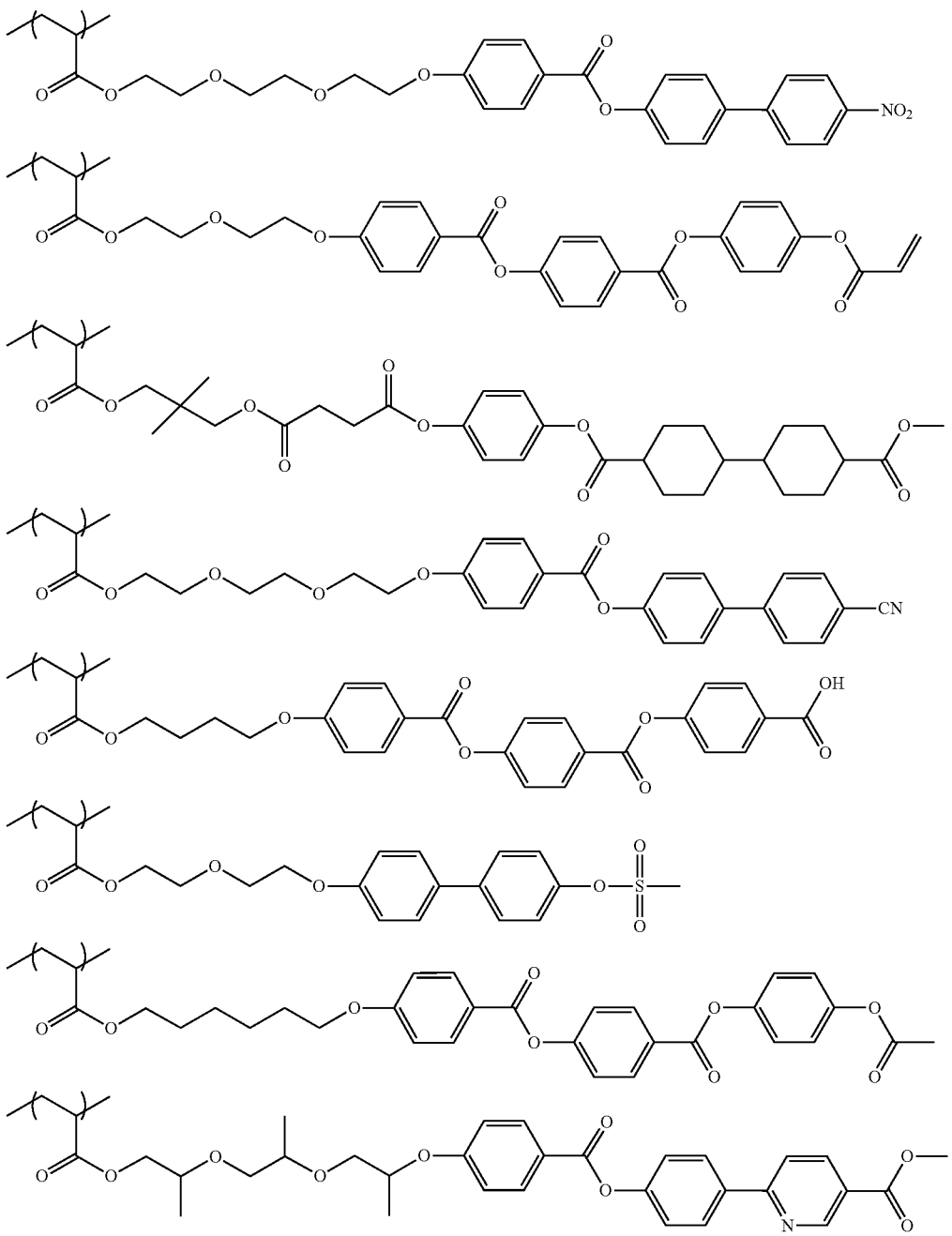

-continued
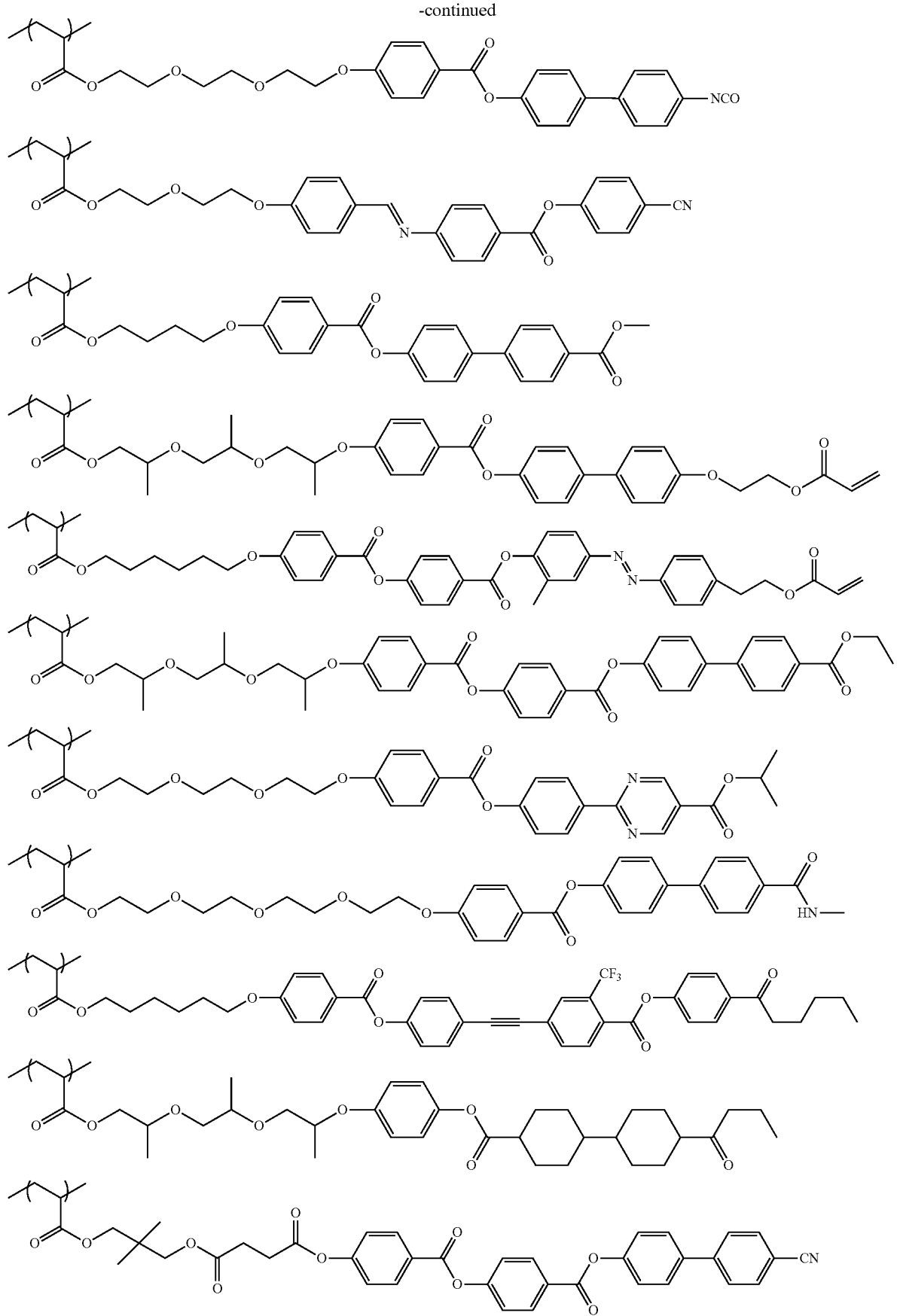

-continued

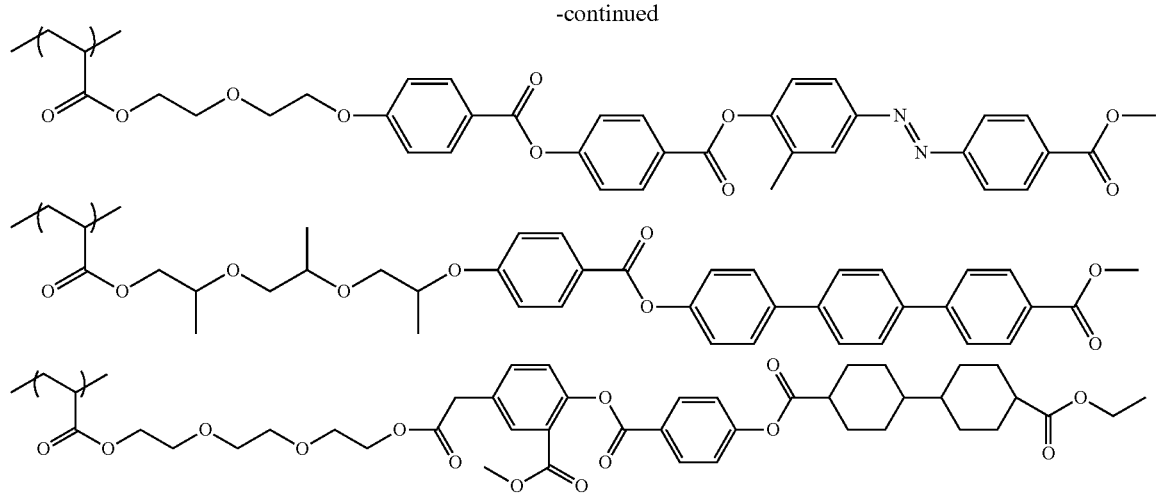

As a result of intensive examination on the composition (content ratio) and the electron-donating property and the electron-withdrawing property of the terminal groups of the repeating unit (21) and the repeating unit (22), the present inventors found that the degree of alignment of the light absorption anisotropic layer is further increased by decreasing the content ratio of the repeating unit (21) in a case where the electron-withdrawing property of the electron-withdrawing group of the repeating unit (21) is high (that is, in a case where the σp value is large), and the degree of alignment of the light absorption anisotropic layer is further increased by increasing the content ratio of the repeating unit (21) in a case where the electron-withdrawing property of the electron-withdrawing group of the repeating unit (21) is low (that is, in a case where the σp value is close to 0).

The details of the reason for this are not clear, but it is assumed as follows. That is, it is assumed that since the intermolecular interaction due to an appropriate dipole moment works in the polymer liquid crystal compound, the orientation in which the liquid crystals are aligned is more uniform, and as a result, the degree of order of the liquid crystals and the degree of alignment of the light absorption anisotropic layer are considered to be high.

Specifically, the product of the σp value of the electron-withdrawing group (EWG in Formula (LCP-21)) in the repeating unit (21) and the content ratio (on a mass basis) of the repeating unit (21) in the polymer liquid crystal compound is preferably in a range of 0.020 to 0.150, more preferably in a range of 0.050 to 0.130, and particularly preferably in a range of 0.055 to 0.125. In a case where the product is in the above-described range, the degree of alignment of the light absorption anisotropic layer is further increased.

The repeating unit (22) contains a mesogen group and a group present at the terminal of the mesogen group and having a σp value of 0 or less. In a case where the polymer liquid crystal compound has the repeating unit (22), the polymer liquid crystal compound and the dichroic substance can be uniformly aligned.

The mesogen group is a group showing the main skeleton of a liquid crystal molecule that contributes to liquid crystal formation, and the details thereof are as described in the section of MG in Formula (LCP-22) described below, and specific examples thereof are also the same as described below.

The above-described group is positioned at the terminal of the mesogen group and has a σp value of 0 or less. Examples of the above-described group (a group having a σp value of 0 or less) includes a hydrogen atom having a σp value of 0 and a group (electron-donating group) having a σp value of less than 0 and represented by T22 in Formula (LCP-22). Among the above-described groups, specific example of the group having a σp value of less than 0 (electron-donating group) are the same as those for T22 in Formula (LCP-22) described below.

The σp value of the above-described group is 0 or less, and from the viewpoint that the uniformity of alignment is more excellent, the σp value is preferably less than 0, more preferably −0.1 or less, and particularly preferably −0.2 or less. The lower limit of the σp value of the above-described group is preferably −0.9 or greater and more preferably −0.7 or greater.

The repeating unit (22) is not particularly limited as long as the repeating unit (22) contains, at a side chain thereof, a mesogen group and a group present at the terminal of the mesogen group and having a σp value of 0 or less, and from the viewpoint of further increasing the uniformity of alignment of liquid crystals, it is preferable that the repeating unit (22) is a repeating unit represented by Formula (PCP-22) which does not correspond to a repeating unit represented by Formula (LCP-21).

(LCP-22)

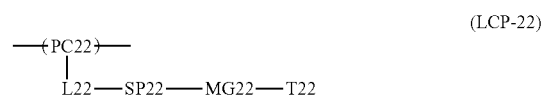

In Formula (LCP-22), PC22 represents the main chain of the repeating unit and more specifically the same structure as that for PC1 in Formula (1), L22 represents a single bond or a divalent linking group and more specifically the same structure as that for L1 in Formula (1), SP22 represents a spacer group and more specifically the same structure as that for SP1 in Formula (1), MG22 represents a mesogen structure and more specifically the same structure as the mesogen group MG in Formula (LC), and T22 represents an electron-donating group having a Hammett's substituent constant σp value of less than 0.

T22 represents an electron-donating group having a σp value of less than 0. Examples of the electron-donating group having a σp value of less than 0 include a hydroxy group, an alkyl group having 1 to 10 carbon atoms, an alkoxy group having 1 to 10 carbon atoms, and an alkylamino group having 1 to 10 carbon atoms.

In a case where the number of atoms in the main chain of T22 is 20 or less, the degree of alignment of the light absorption anisotropic layer is further improved. Here, the "main chain" in T22 indicates the longest molecular chain bonded to MG22, and the number of hydrogen atoms is not included in the number of atoms in the main chain of T22. For example, the number of atoms in the main chain is 4 in a case where T22 represents an n-butyl group, and the number of atoms in the main chain is 3 in a case where T22 represents a sec-butyl group.

Hereinafter, examples of the repeating unit (22) will be described, but the repeating unit (22) is not limited to the following repeating units.

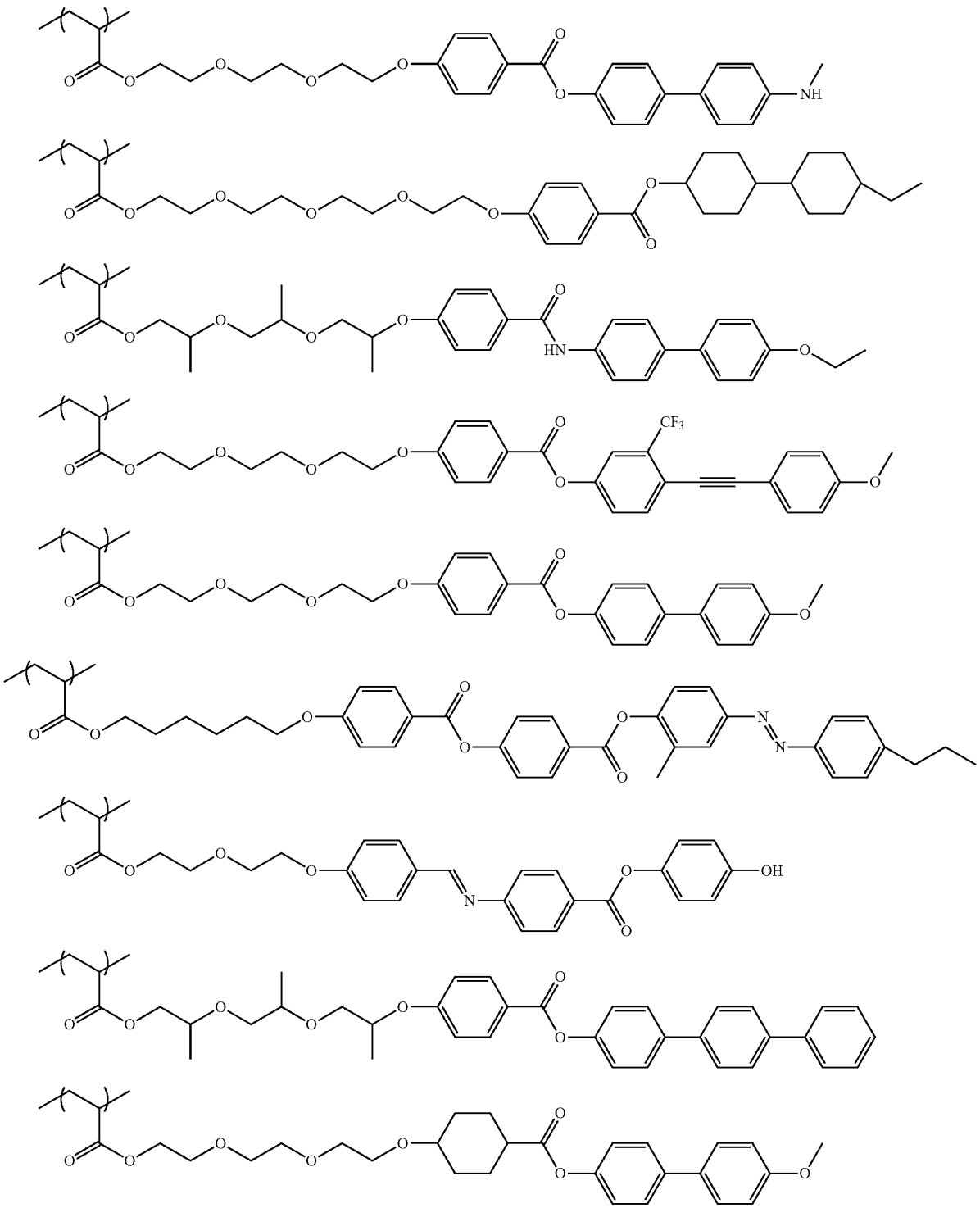

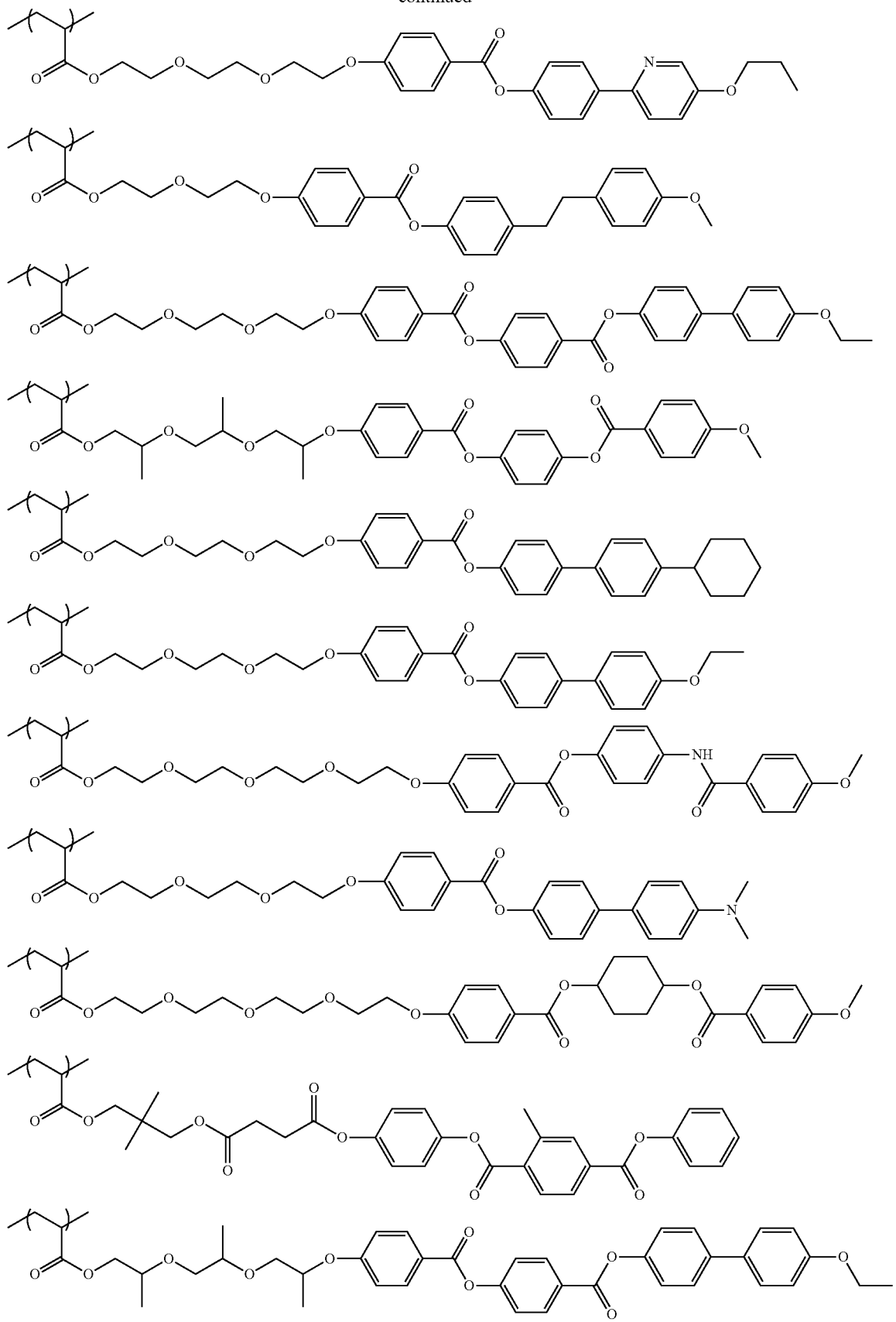

It is preferable that the structures of the repeating unit (21) and the repeating unit (22) have a part in common. It is assumed that the liquid crystals are uniformly aligned as the structures of repeating units are more similar to each other. In this manner, the degree of alignment of the light absorption anisotropic layer is further improved.

Specifically, from the viewpoint of further increasing the degree of alignment of the light absorption anisotropic layer, it is preferable to satisfy at least one of a condition that SP21A of Formula (LCP-21) has the same structure as that for SP22 of Formula (LCP-22), a condition that MG21 of Formula (LCP-21) has the same structure as that for MG22 of Formula (LCP-22), or a condition that L21 of Formula (LCP-21) has the same structure as that for L22 of Formula (LCP-22), more preferable to satisfy two or more of the conditions, and particularly preferable to satisfy all the conditions.

From the viewpoint that the uniformity of alignment is excellent, the content of the repeating unit (22) is preferably 50%/by mass or greater, more preferably 55% or greater, and particularly preferably 60% or greater with respect to all the repeating units (100% by mass) of the polymer liquid crystal compound.

From the viewpoint of improving the degree of alignment, the upper limit of the content of the repeating unit (22) is preferably 99% by mass or less and more preferably 97% by mass with respect to all the repeating units (100% by mass) of the polymer liquid crystal compound.

The polymer liquid crystal compound may have only one or two or more kinds of repeating units (22). In a case where the polymer liquid crystal compound has two or more kinds of repeating units (22), there is an advantage in that the solubility of the polymer liquid crystal compound in a solvent is improved and the liquid crystal phase transition temperature is easily adjusted. In a case where the polymer liquid crystal compound has two or more kinds of repeating units (22), it is preferable that the total amount thereof is in the above-described range.

Repeating Unit (3)

From the viewpoint of improving the solubility in a general-purpose solvent, the polymer liquid crystal compound may have a repeating unit (3) that does not contain a mesogen group. Particularly in order to improve the solubility while suppressing a decrease in the degree of alignment, it is preferable that the side-chain type polymer liquid crystal compound has a repeating unit having a molecular weight of 280 or less as the repeating unit (3) that does not contain a mesogen group. As described above, the reason why the solubility is improved while a decrease in the degree of alignment is suppressed by allowing the side-chain type polymer liquid crystal compound to have a repeating unit having a molecular weight of 280 or less which does not contain a mesogen group is assumed as follows.

That is, it is considered that in a case where the polymer liquid crystal compound has a repeating unit (3) that does not contain a mesogen group in a molecular chain thereof, since a solvent is likely to enter the polymer liquid crystal compound, the solubility is improved, but the degree of alignment is decreased in the case of the non-mesogenic repeating unit (3). However, it is assumed that since the molecular weight of the repeating unit is small, the alignment of the repeating unit (1), the repeating unit (21), or the repeating unit (22) containing a mesogen group is unlikely to be disturbed, and thus a decrease in the degree of alignment can be suppressed.

It is preferable that the repeating unit (3) is a repeating unit having a molecular weight of 280 or less.

The molecular weight of the repeating unit (3) does not indicates the molecular weight of the monomer used to obtain the repeating unit (3), but indicates the molecular weight of the repeating unit (3) in a state of being incorporated into the polymer liquid crystal compound by polymerization of the monomer.

The molecular weight of the repeating unit (3) is 280 or less, preferably 180 or less, and more preferably 100 or less. The lower limit of the molecular weight of the repeating unit (3) is commonly 40 or greater and more preferably 50 or greater. In a case where the molecular weight of the repeating unit (3) is 280 or less, a light absorption anisotropic layer having excellent solubility of the polymer liquid crystal compound and a high degree of alignment can be obtained.

Further, in a case where the molecular weight of the repeating unit (3) is greater than 280, the alignment of the liquid crystals in the portion of the repeating unit (1), the repeating unit (21), or the repeating unit (22) is disturbed, and thus the degree of alignment is decreased. Further, since the solvent is unlikely to enter the polymer liquid crystal compound, the solubility of the polymer liquid crystal compound is decreased.

Specific examples of the repeating unit (3) include a repeating unit (hereinafter, also referred to as "repeating unit (3-1)") that does not contain a crosslinkable group (for example, an ethylenically unsaturated group) and a repeating unit (hereinafter, also referred to as "repeating unit (3-2)") that contains a crosslinkable group.

Repeating Unit (3-1)

Specific examples of the monomer used for polymerization of the repeating unit (3-1) include acrylic acid [72.1], α-alkylacrylic acids (such as methacrylic acid [86.1] and itaconic acid [130.1]), esters and amides derived therefrom (such as N-i-propylacrylamide [113.2], N-n-butylacrylamide [127.2], N-t-butylacrylamide [127.2], N,N-dimethylacrylamide [99.1], N-methylmethacrylamide [99.1], acrylamide [71.1], methacrylamide [85.1], diacetoneacrylamide [169.2], acryloylmorpholine [141.2], N-methylol acrylamide [101.1], N-methylol methacrylamide [115.1], methyl acrylate [86.0], ethyl acrylate [100.1], hydroxyethyl acrylate [116.1], n-propyl acrylate [114.1], i-propyl acrylate [114.2], 2-hydroxypropyl acrylate [130.1], 2-methyl-2-nitropropyl acrylate [173.2], n-butyl acrylate [128.2], i-butyl acrylate [128.2], t-butyl acrylate [128.2], t-pentyl acrylate [142.2], 2-methoxyethyl acrylate [130.1], 2-ethoxyethyl acrylate [144.2], 2-ethoxyethoxyethyl acrylate [188.2], 2,2,2-trifluoroethyl acrylate [154.1], 2,2-dimethylbutyl acrylate [156.2], 3-methoxybutyl acrylate [158.2], ethyl carbitol acrylate [188.2], phenoxyethyl acrylate [192.2], n-pentyl acrylate [142.2], n-hexyl acrylate [156.2], cyclohexyl acrylate [154.2], cyclopentyl acrylate [140.2], benzyl acrylate [162.2], n-octyl acrylate [184.3], 2-ethylhexyl acrylate [184.3], 4-methyl-2-propylpentyl acrylate [198.3], methyl methacrylate [100.1], 2,2,2-trifluoroethyl methacrylate [168.1], hydroxyethyl methacrylate [130.1], 2-hydroxypropyl methacrylate [144.2], n-butyl methacrylate [142.2], i-butyl methacrylate [142.2], sec-butyl methacrylate [142.2], n-octyl methacrylate [198.3], 2-ethylhexyl methacrylate [198.3], 2-methoxyethyl methacrylate [144.2], 2-ethoxyethyl methacrylate [158.2], benzyl methacrylate [176.2], 2-norbornyl methyl methacrylate [194.3], 5-norbornen-2-ylmethyl methacrylate [194.3], and dimethylaminoethyl methacrylate [157.2]), vinyl esters (such as vinyl acetate [86.1]), esters derived from maleic acid or fumaric acid (such as dimethyl maleate [144.1] and diethyl fumarate [172.2]), maleimides (such as N-phenylmaleimide [173.2]), maleic acid [116.1], fumaric acid [116.1], p-styrenesulfonic acid [184.1], acrylonitrile [53.1], methacrylonitrile [67.1], dienes (such as butadiene [54.1], cyclopentadiene [66.1], and isoprene [68.1]), aromatic vinyl compounds (such as styrene [104.2], p-chlorostyrene [138.6], t-butylstyrene [160.3], and (-methylstyrene [118.2]), N-vinylpyrrolidone [111.1], N-vinyloxazolidone [113.1], N-vinyl succinimide [125.1], N-vinylformamide [71.1], N-vinyl-N-methylformamide [85.1], N-vinylacetamide [85.1], N-vinyl-N-methylacetamide [99.1], 1-vinylimidazole [94.1], 4-vinylpyridine [105.2], vinylsulfonic acid [108.1], sodium vinyl sulfonate [130.2], sodium allyl sulfonate [144.1], sodium methallyl sulfonate [158.2], vinylidene chloride [96.9], vinyl alkyl ethers (such as methyl vinyl ether [58.1]), ethylene [28.0], propylene [42.1], 1-butene [56.1], and isobutene [56.1]. Further, the numerical values in the parentheses indicate the molecular weights of the monomers.

The above-described monomers may be used alone or in combination of two or more kinds thereof.

Among the above-described monomers, acrylic acid, α-alkylacrylic acids, esters and amides derived therefrom, acrylonitrile, methacrylonitrile, and aromatic vinyl compounds are preferable.

As monomers other than the above-described monomers, the compounds described in Research Disclosure No. 1955 (July, 1980) can be used.

Hereinafter, specific examples of the repeating unit (3-1) and the molecular weights thereof will be described, but the present invention is not limited to these specific examples.

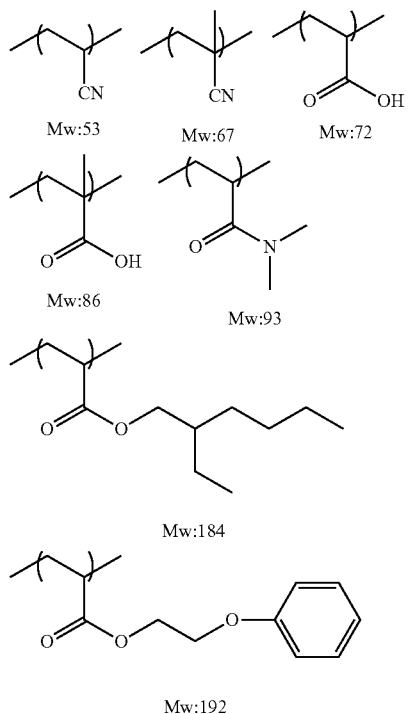

Repeating Unit (3-2)

Specific examples of the crosslinkable group in the repeating unit (3-2) include the groups represented by Formulae (P-1) to (P-30). Among these, a vinyl group, a butadiene group, a (meth)acryl group, a (meth)acrylamide group, a vinyl acetate group, a fumaric acid ester group, a styryl group, a vinylpyrrolidone group, a maleic acid anhydride group, a maleimide group, a vinyl ether group, an epoxy group, and an oxetanyl group are more preferable.

From the viewpoint of easily performing polymerization, it is preferable that the repeating unit (3-2) is a repeating unit represented by Formula (3).

(3)

In Formula (3), PC32 represents the main chain of the repeating unit and more specifically the same structure as that for PC1 in Formula (1), L32 represents a single bond or a divalent linking group and more specifically the same structure as that for L1 in Formula (1), and P32 represents a crosslinkable group represented by any of Formulae (P-1) to (P-30).

Hereinafter, specific examples of the repeating unit (3-2) and the weight-average molecular weights (Mw) thereof will be described, but the present invention is not limited to these specific examples.

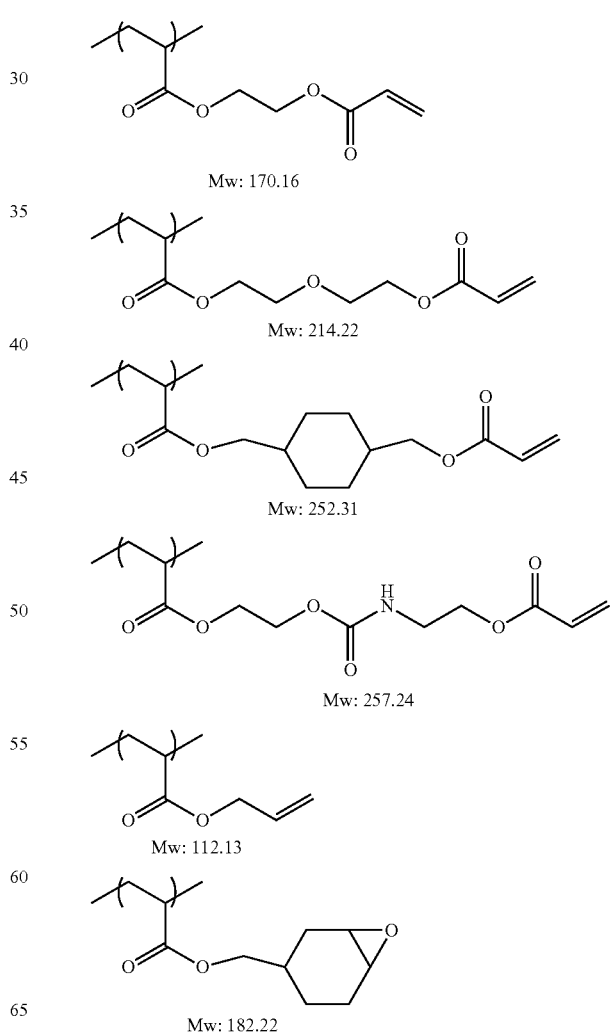

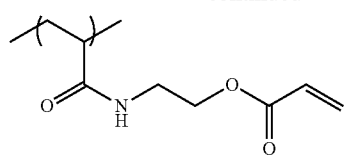
Mw: 189.18

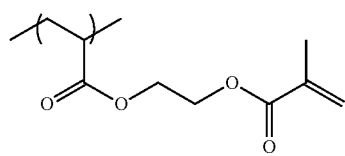
Mw: 184.19

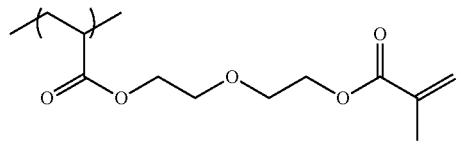
Mw: 228.24

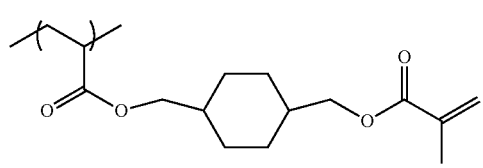
Mw: 226.34

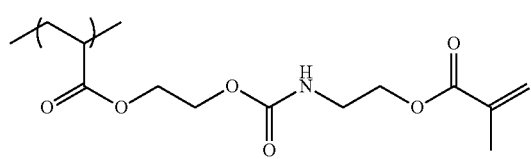
Mw: 271.27

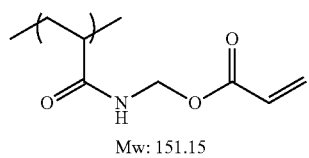
Mw: 151.15

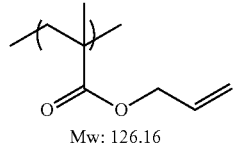
Mw: 126.16

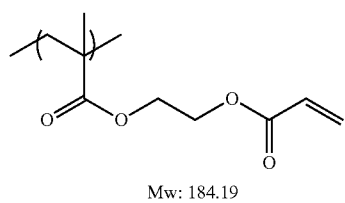
Mw: 184.19

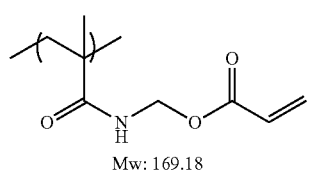
Mw: 169.18

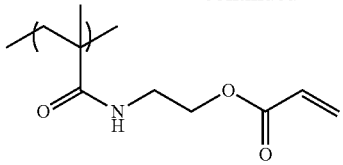
Mw: 183.21

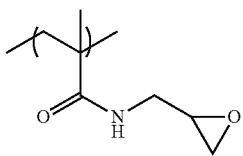
Mw: 142.15

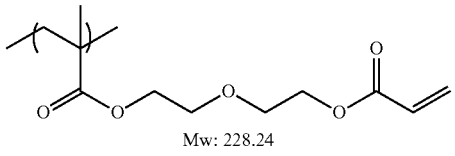
Mw: 228.24

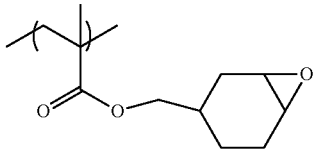
Mw: 196.25

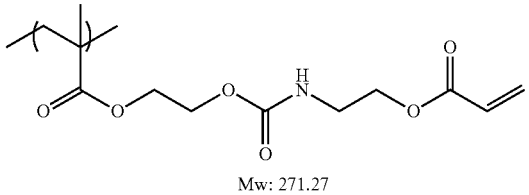
Mw: 271.27

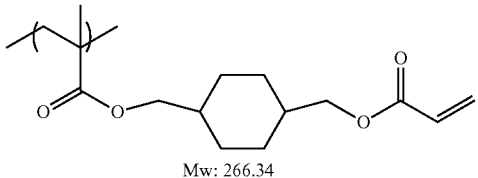
Mw: 266.34

The content of the repeating unit (3) is less than 14% by mass, preferably 7% by mass or less, and more preferably 5% by mass or less with respect to all the repeating units (100% by mass) of the polymer liquid crystal compound. The content of the repeating unit (3) is preferably 2% by mass or greater and more preferably 3% by mass or greater with respect to all the repeating units (100% by mass) of the polymer liquid crystal compound. In a case where the content of the repeating unit (3) is less than 14% by mass, the degree of alignment of the light absorption anisotropic layer is further improved. In a case where the content of the repeating unit (3) is 2% by mass or greater, the solubility of the polymer liquid crystal compound is further improved.

The polymer liquid crystal compound may have only one or two or more kinds of repeating units (3). In a case where the polymer liquid crystal compound has two or more kinds of repeating units (3), it is preferable that the total amount thereof is in the above-described range.

Repeating Unit (4)

From the viewpoint of improving the adhesiveness and planar uniformity, the polymer liquid crystal compound may have a repeating unit (4) having a flexible structure with a long molecular chain (SP4 in Formula (4) described below). The reason for this is assumed as follows.

That is, in a case where the polymer liquid crystal compound has such a flexible structure having a long molecular chain, entanglement of the molecular chains constituting the polymer liquid crystal compound is likely to occur, and aggregation destruction of the light absorption anisotropic layer (specifically, destruction of the light absorption anisotropic layer) is suppressed. As a result, the adhesiveness between the light absorption anisotropic layer and the underlying layer (for example, the base material or the alignment film) is assumed to be improved. Further, it is considered that a decrease in planar uniformity occurs due to the low compatibility between the dichroic substance and the polymer liquid crystal compound. That is, it is considered that in a case where the compatibility between the dichroic substance and the polymer liquid crystal compound is not sufficient, a planar defect (alignment defect) having the dichroic substance to be precipitated as a nucleus occurs. Meanwhile, it is assumed that in the case where the polymer liquid crystal compound has such a flexible structure having a long molecular chain, a light absorption anisotropic layer in which precipitation of the dichroic substance is suppressed and the planar uniformity is excellent is obtained. Here, the expression "planar uniformity is excellent" denotes that the alignment defect occurring in a case where the liquid crystal composition containing the polymer liquid crystal compound is repelled on the underlayer (for example, the base material or the alignment film) is less likely to occur.

The repeating unit (4) is a repeating unit represented by Formula (4).

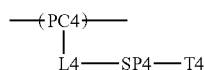
(4)

In Formula (4), PC4 represents the main chain of the repeating unit and more specifically the same structure as that for PC1 in Formula (1), L4 represents a single bond or a divalent linking group and more specifically the same structure as that for L1 in Formula (1) (preferably a single bond), SP4 represents an alkylene group having 10 or more atoms in the main chain, and T4 represents a terminal group and more specifically the same group as that for T1 in Formula (1).

Specific examples and preferred embodiments of PC4 are the same as those for PC1 in Formula (1), and thus description thereof will not be repeated.

From the viewpoint of further exhibiting the effects of the present invention, it is preferable that L4 represents a single bond.

In Formula (4), SP4 represents an alkylene group having 10 or more atoms in the main chain. Here, one or more of —$CH_2$-'s constituting the alkylene group represented by SP4 may be substituted with "SP—C" described above and particularly preferably at least one group selected from the group consisting of —O—, —S—, —N($R^{21}$)—, —C(=O)—, —C(=S)—, —C($R^{22}$)=C($R^{23}$)—, an alkynylene group, —Si($R^{24}$)($R^{25}$)—, —N=N—, —C($R^{26}$)=N—N=C($R^{27}$)—, —C($R^{28}$)=N—, and —S(=O)$_2$—. In addition, $R^{21}$ to $R^{28}$ each independently represent a hydrogen atom, a halogen atom, a cyano group, a nitro group, or a linear or branched alkyl group having 1 to 10 carbon atoms. Further, the hydrogen atoms contained in one or more of —$CH_2$-'s constituting the alkylene group represented by SP4 may be substituted with "SP—H" described above.

The number of atoms in the main chain of SP4 is 10 or greater, and from the viewpoint of obtaining a light absorption anisotropic layer in which at least one of the adhesiveness or the planar uniformity is more excellent, preferably 15 or greater and more preferably 19 or greater. Further, from the viewpoint of obtaining a light absorption anisotropic layer with a more excellent degree of alignment, the upper limit of the number of atoms in the main chain of SP2 is preferably 70 or less, more preferably 60 or less, and particularly preferably 50 or less.

Here, the "main chain" in SP4 indicates a partial structure required for directly linking L4 and T4 to each other, and the "number of atoms in the main chain" indicates the number of atoms constituting the partial structure. In other words, the "main chain" in SP4 is a partial structure in which the number of atoms linking L4 and T4 to each other is the smallest. For example, the number of atoms in the main chain in a case where SP4 represents a 3,7-dimethyldecanyl group is 10, and the number of atoms in the main chain in a case where SP4 represents a 4,6-dimethyldodecanyl group is 12. Further, in Formula (4-1), the inside of the frame shown by the dotted quadrangle corresponds to SP4, and the number of atoms in the main chain of SP4 (corresponding to the total number of atoms circled by the dotted line) is 11.

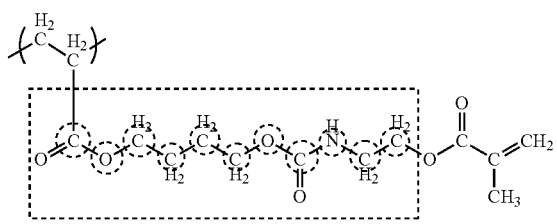
(4-1)

The alkylene group represented by SP4 may be linear or branched.

From the viewpoint of obtaining a light absorption anisotropic layer with a more excellent degree of alignment, the number of carbon atoms of the alkylene group represented by SP4 is preferably in a range of 8 to 80, more preferably in a range of 15 to 80, still more preferably in a range of 25 to 70, and particularly preferably in a range of 25 to 60.

From the viewpoint of obtaining a light absorption anisotropic layer with more excellent adhesiveness and planar uniformity, it is preferable that one or more of —$CH_2$-'s constituting the alkylene group represented by SP4 are substituted with "SP—C" described above.

Further, in a case where a plurality of —$CH_2$-'s constituting the alkylene group represented by SP4 are present, it is more preferable that only some of the plurality of —$CH_2$-'s are substituted with "SP—C" described above from the viewpoint of obtaining a light absorption anisotropic layer with more excellent adhesiveness and planar uniformity.

Among examples of "SP—C", at least one group selected from the group consisting of —O—, —S—, —N($R^{21}$)—, —C(=O)—, —C(=S)—, —C($R^{22}$)=C($R^{23}$)—, an alkynylene group, —Si($R^{24}$)($R^{25}$)—, —N=N—, —C($R^{26}$)=N—N=C($R^{27}$)—, —C($R^{28}$)=N—, and S(=O)$_2$— is preferable, and from the viewpoint of obtaining a light absorption anisotropic layer with more excellent adhesiveness and planar uniformity, at least one group selected from the group consisting of —O—, —N($R^{21}$)—, —C(=O)—, and —S(=O)$_2$— is more preferable, and at least one group selected from the group consisting of —O—, —N(R$^{21}$)—, and —C(=O)— is particularly preferable.

Particularly, it is preferable that SP4 represents a group having at least one selected from the group consisting of an oxyalkylene structure in which one or more of —CH$_2$-'s constituting an alkylene group are substituted with —O—, an ester structure in which one or more of —CH$_2$—CH$_2$-'s constituting an alkylene group are substituted with —O— and C(=O)—, and a urethane bond in which one or more of —CH$_2$—CH$_2$—CH$_2$-'s constituting an alkylene group are substituted with —O—, —C(=O)—, and NH—.

The hydrogen atoms contained in one or more of —CH$_2$-'s constituting the alkylene group represented by SP4 may be substituted with "SP—H" described above. In this case, one or more hydrogen atoms contained in —CH$_2$— may be substituted with "SP—H". That is, only one hydrogen atom contained in —CH$_2$— may be substituted with "SP—H" or all (two) hydrogen atoms contained in —CH$_2$— may be substituted with "SP—H".

Among the examples of "SP—H", at least one group selected from the group consisting of a halogen atom, a cyano group, a nitro group, a hydroxyl group, a linear alkyl group having 1 to 10 carbon atoms, a branched alkyl group having 1 to 10 carbon atoms, and a halogenated alkyl group having 1 to 10 carbon atoms is preferable, and at least one group selected from the group consisting of a hydroxyl group, a linear alkyl group having 1 to 10 carbon atoms, and a branched alkyl group having 1 to 10 carbon atoms is more preferable.

As described above, T4 represents the same terminal group as that for T1 and preferably a hydrogen atom, a methyl group, a hydroxyl group, a carboxy group, a sulfonic acid group, a phosphoric acid group, a boronic acid group, an amino group, a cyano group, a nitro group, a phenyl group which may have a substituent, or -L-CL (L represents a single bond or a divalent linking group, specific examples of the divalent linking group are the same as those for LW and SPW described above, and CL represents a crosslinkable group, and examples thereof include a group represented by Q1 or Q2, among these, a crosslinkable group represented by any of Formulae (P-1) to (P-30) is preferable), and it is preferable that CL represents a vinyl group, a butadiene group, a (meth)acryl group, a (meth)acrylamide group, a vinyl acetate group, a fumaric acid ester group, a styryl group, a vinylpyrrolidone group, a maleic acid anhydride group, a maleimide group, a vinyl ether group, an epoxy group, or an oxetanyl group.

The epoxy group may be an epoxycycloalkyl group, and the number of carbon atoms of the cycloalkyl group moiety in the epoxycycloalkyl group is preferably in a range of 3 to 15, more preferably in a range of 5 to 12, and particularly preferably 6 (that is, in a case where the epoxycycloalkyl group is an epoxycyclohexyl group) from the viewpoint that the effects of the present invention are more excellent.

Examples of the substituent of the oxetanyl group include an alkyl group having 1 to 10 carbon atoms. Among the examples, an alkyl group having 1 to 5 carbon atoms is preferable from the viewpoint that the effects of the present invention are more excellent. The alkyl group as a substituent of the oxetanyl group may be linear or branched, but is preferably linear from the viewpoint that the effects of the present invention are more excellent.

Examples of the substituent of the phenyl group include a boronic acid group, a sulfonic acid group, a vinyl group and an amino group. Among these, from the viewpoint that the effects of the present invention are more excellent, a boronic acid group is preferable.

Specific examples of the repeating unit (4) include the following structures, but the present invention is not limited thereto. Further, in the following specific examples, n1 represents an integer of 2 or greater, and n2 represents an integer of 1 or greater.

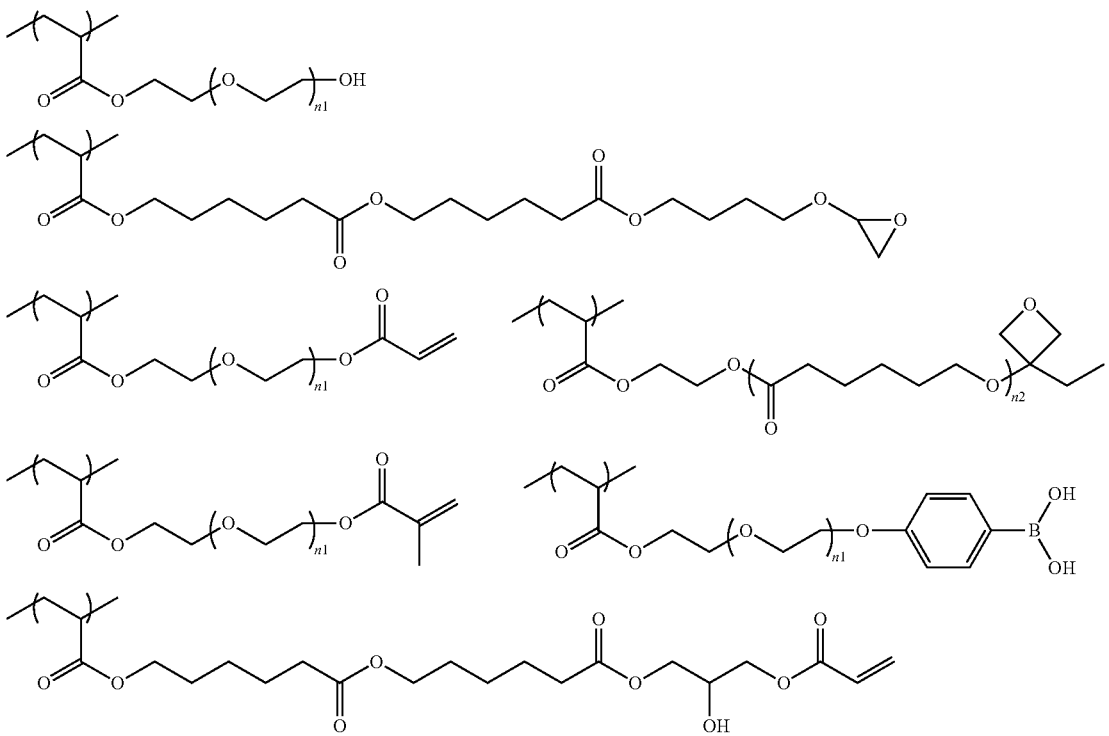

-continued

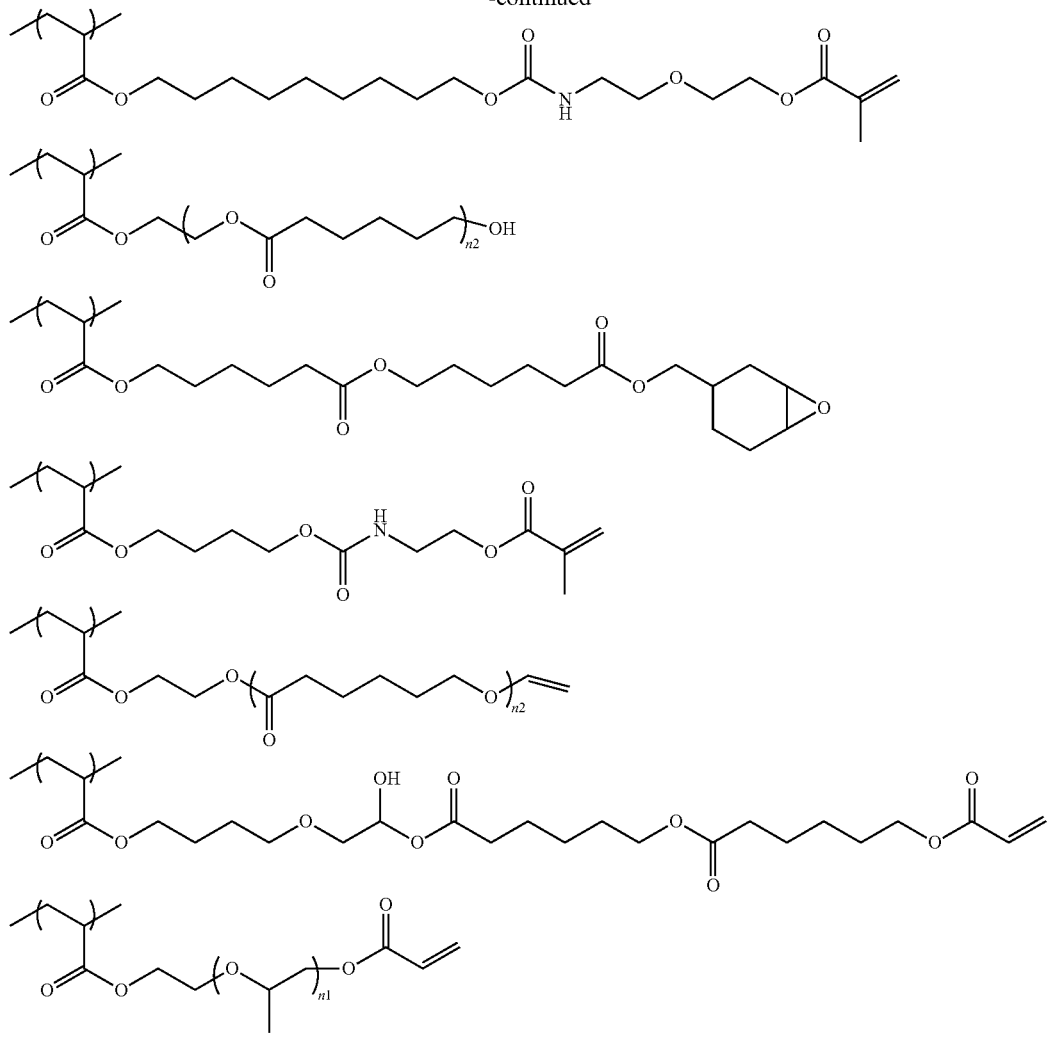

The content of the repeating unit (4) is preferably in a range of 2% to 20% by mass and more preferably in a range of 3% to 18% by mass with respect to all the repeating units (100% by mass) of the polymer liquid crystal compound. In a case where the content of the repeating unit (4) is 2% by mass or greater, a light absorption anisotropic layer having more excellent adhesiveness can be obtained. Further, in a case where the content of the repeating unit (4) is 20%/by mass or less, a light absorption anisotropic layer having more excellent planar uniformity can be obtained.

The polymer liquid crystal compound may have only one or two or more kinds of repeating units (4). In a case where the polymer liquid crystal compound has two or more kinds of repeating units (4), the content of the repeating unit (4) indicates the total content of the repeating units (4).

Repeating Unit (5)

From the viewpoint of the planar uniformity, the polymer liquid crystal compound may have a repeating unit (5) to be introduced by polymerizing a polyfunctional monomer. Particularly in order to improve the planar uniformity while suppressing a decrease in the degree of alignment, it is preferable that the side-chain type polymer liquid crystal compound has 10% by mass or less of the repeating unit (5) to be introduced by polymerizing a polyfunctional monomer. As described above, the reason why the planar uniformity can be improved while a decrease in the degree of alignment is suppressed by allowing the side-chain type polymer liquid crystal compound to have 10% by mass or less of the repeating unit (5) is assumed as follows.

The repeating unit (5) is a unit to be introduced to the polymer liquid crystal compound by polymerizing a polyfunctional monomer. Therefore, it is considered that the polymer liquid crystal compound contains a high-molecular-weight body in which a three-dimensional crosslinked structure is formed by the repeating unit (5). Here, since the content of the repeating unit (5) is small, the content of the high-molecular-weight body having the repeating unit (5) is considered to be small.

It is assumed that a light absorption anisotropic layer in which cissing of the liquid crystal composition is suppressed and the planar uniformity is excellent is obtained due to the presence of a small amount of the high-molecular-weight body with the three-dimensional crosslinked structure that has been formed as described above.

Further, it is assumed that the effect of suppressing a decrease in the degree of alignment can be maintained because the content of the high-molecular-weight body is small.

It is preferable that the repeating unit (5) to be introduced by polymerizing a polyfunctional monomer is a repeating unit represented by Formula (5).

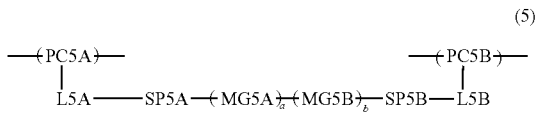

In Formula (5), PC5A and PC5B represent the main chain of the repeating unit and more specifically the same structure as that for PC1 in Formula (1), L5A and L5B represent a single bond or a divalent linking group and more specifically the same structure as that for L1 in Formula (1), SP5A and SP5B represent a spacer group and more specifically the same structure as that for SP1 in Formula (1), MG5A and MG5B represent a mesogen structure and more specifically the same structure as that for the mesogen group MG in Formula (LC), and a and b represent an integer of 0 or 1.

PC5A and PC5B may represent the same group or different groups, but it is preferable that PC5A and PC5B represent the same group from the viewpoint of further improving the degree of alignment of the light absorption anisotropic layer.

L5A and L5B may represent a single bond, the same group, or different groups, but L5A and L5B represent preferably a single bond or the same group and more preferably the same group from the viewpoint of further improving the degree of alignment of the light absorption anisotropic layer.

SP5A and SP5B may represent a single bond, the same group, or different groups, but SP5A and SP5B represent preferably a single bond or the same group and more preferably the same group from the viewpoint of further improving the degree of alignment of the light absorption anisotropic layer.

Here, the same group in Formula (5) indicates that the chemical structures are the same as each other regardless of the orientation in which each group is bonded. For example, even in a case where SP5A represents *—$CH_2$—$CH_2$—O—** (* represents a bonding position with respect to L5A, and ** represents a bonding position with respect to MG5A) and SP5B represents *—O—$CH_2$—$CH_2$—** (* represents a bonding position with respect to MG5B, and ** represents a bonding position with respect to L5B), SP5A and SP5B represent the same group.

From the viewpoint of further improving the degree of alignment of the light absorption anisotropic layer, a and b each independently represent an integer of 0 or 1 and preferably 1.

a and b may be the same as or different from each other, but from the viewpoint of further improving the degree of alignment of the light absorption anisotropic layer, it is preferable that both a and b represent 1.

From the viewpoint of further improving the degree of alignment of the light absorption anisotropic layer, the sum of a and b is preferably 1 or 2 (that is, the repeating unit represented by Formula (5) contains a mesogen group) and more preferably 2.

From the viewpoint of further improving the degree of alignment of the light absorption anisotropic layer, it is preferable that the partial structure represented by -(MG5A)$_a$-(MG5B)$_b$— has a cyclic structure. In this case, from the viewpoint of further improving the degree of alignment of the light absorption anisotropic layer, the number of cyclic structures in the partial structure represented by -(MG5A2)$_a$-(MG5B)$_b$— is preferably 2 or greater, more preferably in a range of 2 to 8, still more preferably in a range of 2 to 6, and particularly preferably in a range of 2 to 4.

From the viewpoint of further improving the degree of alignment of the light absorption anisotropic layer, the mesogen groups represented by MG5A and MG5B each independently have preferably one or more cyclic structures, preferably 2 to 4 cyclic structures, still more preferably 2 or 3 cyclic structures, and particularly preferably 2 cyclic structures.

Specific examples of the cyclic structure include an aromatic hydrocarbon group, a heterocyclic group, and an alicyclic group. Among these, an aromatic hydrocarbon group and an alicyclic group are preferable.

MG5A and MG5B may represent the same group or different groups, but from the viewpoint of further improving the degree of alignment of the light absorption anisotropic layer, it is preferable that MG5A and MG5B represent the same group.

From the viewpoints of exhibiting the liquid crystallinity, adjusting the liquid crystal phase transition temperature, and the availability of raw materials and synthetic suitability and from the viewpoint that the effects of the present invention are more excellent, it is preferable that the mesogen group represented by MG5A and MG5B is the mesogen group MG in Formula (LC).

Particularly in the repeating unit (5), it is preferable that PC5A and PC5B represent the same group, both L5A and L5B represent a single bond or the same group, both SP5A and SP5B represent a single bond or the same group, and MG5A and MG5B represent the same group. In this manner, the degree of alignment of the light absorption anisotropic layer is further improved.

The content of the repeating unit (5) is preferably 10% by mass or less, more preferably in a range of 0.001% to 5% by mass, and still more preferably in a range of 0.05% to 3% by mass with respect to the content (100% by mass) of all the repeating units of the polymer liquid crystal compound.

The polymer liquid crystal compound may have only one or two or more kinds of repeating units (5). In a case where the polymer liquid crystal compound has two or more kinds of repeating units (5), it is preferable that the total amount thereof is in the above-described range.

Star-Shaped Polymer

The polymer liquid crystal compound may be a star-shaped polymer. The star-shaped polymer in the present invention indicates a polymer having three or more polymer chains extending from the nucleus and is specifically represented by Formula (6).

The star-shaped polymer represented by Formula (6) as the polymer liquid crystal compound can form a light absorption anisotropic layer having a high degree of alignment while having high solubility (excellent solubility in a solvent).

In Formula (6), $n_A$ represents an integer of 3 or greater and preferably an integer of 4 or greater. The upper limit of $n_A$ is not limited thereto, but is commonly 12 or less and preferably 6 or less.

A plurality of PI's each independently represent a polymer chain having any of repeating units represented by Formulae (1), (21), (22), (3), (4), and (5). Here, at least one of the plurality of P's represents a polymer chain having a repeating unit represented by Formula (1).

A represents an atomic group that is the nucleus of the star-shaped polymer. Specific examples of A include structures obtained by removing hydrogen atoms from thiol groups of the polyfunctional thiol compound, described in paragraphs [0052] to [0058] of JP2011-074280A, paragraphs [0017] to [0021] of JP2012-189847A, paragraphs [0012] to [0024] of JP2013-031986A, and paragraphs [0118] to [0142] of JP2014-104631A. In this case, A and PI are bonded to each other through a sulfide bond.

The number of thiol groups of the polyfunctional thiol compound from which A is derived is preferably 3 or greater and more preferably 4 or greater. The upper limit of the number of thiol groups of the polyfunctional thiol compound is commonly 12 or less and preferably 6 or less.

Specific examples of the polyfunctional thiol compound are shown below.

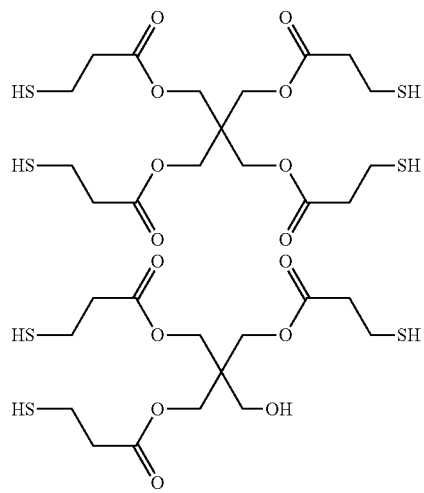

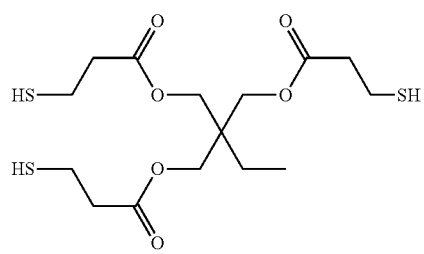

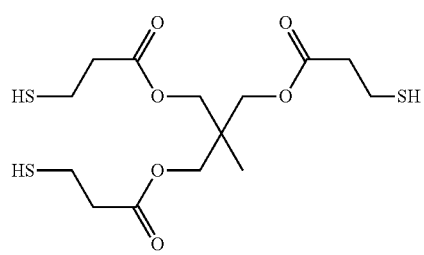

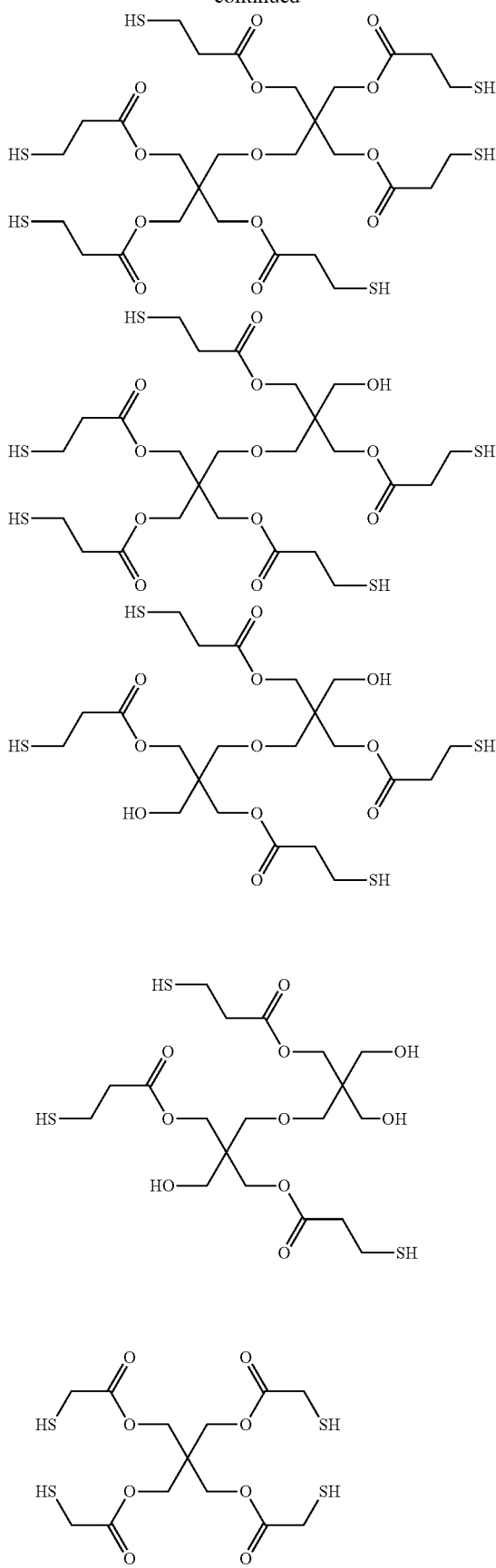

-continued

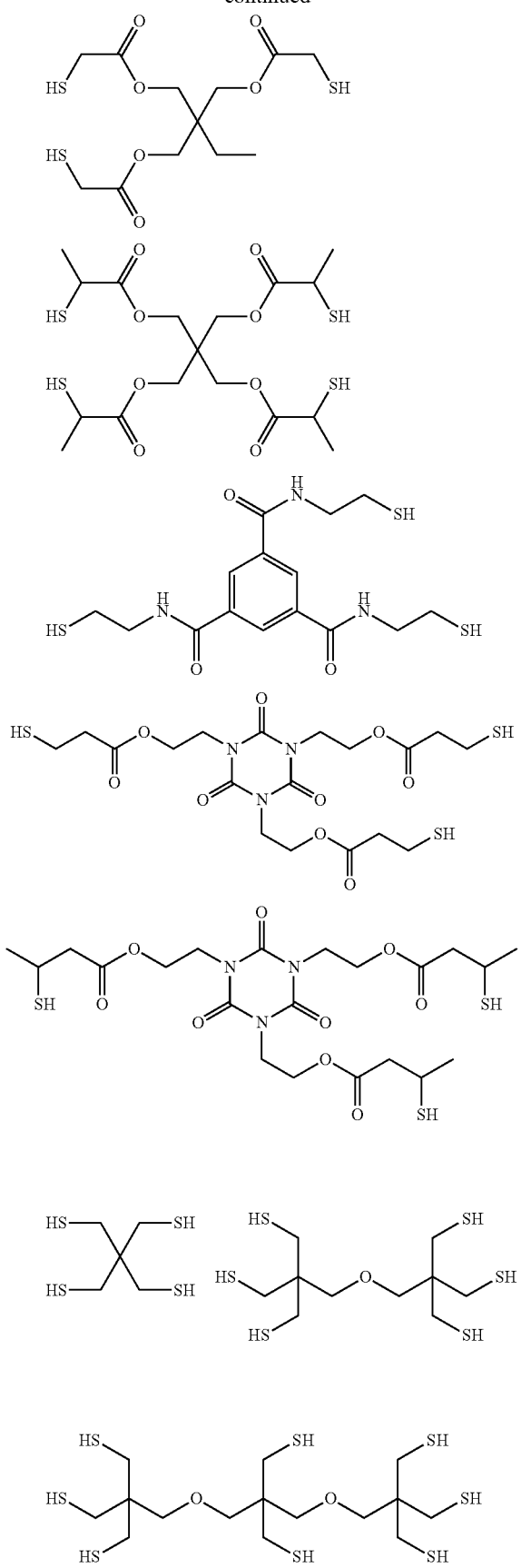
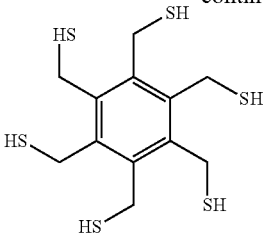

From the viewpoint of further improving the degree of alignment, the polymer liquid crystal compound may be a thermotropic liquid crystal and a crystalline polymer.

Thermotropic Liquid Crystal

A thermotropic liquid crystal is a liquid crystal that shows transition to a liquid crystal phase due to a change in temperature.

The specific compound is a thermotropic liquid crystal and may exhibit any of a nematic phase or a smectic phase, but it is preferable that the specific compound exhibits at least the nematic phase from the viewpoint that the degree of alignment of the light absorption anisotropic layer is further increased, and haze is unlikely to be observed (haze is further enhanced).

The temperature range showing the nematic phase is preferably in a range of room temperature (23° C.) to 450° C. from the viewpoint that the degree of alignment of the light absorption anisotropic layer is further increased and haze is unlikely to be observed and more preferably in a range of 40° C. to 400° C. from the viewpoints of the handleability and the manufacturing suitability.

Crystalline Polymer

A crystalline polymer is a polymer showing a transition to a crystal phase due to a change in temperature. The crystalline polymer may show a glass transition other than the transition to the crystal phase.

It is preferable that the crystalline polymer is a polymer liquid crystal compound that has a transition from a crystal phase to a liquid crystal phase in a case of being heated (glass transition may be present in the middle of the transition) from the viewpoint that the degree of alignment of the light absorption anisotropic layer is further increased and haze is unlikely to be observed or a polymer liquid crystal compound that has a transition to a crystal phase in a case where the temperature is lowered after entering a liquid crystal state by being heated (glass transition may be present in the middle of the transition).

The presence or absence of crystallinity of the polymer liquid crystal compound is evaluated as follows.

Two light absorption anisotropic layers of an optical microscope (ECLIPSE E600 POL, manufactured by Nikon Corporation) are disposed so as to be orthogonal to each other, and a sample table is set between the two light absorption anisotropic layers. Further, a small amount of the polymer liquid crystal compound is placed on slide glass, and the slide glass is set on a hot stage placed on the sample table. While the state of the sample is observed, the temperature of the hot stage is increased to a temperature at which the polymer liquid crystal compound exhibits liquid crystallinity, and the polymer liquid crystal compound is allowed to enter a liquid crystal state. After the polymer liquid crystal compound enters the liquid crystal state, the behavior of the liquid crystal phase transition is observed while the temperature of the hot stage is gradually lowered, and the temperature of the liquid crystal phase transition is recorded. In a case where the polymer liquid crystal compound exhibits a plurality of liquid crystal phases (for example, a nematic phase and a smectic phase), all the transition temperatures are also recorded.

Next, approximately 5 mg of a sample of the polymer liquid crystal compound is put into an aluminum pan, and the pan is covered and set on a differential scanning calorimeter (DSC) (an empty aluminum pan is used as a reference). The polymer liquid crystal compound measured in the above-described manner is heated to a temperature at which the compound exhibits a liquid crystal phase, and the temperature is maintained for 1 minute. Thereafter, the calorific value is measured while the temperature is lowered at a rate of 10° C./min. An exothermic peak is confirmed from the obtained calorific value spectrum.

As a result, in a case where an exothermic peak is observed at a temperature other than the liquid crystal phase transition temperature, it can be said that the exothermic peak is a peak due to crystallization and the polymer liquid crystal compound has crystallinity.

Meanwhile, in a case where an exothermic peak is not observed at a temperature other than the liquid crystal phase transition temperature, it can be said that the polymer liquid crystal compound does not have crystallinity.

The method of obtaining a crystalline polymer is not particularly limited, but as a specific example, a method of using a polymer liquid crystal compound having the repeating unit (1) described above is preferable, and a method of using a suitable form among polymer liquid crystal compounds having the repeating unit (1) described above is more preferable.

Crystallization Temperature

From the viewpoint that the degree of alignment of the light absorption anisotropic layer is further increased and haze is unlikely to be observed, the crystallization temperature of the polymer liquid crystal compound is preferably −50° C. or higher and lower than 150° C., more preferably 120° C. or lower, still more preferably −20° C. or higher and lower than 120° C., and particularly preferably 95° C. or lower. The crystallization temperature of the polymer liquid crystal compound is preferably lower than 150° C. from the viewpoint of reducing haze.

Further, the crystallization temperature is a temperature of an exothermic peak due to crystallization in the above-described DSC.

Molecular Weight

From the viewpoint that the effects of the present invention are more excellent, the weight-average molecular weight (Mw) of the polymer liquid crystal compound is preferably in a range of 1000 to 500000 and more preferably in a range of 2000 to 300000. In a case where the Mw of the polymer liquid crystal compound is in the above-described range, the polymer liquid crystal compound is easily handled.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the degree of alignment, the weight-average molecular weight (Mw) of the polymer liquid crystal compound is preferably less than 10000 and more preferably 2000 or greater and less than 10000.

Here, the weight-average molecular weight and the number average molecular weight in the present invention are values measured by the gel permeation chromatography (GPC) method.

Solvent (eluent): N-methylpyrrolidone
Equipment name: TOSOH HLC-8220GPC
Column: Connect and use three of TOSOH TSKgel Super AWM-H (6 mm×15 cm)
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2800000 to 1050 (Mw/Mn=1.03 to 1.06) are used.

The polymer liquid crystal compound may exhibit nematic or smectic liquid crystallinity, but it is preferable that the polymer liquid crystal compound exhibits at least the nematic liquid crystallinity.

The temperature at which the nematic phase is exhibited is preferably in a range of 0° C. to 450° C., and more preferably in a range of 30° C. to 400° C. from the viewpoints of handleability and manufacturing suitability.

Content

From the viewpoint that the effects of the present invention are more excellent, the content of the liquid crystal compound is preferably in a range of 10% to 97% by mass, more preferably in a range of 40% to 95% by mass, and still more preferably in a range of 60% to 95% by mass with respect to the total solid content (100% by mass) of the liquid crystal composition.

In a case where the liquid crystal compound contains a polymer liquid crystal compound, the content of the polymer liquid crystal compound is preferably in a range of 10% to 99% by mass, more preferably in a range of 30% to 95% by mass, and still more preferably in a range of 40% to 90% by mass with respect to the total mass (100 parts by mass) of the liquid crystal compound.

In a case where the liquid crystal compound contains a low-molecular-weight liquid crystal compound, the content of the low-molecular-weight liquid crystal compound is preferably in a range of 1% to 90% by mass, more preferably in a range of 5% to 70% by mass, and still more preferably in a range of 10% to 60% by mass with respect to the total mass (100 parts by mass) of the liquid crystal compound.

In a case where the liquid crystal compound contains both a polymer liquid crystal compound and a low-molecular-weight liquid crystal compound, from the viewpoint that the effects of the present invention are more excellent, the mass ratio (low-molecular-weight liquid crystal compound/polymer liquid crystal compound) of the content of the low-molecular-weight liquid crystal compound to the content of the polymer liquid crystal compound is preferably in a range of 5/95 to 70/30 and more preferably in a range of 10/90 to 50/50.

Here, the "solid content in the liquid crystal composition" denotes a component from which a solvent is removed, and specific examples of the solid content include the liquid crystal compound, and a dichroic substance, a polymerization initiator, an interface improver described below.

Dichroic Substance

The liquid crystal composition further contains a dichroic substance.

In the present invention, the dichroic substance indicates a coloring agent having different absorbances depending on the direction. The dichroic substance may or may not exhibit liquid crystallinity.

The dichroic substance is not particularly limited, and examples thereof include a visible light absorbing material (dichroic coloring agent), a light emitting material (such as a fluorescent material or a phosphorescent material), an ultraviolet absorbing material, an infrared absorbing material, a non-linear optical material, a carbon nanotube, and an inorganic material (for example, a quantum rod). Further, known dichroic substances (dichroic coloring agents) of the related art can be used.

The dichroic substance is not particularly limited, but a dichroic azo coloring agent compound is preferable, and a dichroic azo coloring agent compound typically used for a so-called coating type polarizer can be used. The dichroic azo coloring agent compound is not particularly limited, and known dichroic azo coloring agents of the related art can be used, but the compounds described below are preferably used.

The dichroic substance may be polymerized in the light absorption anisotropic layer.

In a case where the dichroic azo coloring agent compound exhibits liquid crystallinity, the dichroic azo coloring agent compound may exhibit any of nematic liquid crystallinity or smectic liquid crystallinity. The temperature at which the liquid crystal phase is exhibited is preferably in a range of room temperature (approximately 20° C. to 28° C.) to 300° C. and from the viewpoints of handleability and manufacturing suitability, more preferably in a range of 50° C. to 200° C.

In the present invention, from the viewpoint of adjusting the tint, the light absorption anisotropic layer contains preferably at least one coloring agent compound having a maximum absorption wavelength in a wavelength range of 560 to 700 nm (hereinafter, also referred to as "first dichroic azo coloring agent compound") and at least one coloring agent compound having a maximum absorption wavelength in a wavelength range of 455 nm or greater and less than 560 nm (hereinafter, also referred to as "second dichroic azo coloring agent compound") and specifically more preferably at least a dichroic azo coloring agent compound represented by Formula (1) and a dichroic azo coloring agent compound represented by Formula (2).

In the present invention, three or more kinds of dichroic azo coloring agent compounds may be used in combination. For example, from the viewpoint of making the color of the light absorption anisotropic layer close to black, it is preferable to use a first dichroic azo coloring agent compound, a second dichroic azo coloring agent compound, and at least one coloring agent compound having a maximum absorption wavelength in a wavelength range of 380 nm or greater and less than 455 nm (preferably in a wavelength range of 380 to 454 nm) (hereinafter, also referred to as "third dichroic azo coloring agent compound") in combination.

In the present invention, from the viewpoint of further enhancing pressing resistance, it is preferable that the dichroic azo compound contains a crosslinkable group.

Specific examples of the crosslinkable group include a (meth)acryloyl group, an epoxy group, an oxetanyl group, and a styryl group. Among these, a (meth)acryloyl group is preferable.

First Dichroic Azo Coloring Agent Compound

It is preferable that the second dichroic substance is a compound having a chromophore which is a nucleus and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic ring group and an azo group is preferable, and a bisazo structure containing an aromatic heterocyclic group (preferably a thienothiazole group) and two azo groups is more preferable.

The side chain is not particularly limited, and examples thereof include a group represented by L3, R2, or L4 in Formula (1).

From the viewpoint adjusting the tint of the light absorption anisotropic layer, it is preferable that the first dichroic azo coloring agent compound is a dichroic azo coloring agent compound having a maximum absorption wavelength in a wavelength range of 560 nm or greater and 700 nm or less (more preferably 560 to 650 nm and particularly preferably 560 to 640 nm).

The maximum absorption wavelength (nm) of the dichroic azo coloring agent compound in the present specification is acquired from an ultraviolet visible spectrum in a wavelength range of 380 to 800 nm measured by a spectrophotometer using a solution prepared by dissolving the dichroic azo coloring agent compound in a good solvent.

In the present invention, from the viewpoint of further improving the degree of alignment of the light absorption anisotropic layer to be formed, it is preferable that the first dichroic azo coloring agent compound is a compound represented by Formula (1).

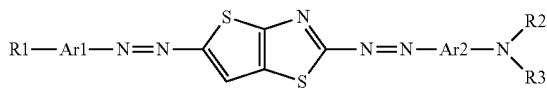

(1)

In Formula (1), Ar1 and Ar2 each independently represent a phenylene group which may have a substituent or a naphthylene group which may have a substituent. Among these, a phenylene group is preferable. Examples of the substituent include the substituent W described above.

In Formula (1), R1 represents a hydrogen atom, a linear or branched alkyl group having 1 to 20 carbon atoms which may have a substituent, an alkoxy group, an alkylthio group, an alkylsulfonyl group, an alkylcarbonyl group, an alkyloxycarbonyl group, an acyloxy group, an alkylcarbonate group, an alkylamino group, an acylamino group, an alkylcarbonylamino group, an alkoxycarbonylamino group, an alkylsulfonylamino group, an alkylsulfamoyl group, an alkylcarbamoyl group, an alkylsulfinyl group, an alkylureido group, an alkylphosphoric acid amide group, an alkylimino group, or an alkylsilyl group. Examples of the substituent include the substituent W described above.

Further, —CH$_2$— constituting the alkyl group may be substituted with —O—, —CO—, —C(O)—O—, —O—C(O)—, —Si(CH$_3$)$_2$—O—Si(CH$_3$)$_2$—, —N(R1')—, —N(R1')—CO—, —CO—N(R1')—, —N(R1')—C(O)—O—, —O—C(O)—N(R1')—, —N(R1')—C(O)—N(R1')—, —CH═CH—, —C≡C—, —N═N—, —C(R1')═CH—C(O)—, or —O—C(O)—O—.

In a case where R1 represents a group other than a hydrogen atom, the hydrogen atom in each group may be substituted with a halogen atom, a nitro group, a cyano group, —N(R1')$_2$, an amino group, —C(R1')═C(R1')—NO$_2$, —C(R1')═C(R1')—CN, or —C(R1')═C(CN)$_2$.

R1' represents a hydrogen atom or a linear or branched alkyl group having 1 to 6 carbon atoms. In a case where a plurality of (R1')'s are present in each group, these may be the same as or different from one another.

In Formula (1), R2 and R3 each independently represent a hydrogen atom, a linear or branched alkyl group having 1 to 20 carbon atoms which may have a substituent, an alkoxy group, an acyl group, an alkyloxycarbonyl group, an alkylamide group, an alkylsulfonyl group, an aryl group, an arylcarbonyl group, an arylsulfonyl group, an aryloxycarbonyl group, or an arylamide group. Examples of the substituent include the substituent W described above.

Further, —CH$_2$— constituting the alkyl group may be substituted with —O—, —S—, —C(O)—, —C(O)—O—, —O—C(O)—, —C(O)—S—, —S—C(O)—, —Si(CH$_3$)$_2$—O—Si(CH$_3$)$_2$—, —NR2'—, —NR2'—CO—, —CO—NR2'—, —NR2'—C(O)—O—, —O—C(O)—NR2'—, —NR2'—C(O)—NR2'—, —CH=CH—, —C≡C—, —N=N—, —C(R2')=CH—C(O)—, or —O—C(O)—O—.

In a case where R2 and R3 represent a group other than a hydrogen atom, the hydrogen atom of each group may be substituted with a halogen atom, a nitro group, a cyano group, a —OH group, —N(R2')$_2$, an amino group, —C(R2')=C(R2')—NO$_2$, —C(R2')=C(R2')—CN, or —C(R2')=C(CN)$_2$.

R2' represents a hydrogen atom or a linear or branched alkyl group having 1 to 6 carbon atoms. In a case where a plurality of (R2')'s are present in each group, these may be the same as or different from one another.

R2 and R3 may be bonded to each other to form a ring, or R2 or R3 may be bonded to Ar2 to form a ring.

From the viewpoint of the light fastness, it is preferable that R1 represents an electron-withdrawing group and R2 and R3 represent a group having a low electron-donating property.

Specific examples of such a group as R1 include an alkylsulfonyl group, an alkylcarbonyl group, an alkyloxycarbonyl group, an acyloxy group, an alkylsulfonylamino group, an alkylsulfamoyl group, an alkylsulfinyl group, and an alkylureido group, and examples of groups as R2 and R3 include groups having the following structures. In addition, the groups having the following structures are shown in the form having a nitrogen atom to which R2 and R3 are bonded in Formula (1).

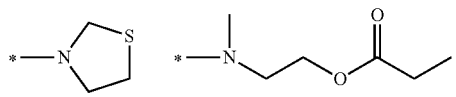
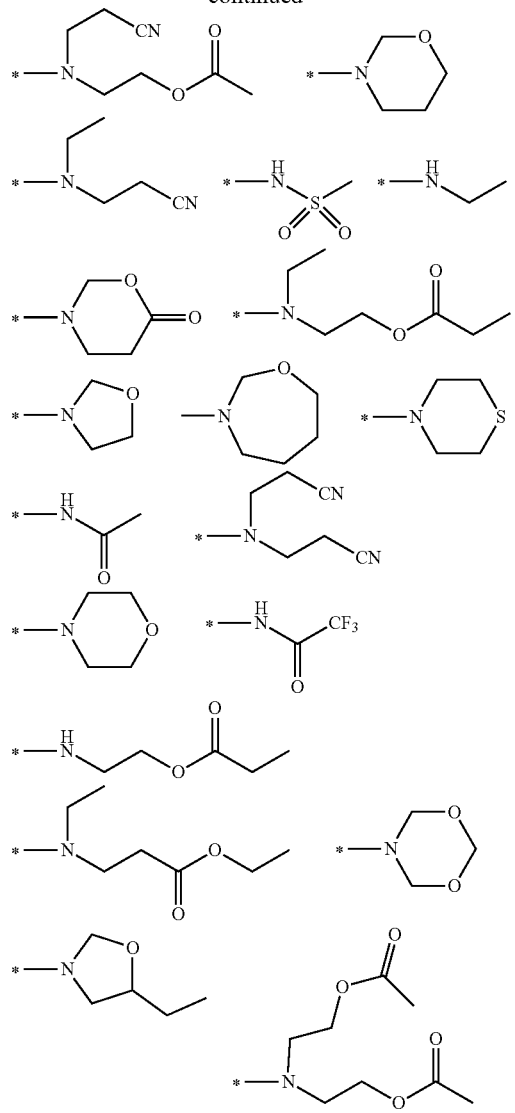

Specific examples of the first dichroic azo coloring agent compound are shown below, but the present invention is not limited thereto.

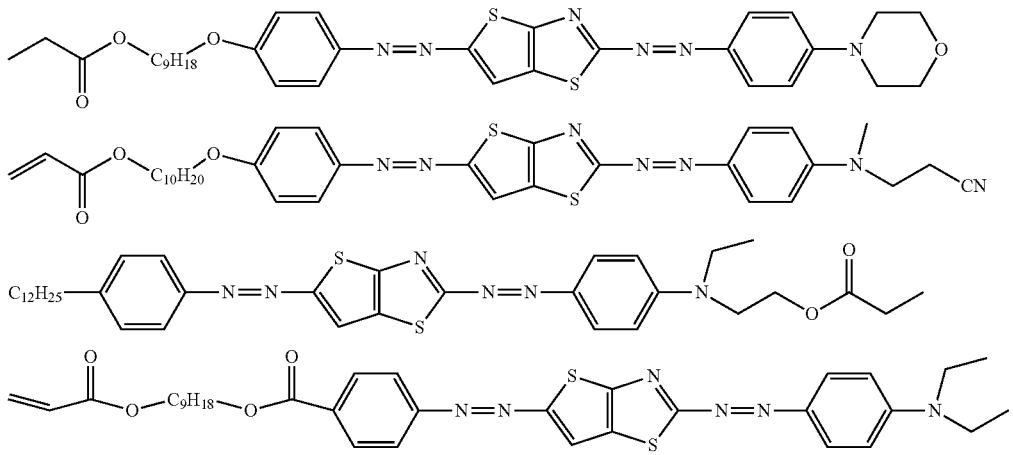

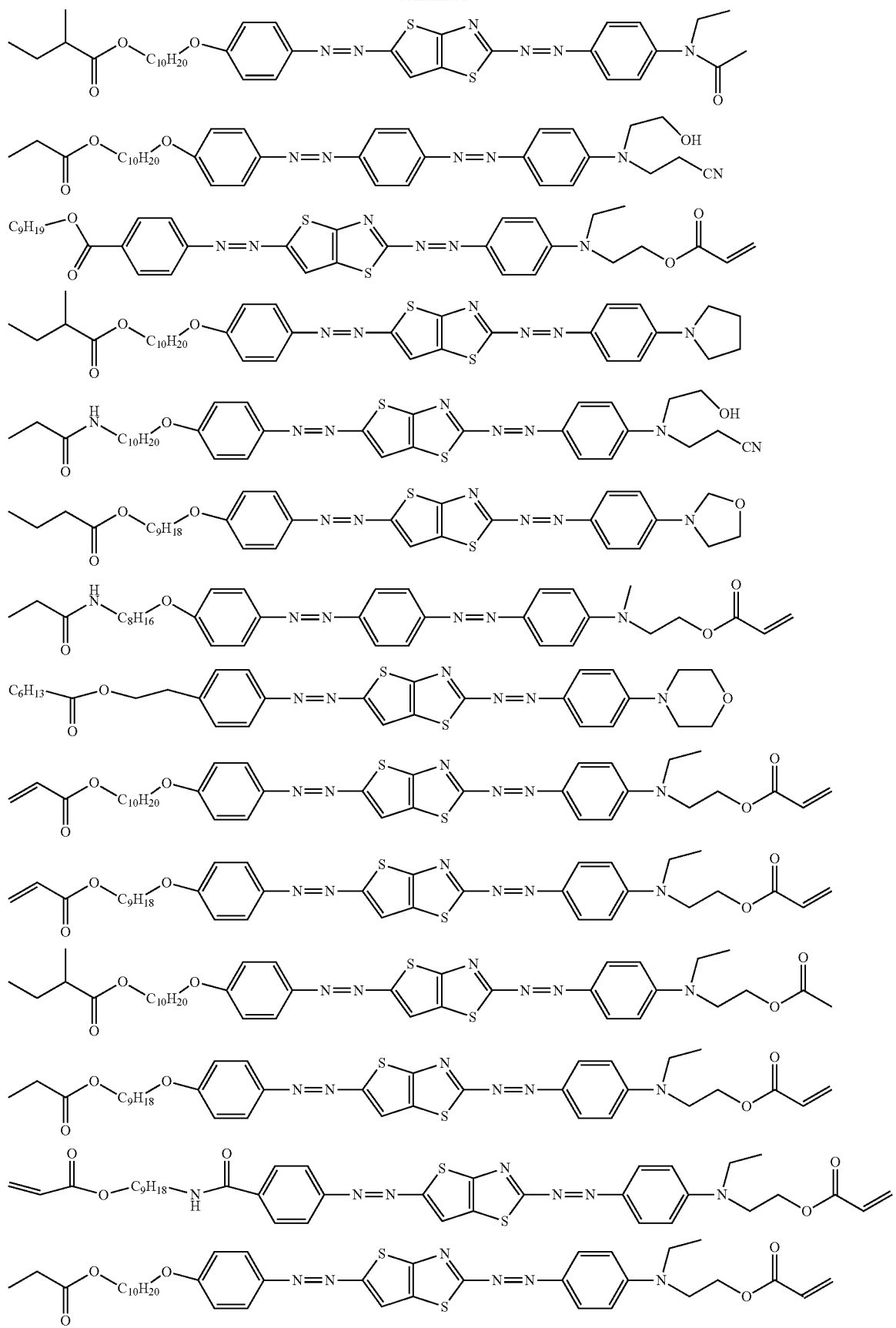

-continued

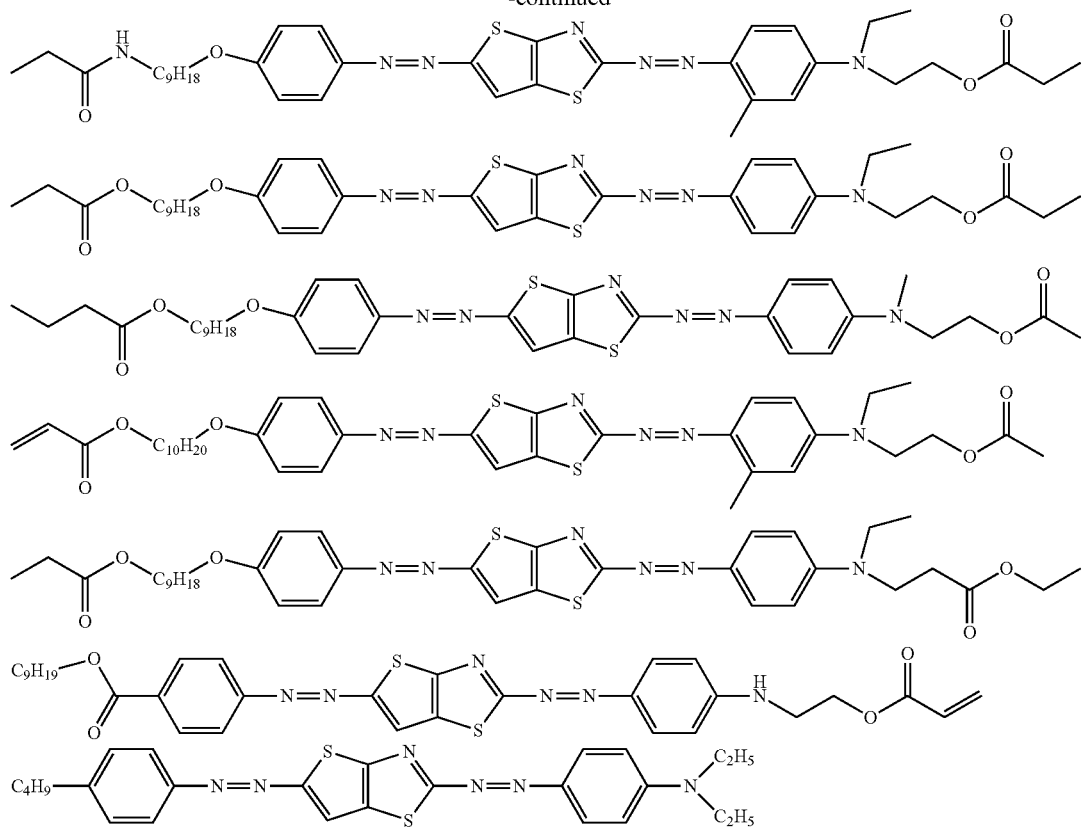

Second Dichroic Azo Coloring Agent Compound

The second dichroic azo coloring agent compound is a compound different from the first dichroic azo coloring agent compound, and specifically, the chemical structure thereof is different from that of the first dichroic azo coloring agent compound.

It is preferable that the second dichroic azo coloring agent compound is a compound having a chromophore which is a nucleus of a dichroic azo coloring agent compound and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic hydrocarbon group and an azo group is preferable, and a bisazo or trisazo structure containing an aromatic hydrocarbon group and two or three azo groups is more preferable.

The side chain is not particularly limited, and examples thereof include a group represented by R4, R5, or R6 in Formula (2).

The second dichroic azo coloring agent compound is a dichroic azo coloring agent compound having a maximum absorption wavelength in a wavelength range of 455 nm or greater and less than 560 nm, and from the viewpoint of adjusting the tint of the light absorption anisotropic layer, preferably a dichroic azo coloring agent compound having a maximum absorption wavelength in a wavelength range of 455 to 555 nm and more preferably a dichroic azo coloring agent compound having a maximum absorption wavelength in a wavelength range of 455 to 550 nm.

In particular, the tint of the light absorption anisotropic layer is easily adjusted by using a first dichroic azo coloring agent compound having a maximum absorption wavelength of 560 to 700 nm and a second dichroic azo coloring agent compound having a maximum absorption wavelength of 455 nm or greater and less than 560 nm.

From the viewpoint of further improving the degree of alignment of the light absorption anisotropic layer, it is preferable that the second dichroic azo coloring agent compound is a compound represented by Formula (2).

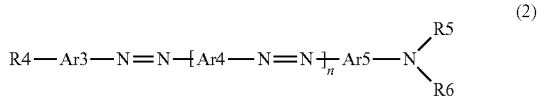

In Formula (2), n represents 1 or 2.

In Formula (2), Ar3, Ar4, and Ar5 each independently represent a phenylene group which may have a substituent, a naphthylene group which may have a substituent, or a heterocyclic group which may have a substituent. Examples of the substituent include the substituent W described above.

The heterocyclic group may be aromatic or non-aromatic.

The atoms other than carbon constituting the aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

In Formula (2), R4 has the same definition as that for R1 in Formula (1).

In Formula (2), R5 and R6 each have the same definition as that for R2 and R3 in Formula (1).

From the viewpoint of the light fastness, it is preferable that R4 represents an electron-withdrawing group and R5 and R6 represent a group having a low electron-donating property.

Among such groups, specific examples of a case where R4 represents an electron-withdrawing group are the same as the specific examples of a case where R1 represents an electron-withdrawing group, and specific examples of a case where R5 and R6 represent a group having a low electron-donating property are the same as the specific examples of a case where R2 and R3 represent a group having a low electron-donating property.

Specific examples of the second dichroic azo coloring agent compound are shown below, but the present invention is not limited thereto.

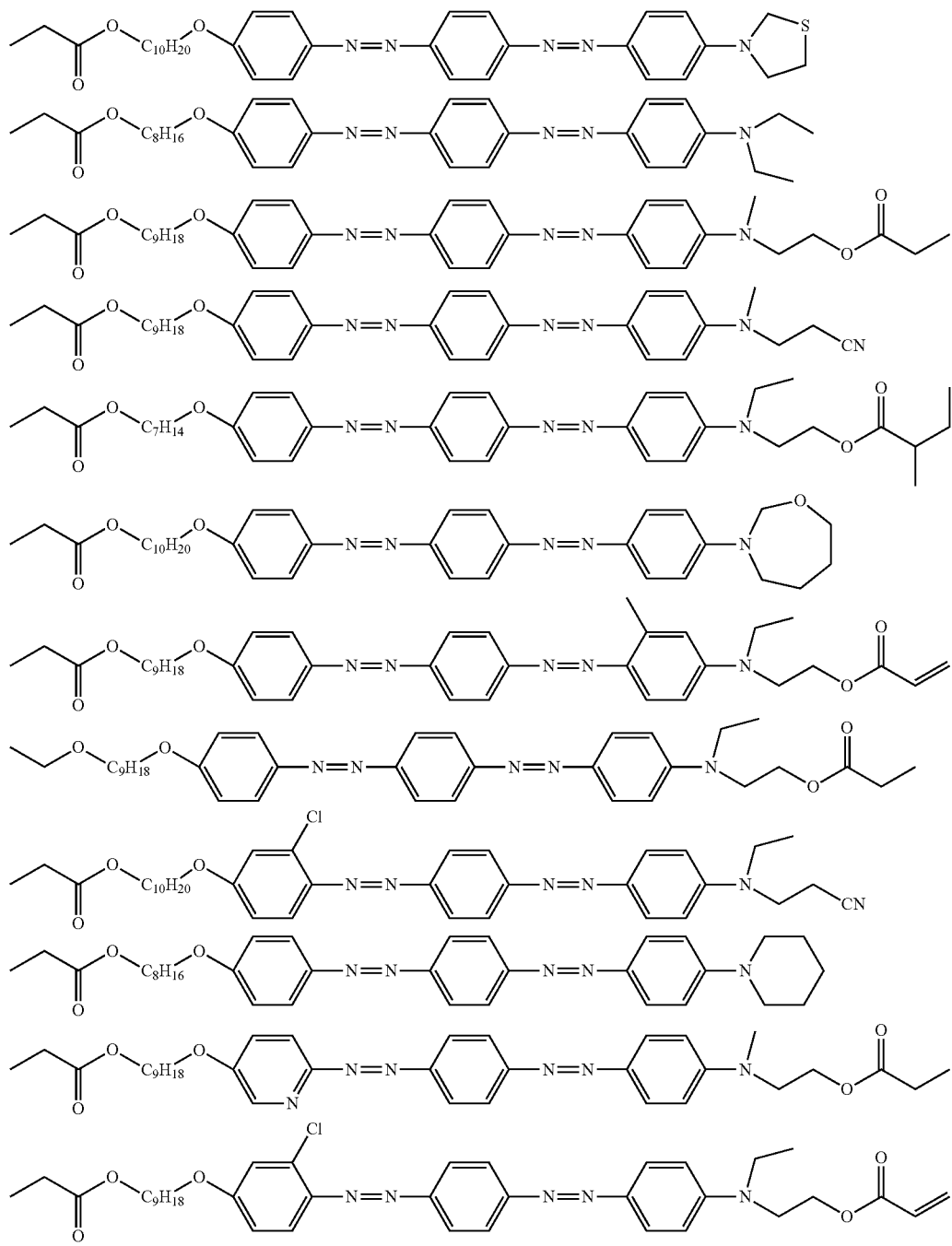

-continued
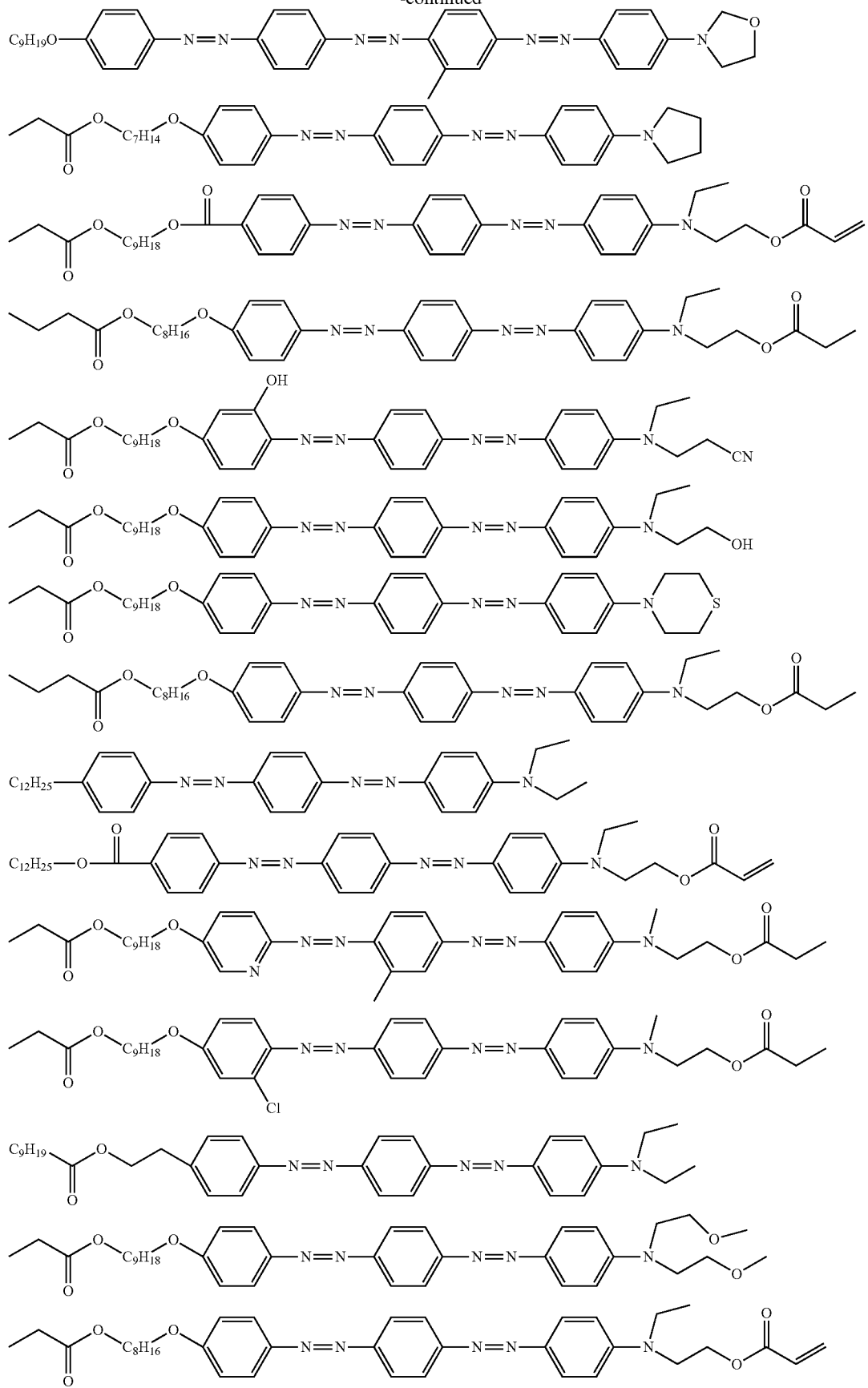

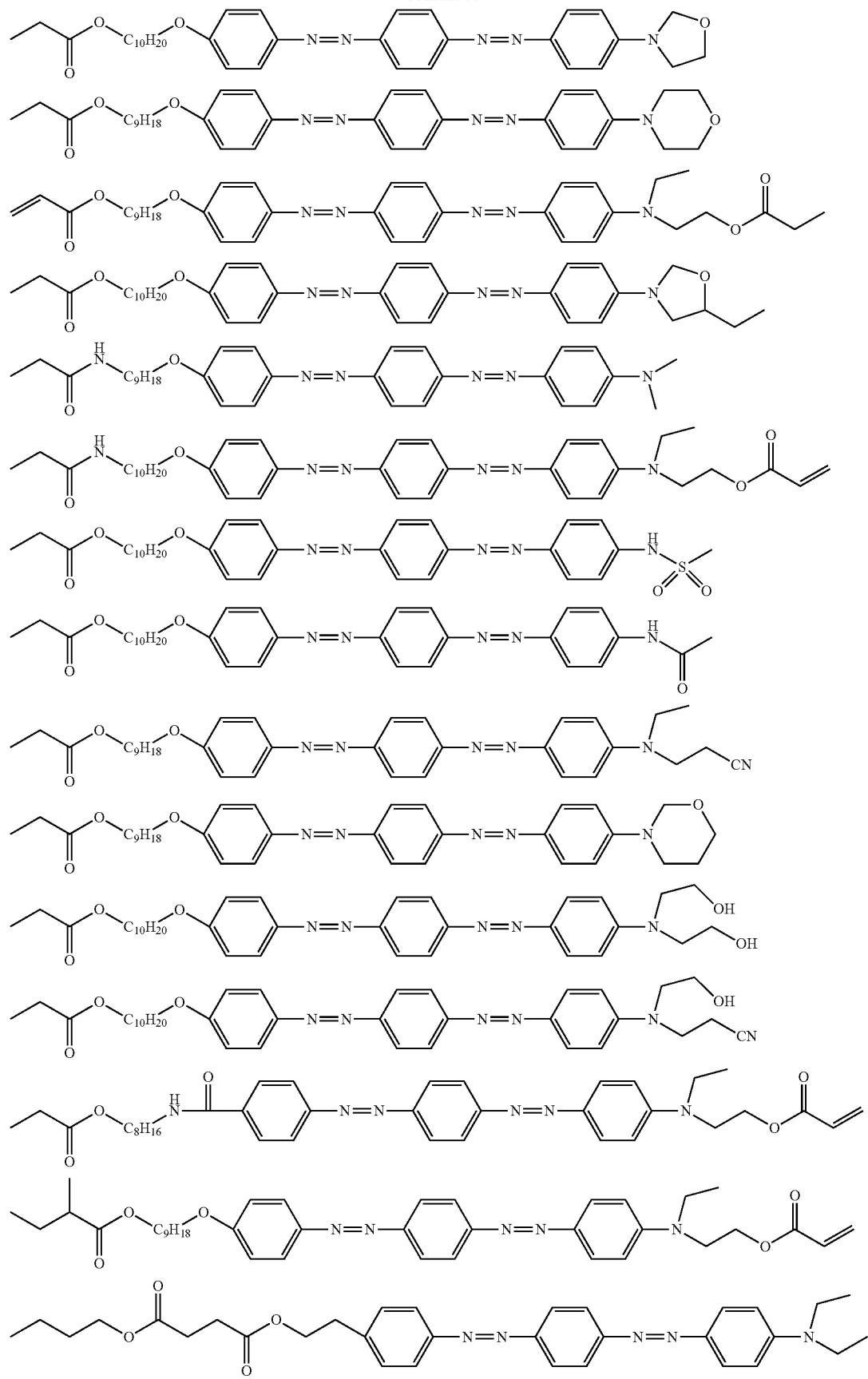

-continued

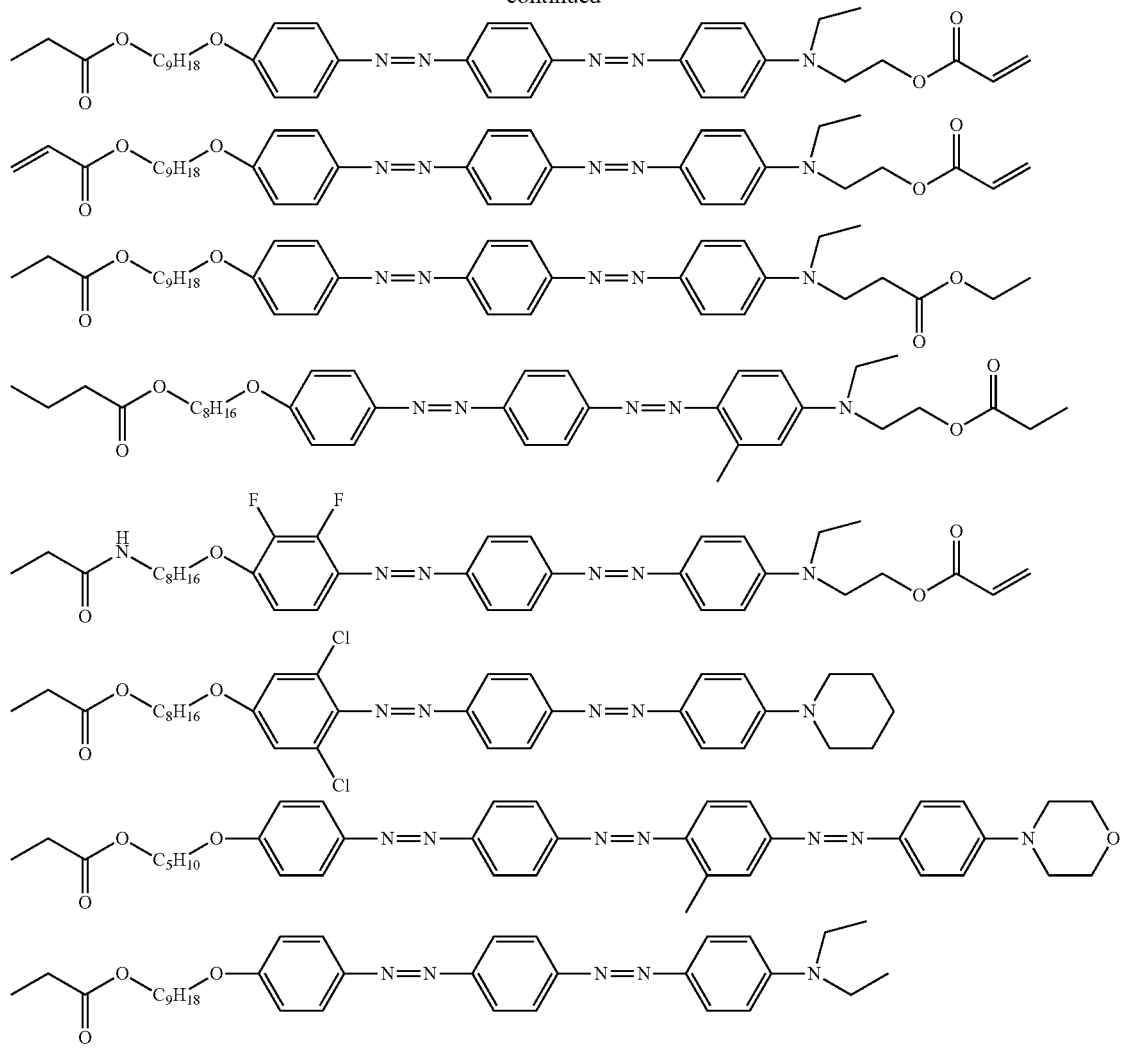

Difference in Log P Value

The log P value is an index expressing the hydrophilicity and the hydrophobicity of a chemical structure. An absolute value of a difference (hereinafter, also referred to as "difference in log P value") between the log P value of a side chain of the first dichroic azo coloring agent compound and the log P value of a side chain of the second dichroic azo coloring agent compound is preferably 2.30 or less, more preferably 2.0 or less, still more preferably 1.5 or less, and particularly preferably 1.0 or less. In a case where the difference in log P value is 2.30 or less, since the affinity between the first dichroic azo coloring agent compound and the second dichroic azo coloring agent compound is enhanced and an aligned structure is more easily formed, the degree of alignment of the light absorption anisotropic layer is further improved.

Further, in a case where the first dichroic azo coloring agent compound or the second dichroic azo coloring agent compound has a plurality of side chains, it is preferable that at least one difference in log P value is in the above-described range.

Here, the side chain of the first dichroic azo coloring agent compound and the side chain of the second dichroic azo coloring agent compound denote a group bonded to the terminal of the above-described chromophore. For example, R1, R2, and R3 represent a side chain in Formula (1) in a case where the first dichroic azo coloring agent compound is a compound represented by Formula (1), and R4, R5, and R6 in Formula (2) represent a side chain in a case where the second dichroic azo coloring agent compound is a compound represented by Formula (2). In particularly, in a case where the first dichroic azo coloring agent compound is a compound represented by Formula (1) and the second dichroic azo coloring agent compound is a compound represented by Formula (2), it is preferable that at least one difference in log P value among the difference in log P value between R1 and R4, the difference in log P value between R1 and R5, the difference in log P value between R2 and R4, and the difference in log P value between R2 and R5 is in the above-described range.

Here, the log P value is an index for expressing the properties of the hydrophilicity and hydrophobicity of a chemical structure and is also referred to as a hydrophilic-hydrophobic parameter. The log P value can be calculated using software such as ChemBioDrawUltra or HSPiP (Ver. 4.1.07). Further, the log P value can be acquired experimentally by the method of the OECD Guidelines for the Testing of Chemicals, Sections 1, Test No. 117 or the like. In the present invention, a value calculated by inputting the structural formula of a compound to HSPiP (Ver. 4.1.07) is employed as the log P value unless otherwise specified.

Third Dichroic Azo Coloring Agent Compound

The third dichroic azo coloring agent compound is a dichroic azo coloring agent compound other than the first dichroic azo coloring agent compound and the second dichroic azo coloring agent compound, and specifically, the chemical structure thereof is different from those of the first dichroic azo coloring agent compound and the second dichroic azo coloring agent compound. In a case where the light absorption anisotropic layer contains the third dichroic azo coloring agent compound, there is an advantage that the tint of the light absorption anisotropic layer is easily adjusted.

The maximum absorption wavelength of the third dichroic azo coloring agent compound is 380 nm or greater and less than 455 nm and preferably in a range of 385 to 454 nm.

Specific examples of the third dichroic azo coloring agent compound include compounds represented by Formula (1) described in WO2017/195833A. Among the compounds, the examples of the third dichroic azo coloring agent compound include compounds other than the first dichroic azo coloring agent compound and the second dichroic azo coloring agent compound.

Specific examples of the third dichroic azo coloring agent compound are shown below, but the present invention is not limited thereto. In the following specific examples, n represents an integer of 1 to 10. Further, Me represents a methyl group.

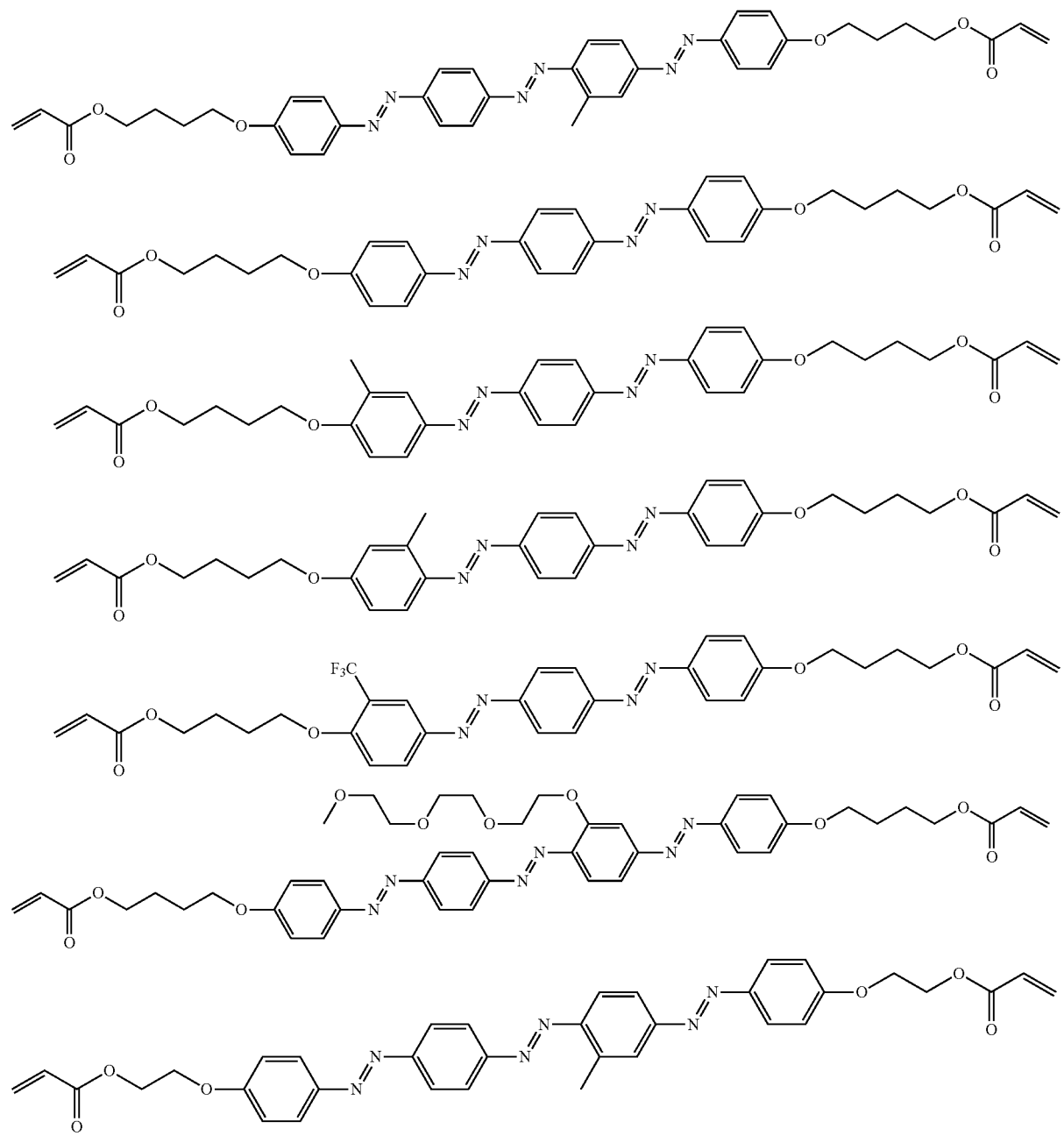

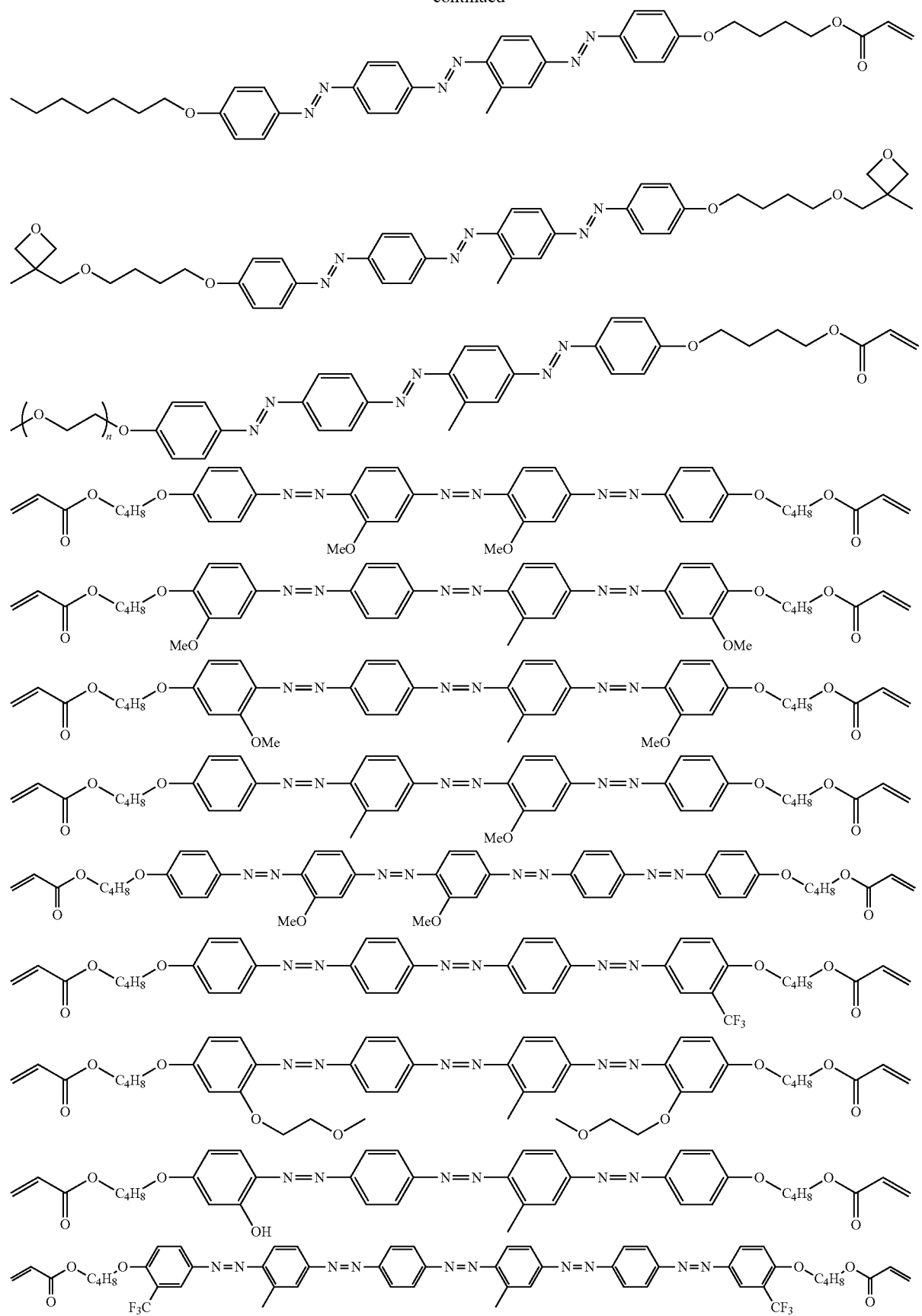

-continued

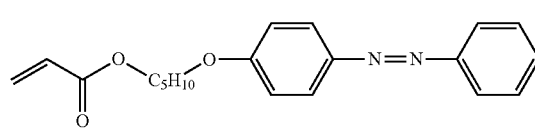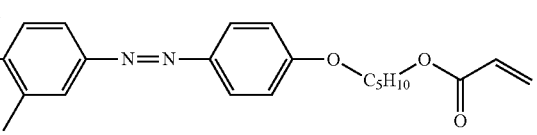

The content of the dichroic substance is 7.0©% by mass or greater with respect to the total solid content mass of the liquid crystal composition as described above, but is preferably 10.0% by mass or greater, more preferably 13.0% by mass or greater, and still more preferably 15.0% by mass or greater from the viewpoint of further enhancing the visibility of the image in a desired direction and sufficiently blocking the image in directions other than the desired direction to visually recognize the image with a more excellent contrast.

From the viewpoint of the visibility of the image, the content of the dichroic substance is preferably 50% by mass or less, more preferably 45% by mass or less, and still more preferably 40% by mass or less, Alignment Agent It is preferable that the liquid crystal composition contains an alignment agent. The transmittance central axis angle θs is easily set to be in the above-described range by allowing the liquid crystal composition to contain an alignment agent.

Examples of the alignment agent include those described in paragraphs [0042] to [0076] of JP2013-543526A, paragraphs [0089] to [0097] of JP2016-523997A, and paragraphs [0153] of JP2020-076920A, and the alignment agents may be used alone or in combination of two or more kinds thereof.

In the present invention, from the viewpoint of further enhancing the visibility of the image in a desired direction and sufficiently blocking the image in directions other than the desired direction, it is preferable that the alignment agent is an onium compound represented by Formula (B1).

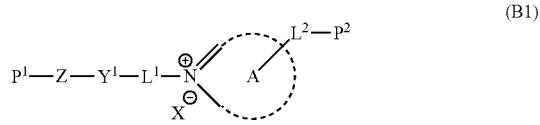

In Formula (B1), the ring A represents a quaternary ammonium ion consisting of a nitrogen-containing heterocyclic ring.

Further, X represents an anion.

Further, $L^1$ represents a divalent linking group.

Further, $L^2$ represents a single bond or a divalent linking group.

Further, $Y^1$ represents a divalent linking group having a 5-membered ring or a 6-membered ring as a partial structure.

Further, Z represents a divalent linking group containing an alkylene group having 2 to 20 carbon atoms as a partial structure.

Further, $P^1$ and $P^2$ each independently represent a monovalent substituent having a polymerizable ethylenically unsaturated bond.

The ring A represents a quaternary ammonium ion consisting of a nitrogen-containing heterocyclic ring. Examples of the ring A include a pyridine ring, a picolinic ring, a 2,2'-bipyridyl ring, a 4,4'-bipyridyl ring, a 1,10-phenanthroline ring, a quinoline ring, an oxazole ring, a thiazole ring, an imidazole ring, a pyrazine ring, a triazole ring, and a tetrazole ring. Among these, a quaternary imidazolium ion and a quaternary pyridinium ion are preferable.

X represents an anion. Examples of X include a halogen anion (such as a fluorine ion, a chlorine ion, a bromine ion, or an iodine ion), a sulfonate ion (such as a methanesulfonate ion, a trifluoromethanesulfonate ion, a methylsulfate ion, a vinyl sulfonate ion, an allylsulfonate ion, a p-toluenesulfonate ion, a p-chlorobenzenesulfonate ion, a p-vinylbenzenesulfonate ion, a 1,3-benzenedisulfonate ion, a 1,5-naphthalenedisulfonate ion, or a 2,6-naphthalenedisulfonate ion), a sulfate ion, a carbonate ion, a nitrate ion, a thiocyanate ion, a perchlorate ion, a tetrafluoroborate ion, a picrate ion, an acetate ion, a benzoate ion, a p-vinylbenzoate ion, a formate ion, a trifluoroacetate ion, a phosphate ion (such as a hexafluorophosphate ion), and a hydroxide ion. Among these, a halogen anion, a sulfonate ion, and a hydroxide ion are preferable. Further, a chlorine ion, a bromine ion, an iodine ion, a methanesulfonate ion, a vinylsulfonate ion, a p-toluenesulfonate ion, and a p-vinylbenzenesulfonate ion are particularly preferable.

$L^1$ represents a divalent linking group. Examples of $L^1$ include a divalent linking group having 1 to 20 carbon atoms which consists of a combination of an alkylene group, —O—, —S—, —CO—, —SO$_2$—, —NRa— (where Ra represents an alkyl group having 1 to 5 carbon atoms or a hydrogen atom), an alkenylene group, an alkynylene group, or an arylene group. $L^1$ represents preferably -AL-, —O-AL-, —CO—O-AL-, or —O—CO-AL- having 1 to 10 carbon atoms, more preferably -AL- or —O-AL- having 1 to 10 carbon atoms, and most preferably -AL- or —O-AL- having 1 to 5 carbon atoms. In addition, AL represents an alkylene group.

$L^2$ represents a single bond or a divalent linking group. Examples of L2 include a divalent linking group having 1 to 10 carbon atoms which consists of a combination of an alkylene group, —O—, —S—, —CO—, —SO$_2$—, —NRa— (where Ra represents an alkyl group having 1 to 5 carbon atoms or a hydrogen atom), an alkenylene group, an alkynylene group, or an arylene group, a single bond, —O—, —O—CO—, —CO—O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, and —O—CO-AL-CO—O—. In addition, AL represents an alkylene group. $L^2$ represents preferably a single bond, -AL-, —O-AL-, or —NRa-AL-O— having 1 to 10 carbon atoms, more preferably a single bond, -AL-, —O-AL-, or —NRa-AL-O— having 1 to 5 carbon atoms, and most preferably a single bond, —O-AL-, or —NRa-AL-O— having 1 to 5 carbon atoms.

$Y^1$ represents a divalent linking group having a 5- or 6-membered ring as a partial structure. Examples of $Y^1$ include a cyclohexyl ring, an aromatic ring, and a heterocyclic ring. Examples of the aromatic ring include a benzene ring, an indene ring, a naphthalene ring, a fluorene ring, a phenanthrene ring, an anthracene ring, a biphenyl ring, and a pyrene ring. Among these, a benzene ring, a biphenyl ring, and a naphthalene ring are particularly preferable. As the heteroatom constituting the heterocyclic ring, a nitrogen atom, an oxygen atom, and a sulfur atom are preferable, and examples thereof include a furan ring, a thiophene ring, a pyrrol ring, a pyrrolin ring, a pyrrolidine ring, an oxazole ring, an isooxazole ring, a thiazole ring, an isothiazole ring, an imidazole ring, an imidazoline ring, an imidazolidine ring, a pyrazole ring, a pyrazoline ring, a pyrazolidine ring, a triazole ring, a frazan ring, a tetrazole ring, a pyran ring, a dioxane ring, dithian ring, thin ring, pyridine ring, piperidine ring, oxazine ring. Morpholine ring, thiazine ring, pyridazine ring, pyrimidine ring, pyrazine ring, piperazine ring, triazine ring and the like. It is preferable that the heterocyclic ring is a 6-membered ring. The divalent linking group having a 5- or 6-membered ring represented by $Y^1$ as a partial structure may further have a substituent (for example, the substituent W described above).

It is preferable that the divalent linking group represented by $Y^1$ is a divalent linking group having two or more 5- or 6-membered rings and more preferable that the divalent linking group has a structure in which two or more rings are linked to each other via a linking group. Examples of the linking group include the examples of the linking group represented by $L^1$ and $L^2$, —C≡C—, —CH═CH—, —CH═N—, —N═CH—, and —N═N—.

Z represents a linking group which has an alkylene group having 2 to 20 carbon atoms as a partial structure and consists of a combination of —O—, —S—, —CO—, and —SO$_2$—, and the alkylene group may have a substituent. Examples of the divalent linking group include an alkyleneoxy group and a polyalkyleneoxy group. The number of carbon atoms of the alkylene group represented by Z is more preferably in a range of 2 to 16, still more preferably in a range of 2 to 12, and particularly preferably in a range of 2 to 8.

P1 and P$_2$ each independently represent a monovalent substituent containing a polymerizable ethylenically unsaturated group. Examples of the monovalent substituent containing a polymerizable ethylenically unsaturated group include substituents represented by Formulae (M-1) to (M-8). That is, the monovalent substituent containing a polymerizable ethylenically unsaturated group may be a substituent consisting of only an ethenyl group as shown in Formula (M-8).

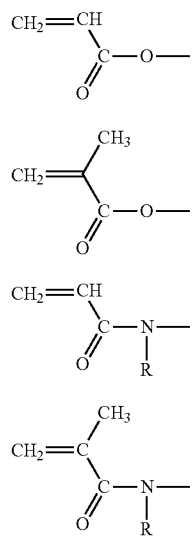

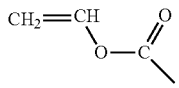

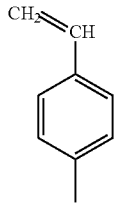

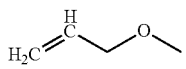

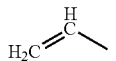

In Formulae (M-3) and (M4), R represents a hydrogen atom or an alkyl group and preferably a hydrogen atom or a methyl group. In Formulae (M-1) to (M-8), Formula (M-1), (M-2), or (M-8) is preferable, and Formula (M-1) or (M-8) is more preferable. In particular, it is preferable that P1 is represented by Formula (M-1). Further, it is preferable that P2 is represented by Formula (M-1) or (M-8), P2 is represented by Formula (M-8) or (M-1) in a compound in which the ring A represents a quaternary imidazolium ion, and P2 is represented by Formula (M-1) in a compound in which the ring A represents a quaternary pyridinium ion.

Examples of the onium compound represented by Formula (B1) include onium salts described in paragraphs 0052 to 0058 of JP2012-208397A, onium salts described in paragraphs 0024 to 0055 of JP2008-026730A, and onium salts described in JP2002-37777A.

In the present invention, from the viewpoint of further enhancing the visibility of the image in a desired direction and sufficiently blocking the image in directions other than the desired direction, it is preferable that the alignment agent is a boronic acid compound represented by Formula (B2).

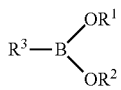

In Formula (B2), $R^1$ and $R^2$ each independently represent a hydrogen atom, an aliphatic hydrocarbon group which may have a substituent, an aryl group which may have a substituent, or a heterocyclic group which may have a substituent.

Further, $R^3$ represents a substituent.

Examples of the aliphatic hydrocarbon group represented by one aspect of $R^1$ and $R^2$ include a substituted or unsubstituted linear or branched alkyl group having 1 to 20 carbon atoms (such as a methyl group, an ethyl group, or an iso-propyl group), a substituted or unsubstituted cyclic alkyl group having 3 to 20 carbon atoms (such as a cyclohexyl group), and an alkenyl group having 2 to 20 carbon atoms (such as a vinyl group).

Further, examples of the aryl group represented by one aspect of $R^1$ and $R^2$ include a substituted or unsubstituted phenyl group having 6 to 20 carbon atoms (such as a phenyl group or a tolyl group) and a substituted or unsubstituted naphthyl group having 10 to 20 carbon atoms.

Further, examples of the heterocyclic group represented by one aspect of $R^1$ and $R^2$ includes a substituted or unsubstituted 5-membered or 6-membered ring group having at least one hetero atom (such as a nitrogen atom, an oxygen atom, or a sulfur atom), and specific examples thereof include a pyridyl group, an imidazolyl group, a furyl group, a piperidyl group, and a morpholino group.

$R^1$ and $R^2$ may be linked to each other to form a ring, and for example, isopropyl groups as $R^1$ and $R^2$ may be linked to each other to form a 4,4,5,5-tetramethyl-1,3,2-dioxaborolane ring.

$R^1$ and $R^2$ represents preferably a hydrogen atom, a linear or branched alkyl group having 1 to 3 carbon atoms, or a form in which these groups are linked to each other to form a ring and more preferably a hydrogen atom.

As the substituent represented by $R^3$, a substituent containing a functional group that can be bonded to a (meth) acryl group is preferable.

Here, examples of the functional group that can be bonded to a (meth)acryl group include a vinyl group, an acrylate group, a methacrylate group, an acrylamide group, a styryl group, a vinyl ketone group, a butadiene group, a vinyl ether group, an oxylanyl group, an aziridinyl group and an oxetane group. Among these, a vinyl group, an acrylate group, a methacrylate group, a styryl group, an oxylanyl group or an oxetane group is preferable, and a vinyl group, an acrylate group, an acrylamide group, or a styryl group is more preferable.

It is preferable that $R^3$ represents a substituted or unsubstituted aliphatic hydrocarbon group, an aryl group, or a heterocyclic group containing a functional group that can be bonded to a (meth)acryl group.

Examples of the aliphatic hydrocarbon group include a substituted or unsubstituted linear or branched alkyl group having 1 to 30 carbon atoms (such as a methyl group, an ethyl group, an iso-propyl group, an n-propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, a sec-butyl group, a tert-butyl group, an isopentyl group, a neopentyl group, a 1-methylbutyl group, an isohexyl group, or a 2-methylhexyl group), a substituted or unsubstituted cyclic alkyl group having 3 to 20 carbon atoms (such as a cyclopentyl group, a cyclohexyl group, a 1-adamantyl group, or a 2-norbornyl group, etc.), and an alkenyl group having 2 to 20 carbon atoms (such as a vinyl group, a 1-propenyl group, a 1-butenyl group, or a 1-methyl-1-propenyl group).

Examples of the aryl group include a substituted or unsubstituted phenyl group having 6 to 50 carbon atoms (such as a phenyl group, a tolyl group, a styryl group, a 4-benzoyloxyphenyl group, a 4-phenoxycarbonylphenyl group, a 4-biphenyl group, or a 4-(4-octyloxybenzoyloxy) phenoxycarbonylphenyl group), and a substituted or unsubstituted naphthyl group having 10 to 50 carbon atoms (such as an unsubstituted naphthyl group).

Examples of the heterocyclic group include a substituted or unsubstituted 5-membered or 6-membered ring group containing at least one heteroatom (such as a nitrogen atom, an oxygen atom, or a sulfur atom), and examples thereof include pyrrole, furan, thiophene, pyrazole, imidazole, triazole, oxazole, isoxazole, oxadiazole, thiazole, thiadiazole, indole, carbazole, benzofuran, dibenzofuran, thianaphthene, dibenzothiophene, indazole benzimidazole, anthranil, benzisoxazole, benzoxazole, benzothiazole, purine, pyridine, pyridazine, pyrimidine, pyrazine, triazine, quinoline, acridine, isoquinoline, phthalazine, quinazoline, quinoxaline, naphthyridine, phenanthroline, pteridine, morpholine, and piperidine.

Examples of the boronic acid compound represented by Formula (B2) include the boronic acid compound represented by General Formula (I) described in paragraphs 0023 to 0032 of JP2008-225281A.

Preferred examples of the compound represented by Formula (B2) include the compounds shown below.

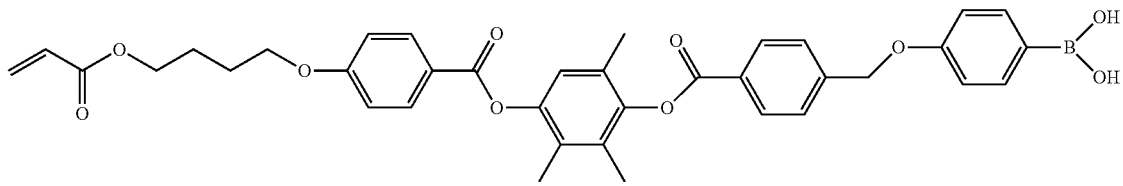

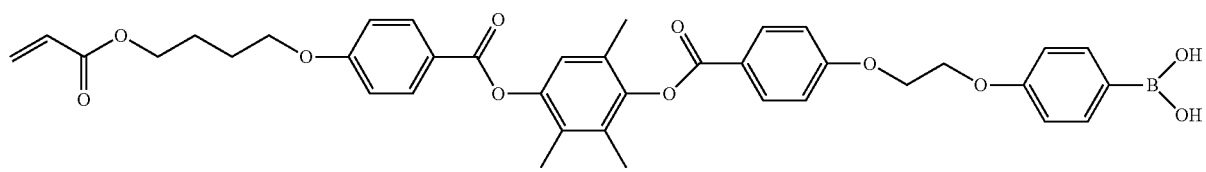

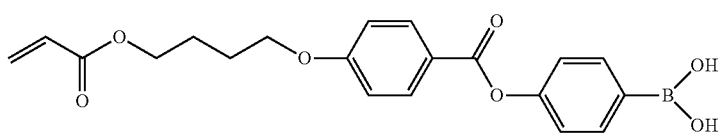

The content of the alignment agent is preferably in a range of 0.01 to 0.1 parts by mass and more preferably in a range of 0.03 to 0.08 with respect to 100 parts by mass of the liquid crystal compound and the dichroic substance contained in the liquid crystal composition.

Solvent

From the viewpoint of workability, it is preferable that the liquid crystal composition contains a solvent.

Examples of the solvent include organic solvents such as ketones (such as acetone, 2-butanone, methyl isobutyl ketone, cyclopentanone, cyclohexanone, or acetylacetone), ethers (such as dioxane, tetrahydrofuran, tetrahydropyran, dioxolane, tetrahydrofurfuryl alcohol, cyclopentyl methyl ether, or dibutyl ether), aliphatic hydrocarbons (such as hexane), alicyclic hydrocarbons (such as cyclohexane), aromatic hydrocarbons (such as benzene, toluene, xylene, tetralin, or trimethylbenzene), halocarbons (such as dichloromethane, trichloromethane (chloroform), dichloroethane, dichlorobenzene, 1,1,2,2-tetrachloroethane, or chlorotoluene), esters (such as methyl acetate, ethyl acetate, butyl acetate, diethyl carbonate, ethyl acetoacetate, n-pentyl acetate, ethyl benzoate, benzyl benzoate, butyl carbitol acetate, diethylene glycol monoethyl ether acetate, or isoamyl acetate), alcohols (such as ethanol, isopropanol, butanol, cyclohexanol, furfuryl alcohol, 2-ethylhexanol, octanol, benzyl alcohol, ethanolamine, ethylene glycol, propylene glycol, diethylene glycol, diethylene glycol monomethyl ether, diethylene glycol monoethyl ether, or diethylene glycol monobutyl ether), phenols (such as phenol or cresol), cellosolves (such as methyl cellosolve, ethyl cellosolve, or 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, or 1,3-dimethyl-2-imidazolidinone), and heterocyclic compounds (such as pyridine or 2,6-lutidine), and water.

These solvents may be used alone or in combination of two or more kinds thereof.

In a case where the liquid crystal composition contains a solvent, the content of the solvent is preferably in a range of 60% to 99.5% by mass, more preferably in a range of 70% to 99% by mass, and particularly preferably in a range of 75% to 98% by mass with respect to the total mass (100% by mass) of the liquid crystal composition.

Polymerization Initiator

The liquid crystal composition may contain a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds (paragraph [0065] of JP2016-27384A), and acylphosphine oxide compounds (JP1988-40799B (JP-S63-40799B), JP1993-29234B (JP-H05-29234B), JP1998-95788A (JP-H10-95788A), and JP1998-29997A (JP-H10-29997A)).

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

In a case where the liquid crystal composition contains a polymerization initiator, the content of the polymerization initiator is preferably in a range of 0.01% to 30% by mass and more preferably in a range of 0.1% to 15% by mass with respect to the total solid content mass of the liquid crystal composition.

Polymerizable Compound

The liquid crystal composition may contain a polymerizable compound.

Examples of the polymerizable compound include a compound containing an acrylate (such as a (meth)acrylate monomer).

In a case where the liquid crystal composition contains a polymerizable compound, the content of the polymerizable compound is preferably in a range of 0.5% to 50% by mass and more preferably in a range of 1.0% to 40% by mass with respect to the total solid content mass of the liquid crystal composition.

Interface Improver

The liquid crystal composition may contain an interface improver.

The interface improver is not particularly limited, and a polymer-based interface improver or a low-molecular-weight interface improver can be used, and the compounds described in paragraphs [0253] to [0293] of JP2011-237513A can also be used.

Further, fluorine (meth)acrylate-based polymers described in [0018] to [0043] of JP2007-272185A can also be used.

Further, examples of the interface improver include the compound described in paragraphs [0079] to [0102] of JP2007-069471A, the polymerizable liquid crystal compounds represented by Formula (4) of JP2013-047204A (particularly the compounds described in paragraphs [0020] to [0032]), the polymerizable liquid crystal compounds represented by Formula (4) described in JP2012-211306A (particularly the compounds described in paragraphs [0022] to [0029]), the liquid crystal alignment promoters represented by Formula (4) described in JP2002-129162A (particularly the compounds described in paragraphs [0076] [0092] and paragraphs [0082] to [0084]), the compounds represented by Formulae (4), (11), and (I) described in JP2005-099248A (particularly the compounds described in paragraphs [0092] to [0096]), the compounds described in paragraphs [0013] to [0059] of JP4385997B, the compounds described in paragraphs [0018] to [0044] of JP5034200B, and the compounds of described in paragraphs [0019] to [0038] of JP4895088B.

The interface improver may be used alone or in combination of two or more kinds thereof.

The content of the interface improver is preferably in a range of 0.005% to 15% by mass, more preferably in a range of 0.01% to 5% by mass, and still more preferably in a range of 0.015% to 3% by mass with respect to the total solid content mass of the liquid crystal composition.

Method of Forming Light Absorption Anisotropic Layer

The method for forming the light absorption anisotropic layer is not particularly limited, and examples thereof include a method of sequentially performing a step of applying the liquid crystal composition described above (hereinafter, also referred to as "composition for forming a light absorption anisotropic layer") to form a coating film (hereinafter, also referred to as "coating film forming step") and a step of aligning liquid crystal components and dichroic substances contained in the coating film (hereinafter, also referred to as "aligning step").

Further, the liquid crystal component is a component that also includes a dichroic substance having liquid crystallinity in a case where the above-described dichroic substance has liquid crystallinity, in addition to the above-described liquid crystal compound.

Coating Film Forming Step

The coating film forming step is a step of applying a composition for forming a light absorption anisotropic layer to form a coating film.

The composition for forming a light absorption anisotropic layer can be easily applied by using the composition for forming a light absorption anisotropic film which contains the above-described solvent or using a liquid such as a melt obtained by heating the composition for forming a light absorption anisotropic film.

Specific examples of the method of applying the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

Aligning Step

The aligning step is a step of aligning the liquid crystal component contained in the coating film. In this manner, a light absorption anisotropic layer is obtained.

The aligning step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

Here, the liquid crystal components contained in the composition for forming a light absorption anisotropic layer may be aligned by the coating film forming step or the drying treatment described above. For example, in an embodiment in which the composition for forming a light absorption anisotropic layer is prepared as a coating solution containing a solvent, a coating film having light absorption anisotropy (that is, a light absorption anisotropic layer) is obtained by drying the coating film and removing the solvent from the coating film.

In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability or the like. It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the light absorption anisotropic layer.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal components contained in the coating film can be fixed. The cooling means is not particularly limited and can be performed according to a known method.

The light absorption anisotropic layer can be obtained by performing the above-described steps.

In the present embodiment, examples of the method of aligning the liquid crystal components contained in the coating film include a drying treatment and a heat treatment, but the method is not limited thereto, and the liquid crystal components can be aligned by a known alignment treatment.

Other Steps

The method of forming the light absorption anisotropic layer may include a step of curing the light absorption anisotropic layer after the aligning step (hereinafter, also referred to as a "curing step").

The curing step is performed by heating the light absorption anisotropic layer and/or irradiating the layer with light (exposing the layer to light), for example, in a case where the light absorption anisotropic layer contains a crosslinkable group (polymerizable group). Between these, it is preferable that the curing step is performed by irradiating the film with light.

Various light sources such as infrared rays, visible light, and ultraviolet rays can be used as the light source for curing, but ultraviolet rays are preferable. In addition, ultraviolet rays may be applied while the film is heated during curing, or ultraviolet rays may be applied through a filter that transmits only a specific wavelength.

In a case where the exposure is performed while the layer is heated, the heating temperature during the exposure depends on the transition temperature of the liquid crystal components contained in the liquid crystal film to a liquid crystal phase, but is preferably in a range of 25° to 140° C.

Further, the exposure may be performed under a nitrogen atmosphere. In a case where the curing of the liquid crystal film proceeds by radical polymerization, from the viewpoint of reducing inhibition of polymerization by oxygen, it is preferable that exposure is performed in a nitrogen atmosphere.

The thickness of the light absorption anisotropic layer is not particularly limited, but is preferably in a range of 100 to 8000 nm and more preferably in a range of 300 to 5000 nm from the viewpoint of reducing the size and the weight.

First Adjacent Layer

A first adjacent layer of the optical laminate according to the embodiment of the present invention is disposed in contact with one surface of the light absorption anisotropic layer.

A refractive index n1 of the first adjacent layer is in a range of 1.46 to 1.72, and from the viewpoint of visually recognizing an image with more excellent clearness as observed in a desired direction, preferably in a range of 1.48 to 1.68 and more preferably in a range of 1.50 to 1.65.

The refractive index n1 of the first adjacent layer can be adjusted to be in the above-described range by using a material having a refractive index in the above-described range.

The refractive index n1 denotes a value obtained by acquiring an average refractive index ($n_{ave}$) at a wavelength of 450 nm, an average refractive index ($n_{ave}$) at 550 nm, and an average refractive index ($n_{ave}$) at 650 nm according to Equation (R1) and arithmetically averaging the average refractive indices ($n_{ave}$) at each wavelength.

$$n_{ave}=(n_x+n_y+n_z)/3 \quad \text{Equation (R1)}$$

In Equation (R1), the direction in which the refractive index is maximized in the plane of the first adjacent layer is defined as an x-axis, the direction orthogonal to the x-axis is defined as a y-axis, and the normal direction with respect to the plane is defined as a z-axis, and the respective refractive indices are defined as $n_x$, $n_y$, and $n_z$. Each refractive index is measured using a spectroscopic ellipsometer M-2000U (manufactured by J. A. Woollam. Co., Inc.). The refractive index of the first adjacent layer may be isotropic, and in this case, "$n_x=n_y=n_z$" is satisfied.

The first adjacent layer is not particularly limited as long as the refractive index n1 is in the above-described range, but it is preferable that the first adjacent layer is an alignment film or a barrier layer from the viewpoint of visually recognizing an image with more excellent clearness as observed in a desired direction.

Further, from the viewpoint of visually recognizing an image with more excellent clearness as observed in a desired direction, it is preferable that the first adjacent layer contains polyvinyl alcohol, polyimide, or a derivative thereof. Examples of the first adjacent layer containing such a component include an alignment film described below.

As the alignment film, a film capable of tilting and aligning a dichroic substance is preferable.

An alignment film can be provided by means such as a rubbing treatment performed on a film surface of an organic compound (preferably a polymer), oblique vapor deposition of an inorganic compound, formation of a layer having microgrooves, or accumulation of an organic compound (such as w-tricosanoic acid, dioctadecyhmethylammonium chloride, or methyl stearylate) according to a Langmuir-Blodgett method (LB film). Further, an alignment film in which an alignment function is generated by application of an electric field, application of a magnetic field, or irradiation with light is also known. Among these, in the present invention, an alignment film formed by performing a rubbing treatment is preferable from the viewpoint of easily controlling the pretilt angle of the alignment film, and a photo-alignment film formed by irradiation with light is also preferable from the viewpoint of the uniformity of alignment.

A polymer material used for the alignment film formed by performing a rubbing treatment is described in multiple documents, and a plurality of commercially available products can be used.

From the viewpoint of visually recognizing an image with more excellent clearness as observed in a desired direction, the first adjacent layer is preferably an alignment film containing polyvinyl alcohol, polyimide, or a derivative thereof and more preferably an alignment film containing modified or unmodified polyvinyl alcohol.

The alignment film can refer to the description on page 43, line 24 to page 49, line 8 of WO2001/88574A1.

The thickness of the alignment film is preferably in a range of 0.01 to 10 μm and more preferably in a range of 0.01 to 1 μm.

A photo-alignment material used for an alignment film formed by irradiation with light is described in a plurality of documents. In the present invention, preferred examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having a photo-alignment unit described in JP2002-265541A and JP2002-317013A, photocrosslinkable silane derivatives described in JP4205195B and JP4205198B, and photocrosslinkable polyimides, polyamides, or esters described in JP2003-520878A, JP2004-529220A, and JP4162850B. Among these, the azo compounds, the photocrosslinkable polyimides, the polyamides, or the esters are more preferable.

The photo-alignment film formed of the above-described material is irradiated with linearly polarized light or non-polarized light to produce a photo-alignment film.

In the present specification, the "irradiation with linearly polarized light" and the "irradiation with non-polarized light" are operations for causing a photoreaction in the photo-alignment material. The wavelength of the light to be used varies depending on the photo-alignment material to be used and is not particularly limited as long as the wavelength is required for the photoreaction. The peak wavelength of light to be used for irradiation with light is preferably in a range of 200 nm to 700 nm, and ultraviolet light having a peak wavelength of 400 nm or less is more preferable.

Examples of the light source used for light irradiation include commonly used light sources, for example, lamps such as a tungsten lamp, a halogen lamp, a xenon lamp, a xenon flash lamp, a mercury lamp, a mercury xenon lamp, or a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic substance polarizing plate, or a wire grid polarizing plate), a method of using a prism-based element (for example, a Glan-Thompson prism) or a reflective type polarizer for which a Brewster's angle is used, or a method of using light emitted from a laser light source having polarized light can be employed. In addition, only light having a required wavelength may be selectively applied using a filter, a wavelength conversion element, or the like.

In a case where light to be applied is linearly polarized light, a method of applying light vertically or obliquely to the upper surface of the alignment film or the surface of the alignment film from the rear surface is employed. The incidence angle of light varies depending on the photo-alignment material, but is preferably in a range of 0° to 90° (vertical) and more preferably in a range of 40° to 90°.

In a case where light to be applied is non-polarized light, the alignment film is irradiated with non-polarized light obliquely. The incidence angle is preferably in a range of 10° to 80°, more preferably in a range of 20° to 60°, and particularly preferably in a range of 30° to 50°.

The irradiation time is preferably in a range of 1 minute to 60 minutes and more preferably in a range of 1 minute to 10 minutes.

In a case where patterning is required, a method of performing irradiation with light using a photomask as many times as necessary for pattern preparation or a method of writing a pattern by laser light scanning can be employed.

It is preferable that the barrier layer is disposed at least one of a side of a surface of the first adjacent layer apposite to the surface where the light absorption anisotropic layer is provided or a side of a surface of the second adjacent layer apposite to the surface where the light absorption anisotropic layer is provided.

Here, the barrier layer is also referred to as a gas-shielding layer (oxygen-shielding layer) and has a function of protecting the polarizer of the present invention from gas such as oxygen in the atmosphere, the moisture, or the compound contained in an adjacent layer.

The barrier layer can refer to, for example, the description in paragraphs [0014] to [0054] of JP2014-159124A, paragraphs [0042] to [0075] of JP2017-121721A, paragraphs [0045] of JP2017-115076A, paragraphs [0010] to [0061] of JP2012-213938A, and paragraphs [0021] to [0031] of JP2005-169994A.

Second Adjacent Layer

The second adjacent layer of the optical laminate according to the embodiment of the present invention is disposed in contact with the surface of the light absorption anisotropic layer apposite to the one surface (hereinafter, also referred to as "the other surface").

The refractive index n2 of the second adjacent layer is in a range of 1.46 to 1.72, and from the viewpoint of visually recognizing an image with more excellent clearness as observed in a desired direction, preferably in a range of 1.48 to 1.68 and more preferably in a range of 1.50 to 1.65.

The refractive index n2 of the second adjacent layer can be adjusted to be in the above-described range by using a material having a refractive index in the above-described range.

The refractive index n2 is obtained by the same method as that for the refractive index n1 of the first adjacent layer except that the second adjacent layer is used.

In the optical laminate according to the embodiment of the present invention, from the viewpoint of visually recognizing an image with more excellent clearness as observed in a desired direction, both the refractive index n1 and the refractive index n2 are preferably in a range of 1.48 to 1.68 and more preferably in a range of 1.50 to 1.65.

From the viewpoint of visually recognizing an image with more excellent clearness as observed in a desired direction, the absolute value of the difference between the refractive index n1 and the refractive index n2 is preferably 0.21 or less and more preferably 0.04 or less.

As a result of focusing on the relationship between the refractive index n1 and the refractive index n2 and the transmittance central axis angle $\theta s$, the details of the reason have not been clarified yet, but the present inventors found that an image with more excellent clearness as observed in a desired direction can be visually recognized by satisfying both Equation (N1) and Equation (N2). Therefore, it is assumed that the refractive index n1 and the refractive index n2 and the transmittance central axis angle $\theta s$ are closely related to each other.

$$0.037 \leq n1/\theta s \leq 0.083 \quad \text{(N1)}$$

$$0.037 \leq n2/\theta s \leq 0.083 \quad \text{(N2)}.$$

From the viewpoint of visually recognizing an image with more excellent clearness as observed in a desired direction, $n1/\theta s$ in Equation (N1) is more preferably in a range of 0.040 to 0.078 and still more preferably in a range of 0.041 to 0.070.

From the viewpoint of visually recognizing an image with more excellent clearness as observed in a desired direction, $n2/\theta s$ in Equation (N2) is more preferably in a range of 0.040 to 0.078 and still more preferably in a range of 0.041 to 0.070.

The second adjacent layer is not particularly limited as long as the refractive index n2 is in the above-described range, but from the viewpoint of visually recognizing an image with more excellent clearness as observed in a desired direction, it is preferable that the second adjacent layer is a pressures sensitive adhesive layer, the above-described barrier layer, or the above-described alignment film. In a case where the second adjacent layer is an alignment film or a barrier layer, specific examples and preferred embodiments thereof are the same as those of the alignment film or barrier layer serving as the first adjacent layer.

Further, from the viewpoint of visually recognizing an image with more excellent clearness as observed in a desired direction, it is preferable that the second adjacent layer contains polyvinyl alcohol, polyimide, or a derivative thereof. Examples of the second adjacent layer containing such a component include the above-described alignment film.

In the present specification, the pressure sensitive adhesive layer denotes a pressure sensitive adhesive layer composed of an adhesive layer formed of an adhesive or a pressure sensitive adhesive layer formed of a pressure sensitive adhesive.

From the viewpoint of visually recognizing an image with more excellent clearness as observed in a desired direction, it is preferable that the adhesive constituting the adhesive layer is a polyvinyl alcohol (PVA)-based adhesive or a curing type adhesive. From the viewpoint of durability of the dichroic substance, it is more preferable that the adhesive is a polyvinyl alcohol (PVA)-based adhesive having low oxygen permeability.

As the curable adhesive, an active energy ray curing type adhesive is preferable, and an ultraviolet (UV) curing type adhesive is more preferable.

Examples of the UV curing type adhesive include a radical polymerization curing type adhesive and a cationic polymerization curing type adhesive.

Examples of the radical polymerization curing type adhesive include a (meth)acrylate-based adhesive. Examples of the curable component in the (meth)acrylate-based adhesive include a compound containing a (meth)acryloyl group and a compound containing a vinyl group.

Examples of the cationic polymerization curing type adhesive include a compound containing an epoxy group and an oxetanyl group. The compound containing an epoxy group is not particularly limited as long as the compound contains at least two epoxy groups in a molecule, and various generally known curable epoxy compounds can be used. Preferred examples of the epoxy compound include a compound (aromatic epoxy compound) containing at least two epoxy groups and at least one aromatic ring in a molecule and a compound (alicyclic epoxy compound) containing at least two epoxy groups in a molecule, in which at least one of the epoxy groups is formed between two adjacent carbon atoms constituting an alicyclic ring.

Examples of the pressure sensitive adhesive constituting the pressure sensitive adhesive layer include a rubber-based pressure sensitive adhesive, an acrylic pressure sensitive adhesive, a silicone-based pressure sensitive adhesive, a urethane-based pressure sensitive adhesive, a vinyl alkyl ether-based pressure sensitive adhesive, a polyvinyl alcohol-based pressure sensitive adhesive, a polyvinylpyrrolidone-based pressure sensitive adhesive, a polyacrylamide-based pressure sensitive adhesive, and a cellulose-based pressure sensitive adhesive. Among these, an acrylic pressure sensitive adhesive (pressure sensitive adhesive) is preferable from the viewpoints of the transparency, the weather resistance, the heat resistance, and the like.

The pressure sensitive adhesive layer may contain additives such as conductive particles, thermally expandable particles, a crosslinking agent (such as an isocyanate-based crosslinking agent or an epoxy-based crosslinking agent), a viscosity imparting agent (such as a rosin derivative resin, a polyterpene resin, a petroleum resin, or an oil-soluble phenol resin), a plasticizer, a filler, an antiaging agent, a surfactant, an ultraviolet absorbing agent, a light stabilizer, and an antioxidant in addition to the base material (the pressure sensitive adhesive or the adhesive).

The thickness of the pressure sensitive adhesive layer is not particularly limited, but is preferably in a range of 0.01 to 30 μm, more preferably in a range of 0.02 to 20 μm, and still more preferably in a range of 0.05 to 10 μm.

Other Layers

The optical laminate according to the embodiment of the present invention may further include other layers in addition to the above-described layers (hereinafter, also referred to as "other layers"). Specific examples of other layers include a transparent film base material and a barrier layer.

Transparent Film Base Material

It is preferable that the transparent film base material is disposed on at least one of a side of a surface of the first adjacent layer apposite to the surface where the light absorption anisotropic layer is provided or a side of a surface of the second adjacent layer apposite to the surface where the light absorption anisotropic layer is provided.

As the transparent film base material, a known transparent resin film such as a transparent resin plate, a transparent resin sheet, or the like can be used without particular limitation. Examples of the transparent resin film include a cellulose acylate film (such as a cellulose triacetate film (refractive index of 1.48), a cellulose diacetate film, a cellulose acetate butyrate film, or a cellulose acetate propionate film), a polyethylene terephthalate film, a polyether sulfone, a polyacrylic resin film, a polyurethane-based resin film, a polyester film, a polycarbonate film, a polysulfone film, a polyether film, a polymethylpentene film, a polyether ketone film, and a (meth)acrylonitrile film.

Among these, a cellulose acylate film which is highly transparent, has a small optical birefringence, is easily produced, and is typically used as a protective film of a polarizing plate is preferable, and a cellulose triacetate film is particularly preferable.

The thickness of the transparent film base material is typically in a range of 20 μm to 100 μm.

In the present invention, it is particularly preferable that the transparent film base material is a cellulose ester-based film having a film thickness 20 to 70 μm.

Viewing Angle Control System

A viewing angle control system according to the embodiment of the present invention includes a polarizer having an absorption axis in the in-plane direction and the above-described optical laminate according to the embodiment of the present invention.

The polarizer is disposed on a side of the first adjacent layer in the optical laminate and on a side of the second adjacent layer in the optical laminate.

Polarizer

The polarizer of the viewing angle control system according to the embodiment of the present invention is not particularly limited as long as the polarizer is a member having an absorption axis in the plane and having a function of converting light into specific linear polarized light, and a known polarizer of the related art can be used.

As the polarizer, an iodine-based polarizer, a dye-based polarizer obtained by using a dichroic dye, a polyene-based polarizer, or the like is used. Examples of the iodine-based polarizer and the dye-based polarizer include a coating type polarizer and a stretching type polarizer, and both polarizers can be applied. A polarizer in which a dichroic organic coloring agent is aligned by using alignment of the liquid crystal compound is preferable as the coating type polarizer, and a polarizer prepared by adsorbing iodine or a dichroic dye on polyvinyl alcohol and stretching the polyvinyl alcohol is preferable as the stretching type polarizer.

Further, examples of the method of obtaining a polarizer by stretching and dyeing a laminated film in which a polyvinyl alcohol layer is formed on a base material include methods described in JP5048120B, JP5143918B, JP4691205B, JP4751481B, and JP4751486B, and known techniques relating to these polarizers can also be preferably used.

Among these, from the viewpoints of the availability and the excellent degree of polarization, a polymer containing a polyvinyl alcohol-based resin (a polymer having —$CH_2$—CHOH— as a repeating unit, particularly at least one selected from the group consisting of polyvinyl alcohol and ethylene-vinyl alcohol copolymers) is preferable.

In the present invention, the thickness of the polarizer is not particularly limited, but is preferably in a range of 3 μm to 60 μm, more preferably in a range of 5 μm to 20 m, and still more preferably in a range of 5 μm to 10 μm.

In the viewing angle control system according to the embodiment of the present invention, the angle φ between a direction φ1 in which the transmittance central axis of the light absorption anisotropic layer is orthogonally projected on the film surface and an absorption axis φ2 of the polarizer is preferably in a range of 45° to 90°, more preferably in a range of 80° to 90°, and still more preferably in a range of 88° to 90°. As the angle is closer to 90°, the illuminance contrast between a direction in which an image display device is easily seen and a direction in which the image display device is not easily seen can be provided.

In the viewing angle control system according to the embodiment of the present invention, the optical laminate and the polarizer may be laminated via a pressure sensitive adhesive layer, or the optical laminate and the polarizer may be laminated by directly coating the optical laminate with the polarizer. Further, in a case where the optical laminate includes a pressure sensitive adhesive layer, the optical laminate and the polarizer can be laminated without providing a new pressure sensitive adhesive layer.

Other Layers

In the viewing angle control system of the present invention, the above-described light absorption anisotropic layer can be used by being combined with an optically anisotropic film or a polarizer in order to control the angle dependence of the viewing angle. For example, as the transparent base film, a resin film having optical anisotropy which consists of a polymer containing carbonate, cycloolefin, cellulose acylate, methyl methacrylate, styrene, a maleic acid anhydride, and the like can also be used.

Image Display Device

An image display device according to the embodiment of the present invention is an image display device including a display element and the above-described viewing angle control system according to the embodiment of the present invention, in which the viewing angle control system is disposed on at least one main surface of the display element.

Further, the image display device according to the embodiment of the present invention is an image display device in which the optical laminate of the viewing angle control system is disposed on a viewing side with respect to the polarizer of the viewing angle control system, that is, an image display device which includes the optical laminate, the polarizer, and the display element in this order from the viewing side.

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable. That is, as the image display device according to the embodiment of the present invention, a liquid crystal display device obtained by using a liquid crystal cell as a display element or an organic EL display device obtained by using an organic EL display panel as a display element is preferable.

Some image display devices are thin and can be molded into a curved surface. Since the light absorption anisotropic layer used in the present invention is thin and easily bent, the light absorption anisotropic layer can be suitably applied to an image display device having a curved display surface.

Further, some image display devices have a pixel density of greater than 250 ppi and are capable of high-definition display. The light absorption anisotropic layer used in the present invention can be suitably applied to such a high-definition image display device without causing moire.

Liquid Crystal Display Device

Preferred examples of the liquid crystal display device which is an example of the display device of the present invention include an embodiment having a viewing angle control system and a liquid crystal cell.

Examples of the specific configuration thereof include a configuration in which the viewing angle control system is disposed on a front-side polarizing plate or a rear-side polarizing plate. In these configurations, the viewing angle at which the vertical direction or the horizontal direction is light-shielded can be controlled.

Further, the viewing angle control system may be disposed on both polarizing plates of the front-side polarizing plate and the rear-side polarizing plate. With such a configuration, it is possible to control the viewing angle in which the omniazimuth is light-shielded and light is transmitted only in the front direction.

Further, a plurality of viewing angle control systems may be laminated with a retardation layer. By controlling the phase difference value and the optical axis direction, the transmission performance and the light shielding performance can be controlled. For example, the omniazimuth is light-shielded by arranging the polarizer, the optical laminate, the λ/2 wave plate (the axis angle is an angle deviated by 45° from the alignment direction of the polarizer), and the optical laminate so that the viewing angle control in which light is transmitted only in the front direction can be made.

As the retardation layer, a positive A-plate, a negative A-plate, a positive C plate, a negative C plate, a B plate, an O plate, or the like can be used. From the viewpoint of reducing the thickness of the viewing angle control system, it is preferable that the thickness of the retardation layer is small as long as the optical characteristics, the mechanical properties, and the manufacturing suitability are not impaired, and specifically, the thickness thereof is preferably in a range of 1 to 150 μm, more preferably in a range of 1 to 70 μm, and still more preferably in a range of 1 to 30 μm.

Hereinafter, the liquid crystal cell constituting the liquid crystal display device will be described in detail.

Liquid Crystal Cell

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal molecules are substantially horizontally aligned at the time of no voltage application and further twisted aligned at 60° to 120°. The liquid crystal cell in a TN mode is most frequently used as a color TFT liquid crystal display device and is described in a plurality of documents.

In the liquid crystal cell in a VA mode, rod-like liquid crystalline molecules are substantially vertically aligned at the time of no voltage application. The concept of the liquid crystal cell in a VA mode includes (1) a liquid crystal cell in a VA mode in a narrow sense where rod-like liquid crystal molecules are aligned substantially vertically at the time of no voltage application and substantially horizontally at the time of voltage application (described in JP1990-176625A (JP-H02-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application (described in proceedings of Japanese Liquid Crystal Conference, pp. 58 to 59 (1998)), and (4) a liquid crystal cell in a SURVIVAL mode (presented at LCD International 98). Further, the liquid crystal cell may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, liquid crystal compounds are aligned substantially parallel to the substrate, and the liquid crystal molecules respond planarly through application of an electric field parallel to the substrate surface. That is, the liquid crystal compounds are aligned in the plane in a state where no electric field is applied. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

Organic EL Display Device

As an organic EL display device which is an example of the image display device according to the embodiment of the present invention, a form of a display device including the above-described viewing angle control system, a λ/4 plate, and an organic EL display panel in this order from the viewing side is suitably exemplified.

Further, similarly to the liquid crystal display device described above, a plurality of viewing angle control systems may be laminated via the retardation layer and disposed on the organic EL display panel. By controlling the phase difference value and the optical axis direction, the transmission performance and the light shielding performance can be controlled.

Further, the organic EL display panel is a display panel formed of an organic EL element obtained by sandwiching an organic light-emitting layer (organic electroluminescence layer) between electrodes (between a cathode and an anode). The configuration of the organic EL display panel is not particularly limited, and a known configuration is employed.

EXAMPLES

Hereinafter, the present invention will be described in more detail with reference to examples. Materials, used amounts, ratios, treatment contents, treatment procedures, and the like described in the following examples can be appropriately changed without departing from the spirit of the present invention. Therefore, the scope of the present invention should not be limitatively interpreted by the following examples.

Example 1

Formation of Alignment Film

A surface of a cellulose acylate film (TAC base material having a thickness of 40 μm; TG40, FUJIFILM Corporation) was saponified with an alkaline solution and coated with a composition 1 for forming an alignment film using a wire bar. The support on which the coating film was formed was dried with hot air at 60° C. for 60 seconds and further dried with hot air at 100° C. for 120 seconds to form an alignment film 1, thereby obtaining a TAC film 1 with an alignment film. The film thickness of the alignment film 1 was 1 μm.

| Composition 1 for forming alignment film |
|---|
| Modified polyvinyl alcohol shown below: 3.80 parts by mass |
| IRGACURE2959: 0.20 parts by mass |

| Composition 1 for forming alignment film |
|---|
| Water: 70 parts by mass |
| Methanol: 30 parts by mass |

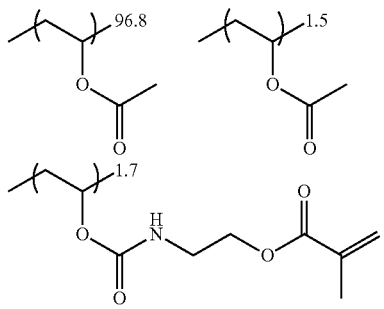

Preparation of Light Absorption Anisotropic Layer 1

The surface of the obtained alignment film 1 was subjected to a rubbing treatment, continuously coated with the following composition C1 for forming a light absorption anisotropic layer using a wire bar, heated at 120° C. for 60 seconds, and cooled to room temperature (23° C.).

Next, the coating layer was heated at 80° C. for 60 seconds and cooled to room temperature again.

Thereafter, an optical laminate 1 having a light absorption anisotropic layer 1 disposed to be in contact with the surface of the alignment film 1 (corresponding to the first adjacent layer) was prepared by irradiating the alignment film 1 with a light emitting diode (LED) lamp (center wavelength of 365 nm) for 2 seconds under an irradiation condition of an illuminance of 200 mW/cm$^2$.

| Composition of composition C1 for forming light absorption anisotropic layer |
|---|
| Polymer liquid crystal compound L1 shown below: 4.854 parts by mass |
| Low-molecular-weight liquid crystal compound L2 shown below: 2.284 parts by mass |
| Dichroic substance Y1 shown below: 0.200 parts by mass |
| Dichroic substance M1 shown below: 0.071 parts by mass |
| Dichroic substance C1 shown below: 0.478 parts by mass |
| Polymerization initiator (IRGACURE OXE-02, manufactured by BASF SE): 0.107 parts by mass |
| Interface improver B1 shown below: 0.002 parts by mass |
| Alignment agent F1 shown below: 0.003 parts by mass |
| Tetrahydrofuran: 9.200 parts by mass |
| Cyclopentanone: 82.800 parts by mass |

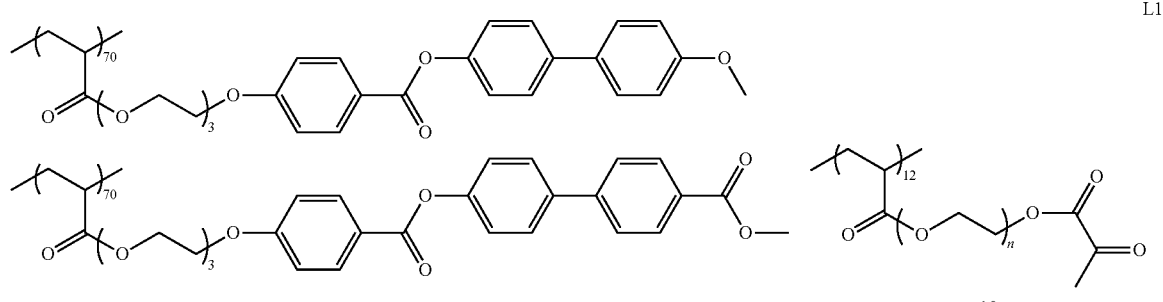

L1 n = 10

-continued

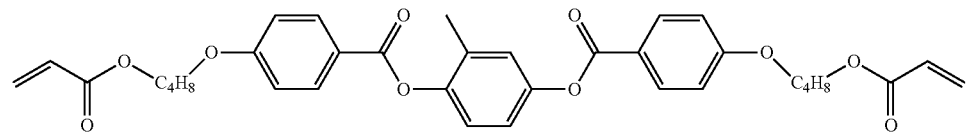
L2

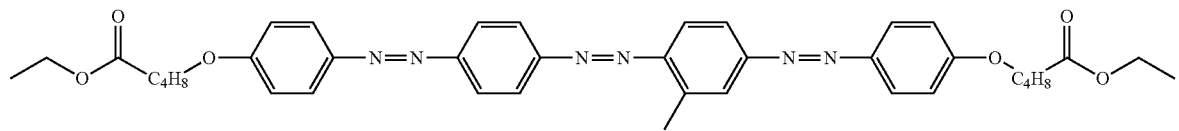
Y1

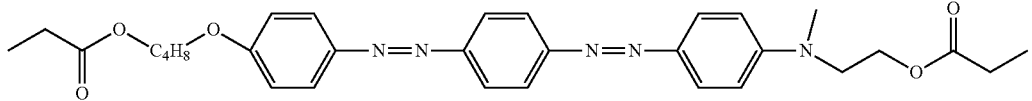
M1

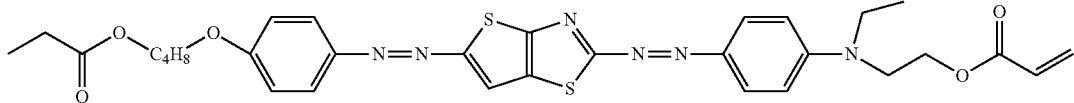
C1

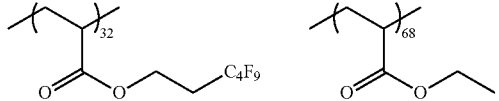
B1

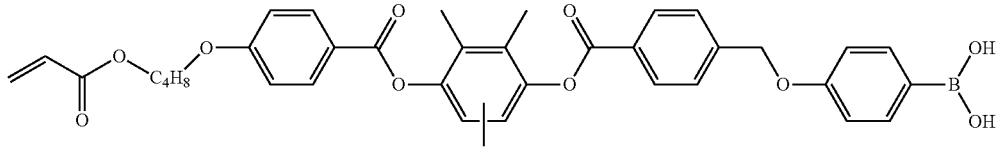
F1

Measurement of Transmittance Central Axis Angle θs

The obtained optical laminate 1 was cut to take out the light absorption anisotropic layer 1. The transmittance central axis angle θ was measured by the above-described method using the light absorption anisotropic layer 1 obtained by cutting the optical laminate.

Contrast

A cell 1 was prepared with a gap of 2 μm such that the light absorption anisotropic layer 1 was set to be inside, using the optical laminate 1 and a glass plate. A sample 1 in which the obtained cell 1 was filled with paraffin was prepared. Further, the paraffin filling the cell 1 corresponds to the second adjacent layer in contact with the light absorption anisotropic layer 1. In order to evaluate the relationship between the refractive indices in the optical laminate, a liquid was simulatively used as the second adjacent layer, the same evaluation result is obtained in a case where a solid layer having the same refractive index as that of paraffin is used. The same applies to the evaluation of the clearness described below.

The obtained sample 1 was set in JASCO V-670/ARMN-735 (manufactured by JASCO Corporation) so that the direction φ1 in which the transmittance central axis was orthogonally projected on the film surface was horizontal. The transmittance T1 was measured in a range of "θ=−75° to 75°" while the polar angle of the linearly polarized light vibrating in the horizontal direction at wavelengths of 450 nm, 550 nm, and 650 nm was changed at a pitch of 0.5°. Next, a sample 1' obtained by removing the light absorption anisotropic layer 1 from the sample 1 was prepared, the transmittance T2 was measured in the same manner as described above, the value of T1/T2 with respect to the polar angle was defined as the transmittance, and the angle θc at which the transmittance was maximized was calculated.

The transmittance Tm at θc and the transmittance T30 at an angle deviated from θc by 30° were calculated, and the contrast Cr was acquired by the following equation. The evaluation standards are as follows.

Cr=Tm/T30

A: Cr was 1.90 or greater
B: Cr was 1.70 or greater and less than 1.90
C: Cr was 1.35 or greater and less than 1.70
D: Cr was less than 1.35

Clearness

An image display device ("iPad (registered trademark) 2 WiFi model 16 GB", manufactured by Apple Inc.) was disassembled, the image display panel was disassembled, the liquid crystal cell was taken out, and the viewing side polarizing plate was peeled off from the liquid crystal cell. The sample 1 was set on the panel such that the glass was on a viewing side.

The image display device was observed in a range of a polar angle ±20° from the vicinity of a direction in which the transmittance was maximized in a state where the image was displayed on the panel. The evaluation standards are as follows.

A: The image display on the panel was clearly visually recognized.
B: Halation was slightly visually recognized from the image displayed on the panel C: Halation was visually recognized from the image displayed on the panel D: Halation was significantly visually recognized from the image displayed on the panel Refractive Index The refractive index n1 was acquired as follows. First, the average refractive index ($n_{ave}$) of the TAC film 1 with an alignment film at each wavelength of 450 nm, 550 nm, and 650 nm was acquired by Equation (R1) using a spectroscopic ellipsometer M-2000U (manufactured by J. A. Woollam. Co., Inc.). The refractive index of the TAC film was also measured and the influence was eliminated. Further, the average refractive indices ($n_{ave}$) at each wavelength were arithmetically averaged, and the obtained value was defined as the refractive index n1.

The refractive index n2 was acquired as follows. First, a cell 1' was prepared with a gap of 2 μm using two sheets of glass plates used for preparation of the optical laminate 1. Next, the average refractive index ($n_{ave}$) of the sample 1' obtained by filling the cell 1' with paraffin at each wavelength of 450 nm, 550 nm, and 650 nm was acquired by Equation (R1) using a spectroscopic ellipsometer M-2000U (manufactured by J. A. Woollam. Co., Inc.). Further, the refractive index of the glass plate was also measured and its influence was eliminated. Further, the average refractive indices (nm) at each wavelength were arithmetically averaged, and the obtained value was defined as the refractive index n2.

Further, in Examples 2 to 13 and Comparative Examples 1 and 2 described below, the refractive index n1 of the first adjacent layer was measured in the same manner as in Example 1.

Further, in Examples 2 and 9 and Comparative Examples 1 and 2 described below, the refractive index n2 of the second adjacent layer was measured in the same manner as in Example 1.

In addition, the refractive index n2 of the second adjacent layer in Examples 3 to 8 and 10 to 13 was acquired by the same method as that for the refractive index n1 except that each sample was used. Here, in the measurement of the refractive index n2 of the second adjacent layer, the refractive indices of the layers other than the second adjacent layer in each sample were measured to eliminate the influence.

Example 2

A sample 2 was prepared in the same manner as in Example 1 except that the cell was filled with toluene. Each evaluation was performed in the same manner as in Example 1 except that the sample 2 was used in place of the sample 1.

Example 3

Formation of Alignment Film

The surface of the alignment film 1 in the TAC film 1 with the alignment film of Example 1 was subjected to a rubbing treatment, continuously coated with the following composition C2 for forming a light absorption anisotropic layer using a wire bar, heated at 120° C. for 60 seconds, and cooled to room temperature (23° C.).

Next, the alignment film 1 was heated at 80° C. for 60 seconds and cooled to room temperature again.

Thereafter, a light absorption anisotropic layer 2 was formed on the surface of the alignment film 1 (corresponding to the first adjacent layer) by irradiating the alignment film with an LED lamp (center wavelength of 365 nm) for 2 seconds under an irradiation condition of an illuminance of 200 mW/cm².

Next, the surface of the light absorption anisotropic layer 2 on the apposite side of the alignment film 1 was coated with the composition 1 for forming an alignment film using a wire bar. The support on which the coating film was formed was dried with hot air at 60° C. for 60 seconds and further dried with hot air at 100° C. for 120 seconds, thereby forming an alignment film 3-2 (corresponding to the second adjacent layer). The film thickness of the alignment film 3-2 was 1 μm. In this manner, an optical laminate 3 (sample 3) was obtained.

The transmittance central axis angle θs was measured in the same manner as in Example 1 except that the light absorption anisotropic layer 2 obtained by cutting the optical laminate 3 was used. In addition, each evaluation was performed in the same manner as in Example 1 except that the sample 3 was used in place of the sample 1.

| Composition of composition C2 for forming light absorption anisotropic layer |
| --- |
| Polymer liquid crystal compound L1 shown above: 3.952 parts by mass |
| Low-molecular-weight liquid crystal compound L2 shown above: 2.470 parts by mass |
| Dichroic substance Y1 shown above: 0.387 parts by mass |
| Dichroic substance M1 shown above: 0.156 parts by mass |
| Dichroic substance C1 shown above: 0.906 parts by mass |
| Polymerization initiator (IRGACURE OXE-02, manufactured by BASF SE): 0.123 parts by mass |
| Interface improver B1 shown above: 0.003 parts by mass |
| Alignment agent F1 shown above: 0.003 parts by mass |
| Tetrahydrofuran: 9.200 parts by mass |
| Cyclopentanone: 82.800 parts by mass |

Example 4

The alignment film 1 and the light absorption anisotropic layer 2 were formed on a cellulose acylate film in the same manner as in Example 3. The surface of the light absorption anisotropic layer 2 on the apposite side of the alignment film 1 was continuously coated with the following composition 4 using a wire bar. The support on which the coating film was formed was dried with hot air at 100° C. for 60 seconds, thereby forming an adjacent layer 4-2. The film thickness of the adjacent layer 4-2 was 0.5 μm. In this manner, an optical laminate 4 (sample 4) was obtained.

The transmittance central axis angle θs was measured in the same manner as in Example 1 except that the light absorption anisotropic layer 2 obtained by cutting the optical laminate 4 was used. In addition, each evaluation was performed in the same manner as in Example 1 except that the sample 4 was used in place of the sample 1.

| Composition 4 |
| --- |
| Polymer PA1 shown below: 100.00 parts by mass |
| Acid generator PAG-1 shown below: 8.25 parts by mass |
| Stabilizer DIPEA shown below: 0.6 parts by mass |
| Methyl ethyl ketone: 250.36 parts by mass |
| Butyl acetate: 1001.42 parts by mass |

PA1

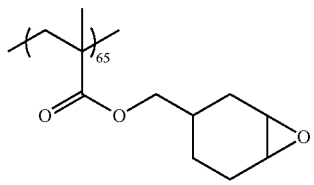

| Composition liquid 5 |
|---|
| Photo-alignment material F1 shown below: 0.3 parts by mass |
| 2-Butoxyethanol: 41.6 parts by mass |
| Dipropylene glycol monomethyl ether: 41.6 parts by mass |
| Pure water: 16.5 parts by mass |

F1

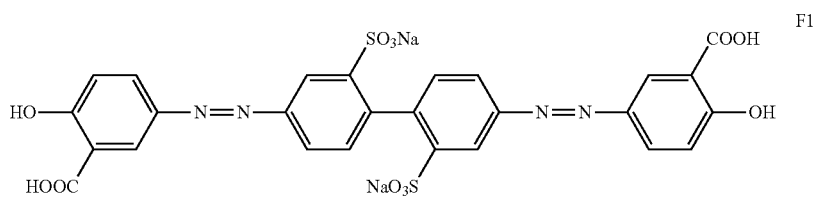

-continued

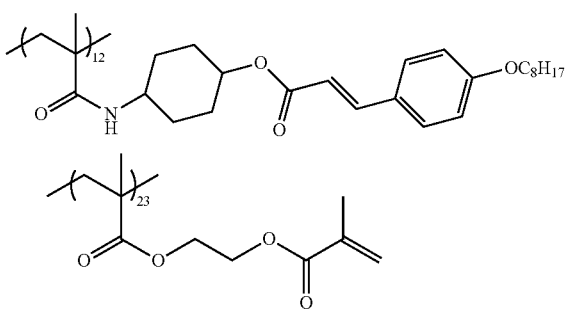

PAG-1

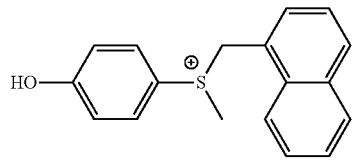

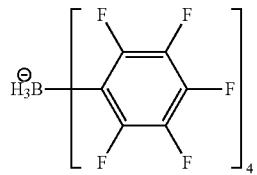

DIPEA

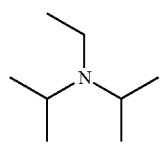

Example 5

The alignment film 1 was formed on a cellulose acylate film in the same manner as in Example 3. Thereafter, the following composition liquid 5 was prepared, dissolved for 1 hour while the liquid was stirred, and filtered through a 0.45 μm filter.

The surface of the alignment film 1 was coated with the composition liquid 5 and dried at 60° C. for 2 minutes, thereby obtaining a coating film 5. The obtained coating film 5 was irradiated with ultraviolet rays (irradiation dose of 2000 mJ/cm²) at a polar angle of 30° using an ultraviolet exposure device, thereby preparing a film 5 with a photo-alignment film 5-1 (corresponding to the first adjacent layer). The film thickness of the photo-alignment film 5-1 was 0.03 μm.

Next, the surface of the photo-alignment film 5-1 was continuously coated with the following composition C3 for forming a light absorption anisotropic layer using a wire bar, heated at 120° C. for 60 seconds, and cooled to room temperature (23° C.).

Next, the alignment film 1 was heated at 80° C. for 60 seconds and cooled to room temperature again.

Thereafter, a light absorption anisotropic layer 3 was formed on the surface of the photo-alignment film 5-1 by irradiating the photo-alignment film with an LED lamp (center wavelength of 365 nm) for 2 seconds under an irradiation condition of an illuminance of 200 mW/cm².

Next, the surface of the light absorption anisotropic layer 3 on the apposite side of the photo-alignment film 5-1 was coated with the composition 1 for forming an alignment film using a wire bar. The support on which the coating film was formed was dried with hot air at 60° C. for 60 seconds and further dried with hot air at 100° C. for 120 seconds, thereby forming an alignment film 3-2 (corresponding to the second adjacent layer). The film thickness of the alignment film 3-2 was 1 sm. In this manner, an optical laminate 5 (sample 5) was obtained.

The transmittance central axis angle θs was measured in the same manner as in Example 1 except that the light absorption anisotropic layer 3 obtained by cutting the optical laminate 5 was used. In addition, each evaluation was performed in the same manner as in Example 1 except that the sample 5 was used in place of the sample 1.

| Composition of composition C3 for forming light absorption anisotropic layer |
|---|
| Polymer liquid crystal compound 3.856 parts by mass L1 shown above: |

Composition of composition C3 for forming light absorption anisotropic layer

| | |
|---|---|
| Low-molecular-weight liquid crystal compound L2 shown above: | 2.399 parts by mass |
| Dichroic substance Y1 shown above: | 0.386 parts by mass |
| Dichroic substance M1 shown above: | 0.180 parts by mass |
| Dichroic substance C1 shown above: | 1.045 parts by mass |
| Polymerization initiator (IRGACURE OXE-02, manufactured by BASF SE): | 0.129 parts by mass |
| Interface improver B1 shown above: | 0.003 parts by mass |
| Alignment agent F1 shown above: | 0.003 parts by mass |
| Tetrahydrofuran: | 9.200 parts by mass |
| Cyclopentanone: | 82.800 parts by mass |

Example 6

The alignment film 1 was formed on a cellulose acylate film in the same manner as in Example 3, and the surface thereof was subjected to a rubbing treatment. Next, the surface of the alignment film 1 was coated with the following composition 6-1 for an adjacent layer using a wire bar, thereby preparing a coating layer 6-1.

Next, the coating layer 6-1 was heated at 120° C. for 30 seconds, and the coating layer 6-1 was cooled to room temperature (23° C.). Next, the coating layer was further heated at 80° C. for 60 seconds and cooled to room temperature again.

Thereafter, an adjacent layer 6-1 (corresponding to the first adjacent layer) was prepared on the surface of the alignment film 1 by irradiating the alignment film with an LED lamp (center wavelength of 365 nm) for one second under an irradiation condition of an illuminance of 200 mW/cm². The film thickness of the adjacent layer 6-1 was 0.60 μm.

Composition 6-1 for adjacent layer

Low-molecular-weight liquid crystal compound M-1 shown below: 95.69 parts by mass
Polymerization initiator (IRGACURE OXE-02, manufactured by BASF SE): 4.049 parts by mass
Interface improver F-1 shown below: 0.2620 parts by mass
Cyclopentanone: 660.6 parts by mass
Tetrahydrofuran: 660.6 parts by mass Low-Molecular-Weight Liquid Crystal Compound M-1

Interface Improver F-1

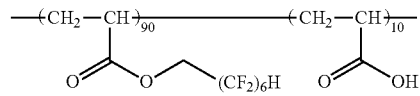

Next, the light absorption anisotropic layer 2 was formed on the adjacent layer 6-1, and the alignment film 3-2 (corresponding to the second adjacent layer) was formed on the surface of the light absorption anisotropic layer 2 on the apposite side of the adjacent layer 6-1 in the same manner as in Example 3. In this manner, an optical laminate 6 (sample 6) was obtained.

The transmittance central axis angle θs was measured in the same manner as in Example 1 except that the light absorption anisotropic layer 2 obtained by cutting the optical laminate 6 was used. In addition, each evaluation was performed in the same manner as in Example 1 except that the sample 6 was used in place of the sample 1.

Example 7

The alignment film 1 (corresponding to the first adjacent layer) and the light absorption anisotropic layer 2 were formed on a cellulose acylate film in the same manner as in Example 3. The surface of the light absorption anisotropic layer 2 on the apposite side of the alignment film 1 was coated with a UV curing type adhesive ARONIX UVX-5457 (manufactured by Toagosei Co., Ltd.) and irradiated with ultraviolet rays (irradiation dose of 1000 mJ/cm²) using an ultraviolet exposure device, thereby forming an adhesive layer. The film thickness of the adhesive layer (corresponding to the second adjacent layer) was 2 μm. In this manner, an optical laminate 7 (sample 7) was obtained.

The transmittance central axis angle θs was measured in the same manner as in Example 1 except that the light absorption anisotropic layer 2 obtained by cutting the optical laminate 7 was used. In addition, each evaluation was performed in the same manner as in Example 1 except that the sample 7 was used in place of the sample 1.

Example 8

An optical laminate 8 (sample 8) was obtained in the same manner as in Example 3 except that the light absorption anisotropic layer 4 formed of the following composition C4 for forming a light absorption anisotropic layer was used in

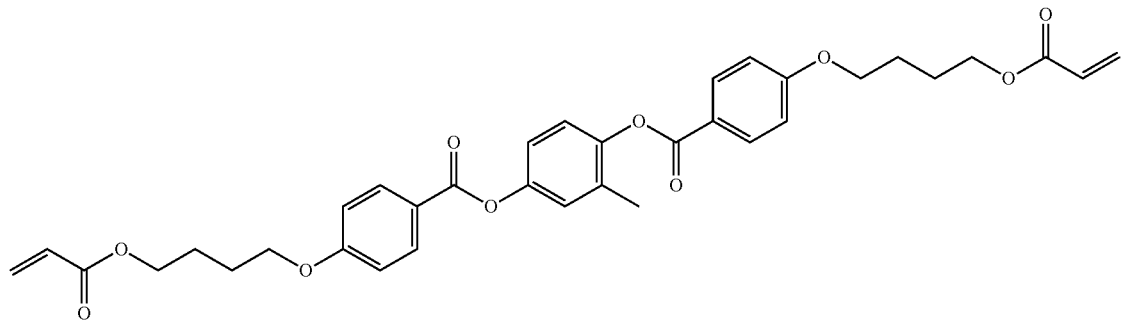 [SMILES: C=CC(=O)OCCCCOc1ccc(C(=O)Oc2ccc(OC(=O)c3ccc(OCCCCOC(=O)C=C)cc3)c(C)c2)cc1]

place of the light absorption anisotropic layer 2 formed of the composition C2 for forming a light absorption anisotropic layer.

The transmittance central axis angle θs was measured in the same manner as in Example 1 except that the light absorption anisotropic layer 4 obtained by cutting the optical laminate 8 was used. In addition, each evaluation was performed in the same manner as in Example 1 except that the sample 8 was used in place of the sample 1.

| Composition of composition C4 for forming light absorption anisotropic layer |
| --- |
| Polymer liquid crystal compound L1 shown above: 5.073 parts by mass<br>Low-molecular-weight liquid crystal compound L2 shown above: 2.097 parts by mass<br>Dichroic substance Y1 shown above: 0.169 parts by mass<br>Dichroic substance M1 shown above: 0.095 parts by mass<br>Dichroic substance C1 shown above: 0.460 parts by mass<br>Polymerization initiator (IRGACURE OXE-02, manufactured by BASF SE): 0.101 parts by mass<br>Interface improver B1 shown above: 0.002 parts by mass<br>Alignment agent F1 shown above: 0.002 parts by mass<br>Tetrahydrofuran: 9.200 parts by mass<br>Cyclopentanone: 82.800 parts by mass |

Example 9

A sample 9 was prepared in the same manner as in Example 2 except that the light absorption anisotropic layer 9 formed of the following composition C9 for forming a light absorption anisotropic layer was used in place of the light absorption anisotropic layer 1 formed of the composition C1 for forming a light absorption anisotropic layer. In addition, each evaluation was performed in the same manner as in Example 1 except that the sample 9 was used in place of the sample 1.

| Composition of composition C9 for forming light absorption anisotropic layer |
| --- |
| Polymer liquid crystal compound L1 shown above: 4.783 parts by mass<br>Low-molecular-weight liquid crystal compound L2 shown above: 2.356 parts by mass<br>Dichroic substance Y1 shown above: 0.200 parts by mass<br>Dichroic substance M1 shown above: 0.071 parts by mass<br>Dichroic substance C1 shown above: 0.478 parts by mass<br>Polymerization initiator (IRGACURE OXE-02, manufactured by BASF SE): 0.107 parts by mass<br>Interface improver B1 shown above: 0.002 parts by mass<br>Alignment agent F1 shown above: 0.002 parts by mass<br>Tetrahydrofuran: 9.200 parts by mass<br>Cyclopentanone: 82.800 parts by mass |

Example 10

An optical laminate 10 (sample 10) was prepared in the same manner as in Example 3 except that the light absorption anisotropic layer 10 formed of the following composition C10 for forming a light absorption anisotropic layer was used in place of the light absorption anisotropic layer 2 formed of the composition C2 for forming a light absorption anisotropic layer.

The transmittance central axis angle θs was measured in the same manner as in Example 1 except that the light absorption anisotropic layer 10 obtained by cutting the optical laminate 10 was used. In addition, each evaluation was performed in the same manner as in Example 1 except that the sample 10 was used in place of the sample 1.

| Composition of composition C10 for forming light absorption anisotropic layer |
| --- |
| Polymer liquid crystal compound L1 shown above: 3.949 parts by mass<br>Low-molecular-weight liquid crystal compound L2 shown above: 2.468 parts by mass<br>Dichroic substance Y1 shown above: 0.387 parts by mass<br>Dichroic substance M1 shown above: 0.156 parts by mass<br>Dichroic substance C1 shown above: 0.905 parts by mass<br>Polymerization initiator (IRGACURE OXE-02, manufactured by BASF SE): 0.123 parts by mass<br>Interface improver B1 shown above: 0.002 parts by mass<br>Interface improver F-1 shown above: 0.001 parts by mass<br>Alignment agent F1 shown above: 0.008 parts by mass<br>Tetrahydrofuran: 9.200 parts by mass<br>Cyclopentanone: 82.800 parts by mass |

Example 11

An optical laminate 11 (sample 11) was prepared in the same manner as in Example 3 except that the light absorption anisotropic layer 11 formed of the following composition C11 for forming a light absorption anisotropic layer was used in place of the light absorption anisotropic layer 2 formed of the composition C2 for forming a light absorption anisotropic layer.

The transmittance central axis angle θs was measured in the same manner as in Example 1 except that the light absorption anisotropic layer 11 obtained by cutting the optical laminate 11 was used. In addition, each evaluation was performed in the same manner as in Example 1 except that the sample 11 was used in place of the sample 1.

| Composition of composition C11 for forming light absorption anisotropic layer |
| --- |
| Polymer liquid crystal compound L1 shown above: 3.951 parts by mass<br>Low-molecular-weight liquid crystal compound L2 shown above: 2.470 parts by mass<br>Dichroic substance Y1 shown above: 0.387 parts by mass<br>Dichroic substance M1 shown above: 0.156 parts by mass<br>Dichroic substance C1 shown above: 0.906 parts by mass<br>Polymerization initiator (IRGACURE OXE-02, manufactured by BASF SE): 0.123 parts by mass<br>Interface improver B1 shown above: 0.003 parts by mass<br>Alignment agent F1 shown above: 0.004 parts by mass<br>Tetrahydrofuran: 9.200 parts by mass<br>Cyclopentanone: 82.800 parts by mass |

Example 12

An optical laminate 12 (sample 12) was prepared in the same manner as in Example 3 except that the light absorption anisotropic layer 12 formed of the following composition C12 for forming a light absorption anisotropic layer was used in place of the light absorption anisotropic layer 2 formed of the composition C2 for forming a light absorption anisotropic layer.

The transmittance central axis angle θs was measured in the same manner as in Example 1 except that the light absorption anisotropic layer 12 obtained by cutting the optical laminate 12 was used. In addition, each evaluation was performed in the same manner as in Example 1 except that the sample 12 was used in place of the sample 1.

| Composition of composition C12 for forming light absorption anisotropic layer |
| --- |
| Low-molecular-weight liquid crystal compound L3 shown below: 4.191 parts by mass |
| Low-molecular-weight liquid crystal compound L4 shown below: 2.257 parts by mass |
| Dichroic substance Y1 shown above: 0.387 parts by mass |
| Dichroic substance M1 shown above: 0.161 parts by mass |
| Dichroic substance C1 shown above: 0.878 parts by mass |

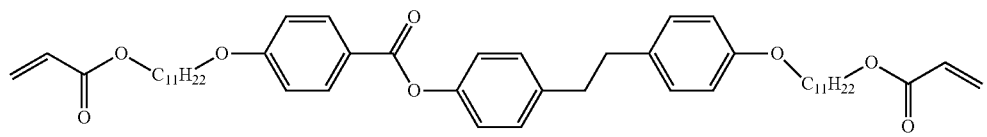

L3

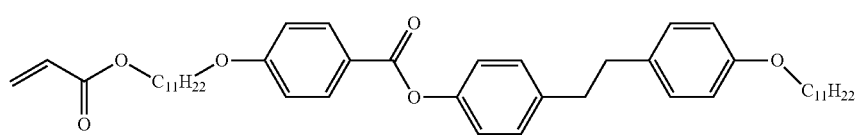

L4

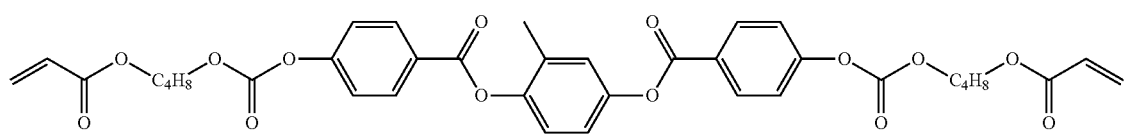

L5

| Composition of composition C12 for forming light absorption anisotropic layer (-continued) |
| --- |
| Polymerization initiator (IRGACURE OXE-02, manufactured by BASF SE): 0.121 parts by mass |
| Interface improver B1 shown above: 0.003 parts by mass |
| Alignment agent F1 shown above: 0.002 parts by mass |
| Tetrahydrofuran: 9.200 parts by mass |
| Cyclopentanone: 82.800 parts by mass |

Example 13

An optical laminate 13 (sample 13) was prepared in the same manner as in Example 3 except that the light absorption anisotropic layer 13 formed of the following composition C13 for forming a light absorption anisotropic layer was used in place of the light absorption anisotropic layer 2 formed of the composition C2 for forming a light absorption anisotropic layer.

The transmittance central axis angle θs was measured in the same manner as in Example 1 except that the light absorption anisotropic layer 13 obtained by cutting the optical laminate 13 was used. In addition, each evaluation was performed in the same manner as in Example 1 except that the sample 13 was used in place of the sample 1.

| Composition of composition C13 for forming light absorption anisotropic layer |
| --- |
| Low-molecular-weight liquid crystal compound L2 shown below: 4.191 parts by mass |
| Low-molecular-weight liquid crystal compound L5 shown below: 2.256 parts by mass |
| Dichroic substance Y1 shown above: 0.387 parts by mass |
| Dichroic substance M1 shown above: 0.161 parts by mass |
| Dichroic substance C1 shown above: 0.878 parts by mass |
| Polymerization initiator (IRGACURE OXE-02, manufactured by BASF SE): 0.121 parts by mass |
| Interface improver B1 shown above: 0.003 parts by mass |
| Alignment agent F1 shown above: 0.003 parts by mass |
| Tetrahydrofuran: 9.200 parts by mass |
| Cyclopentanone: 82.800 parts by mass |

Comparative Example 1

A sample H1 was prepared in the same manner as in Example 1 except that the cell was filled with pure water. In addition, each evaluation was performed in the same manner as in Example 1 except that the sample H1 was used in place of the sample 1.

Comparative Example 2

A sample H2 was prepared in the same manner as in Example 1 except that the light absorption anisotropic layer 5 formed of the following composition C5 for forming a light absorption anisotropic layer was used in place of the light absorption anisotropic layer 1.

The transmittance central axis angle θs was measured in the same manner as in Example 1 except that the light absorption anisotropic layer 5 obtained by cutting the sample H2 was used. In addition, each evaluation was performed in the same manner as in Example 1 except that the sample H2 was used in place of the sample 1.

| Composition of composition C5 for forming light absorption anisotropic layer |
| --- |
| Polymer liquid crystal compound L1 shown above: 5.012 parts by mass |
| Low-molecular-weight liquid crystal compound L2 shown above: 2.387 parts by mass |
| Dichroic substance Y1 shown above: 0.173 parts by mass |
| Dichroic substance M1 shown above: 0.054 parts by mass |
| Dichroic substance C1 shown above: 0.280 parts by mass |

-continued

Composition of composition C5 for forming light
absorption anisotropic layer

Polymerization initiator (IRGACURE OXE-02,
manufactured by BASF SE): 0.090 parts by mass
Interface improver B1 shown above: 0.002 parts by mass
Alignment agent F1 shown above: 0.002 parts by mass
Tetrahydrofuran: 9.200 parts by mass
Cyclopentanone: 82.800 parts by mass The evaluation results are listed in Table 1.

In the table, the coloring agent concentration denotes the content (% by mass) of the dichroic substance with respect to the total solid content mass of the composition for forming a light absorption anisotropic layer (liquid crystal composition). Further, in the table, θs/n1 denotes the ratio of the transmittance central axis angle θs to the refractive index n1, and θs/n2 denotes the ratio of the transmittance central axis angle θs to the refractive index n2.

Based on the comparison between Example 2 and Example 9, it was found that an image with more excellent clearness was able to be visually recognized in a case where both the value of n1/θs and the value of n2/θs were 0.037 or greater (Example 2). Based on the comparison between Examples 3, 10, and 11, it was found that an image with more excellent clearness was able to be visually recognized in a case where both the value of n1/θs and the value of n2/θs were 0.083 or less (Examples 3 and 11).

EXPLANATION OF REFERENCES

1: light absorption anisotropic layer
10: dichroic substance
A, B, C, D: polarized light

What is claimed is:

1. An optical laminate comprising:
    a light absorption anisotropic layer formed of a liquid crystal composition containing a liquid crystal compound and a dichroic substance;

TABLE 1

| | Light absorption anisotropic layer | | | First adjacent layer | | | Second adjacent layer | | | Evaluation result | |
|---|---|---|---|---|---|---|---|---|---|---|---|
| | Coloring agent | | | | Refractive index | | | Refractive index | | | |
| | Type | concentration | θs | Type | n1 | n1/θs | Type | n2 | n2/θs | Cr | Clearness |
| Example 1 | 1 | 9% | 30 | Alignment film 1 | 1.51 | 0.050 | Paraffin | 1.47 | 0.049 | C | C |
| Example 2 | 1 | 9% | 30 | Alignment film 1 | 1.51 | 0.050 | Toluene | 1.50 | 0.050 | C | B |
| Example 3 | 2 | 18% | 30 | Alignment film 1 | 1.51 | 0.050 | Alignment film 3-2 | 1.51 | 0.050 | A | A |
| Example 4 | 2 | 18% | 32 | Alignment film 1 | 1.51 | 0.047 | Adjacent layer 4-2 | 1.52 | 0.048 | A | A |
| Example 5 | 3 | 20% | 31 | Photo-alignment film 5-1 | 1.72 | 0.055 | Alignment film 3-2 | 1.51 | 0.049 | A | B |
| Example 6 | 2 | 18% | 29 | Adjacent layer 6-1 | 1.58 | 0.054 | Alignment film 3-2 | 1.51 | 0.052 | A | B |
| Example 7 | 2 | 18% | 30 | Alignment film 1 | 1.51 | 0.050 | Adhesive layer | 1.49 | 0.050 | A | A |
| Example 8 | 4 | 9% | 30 | Alignment film 1 | 1.51 | 0.050 | Alignment film 3-2 | 1.51 | 0.050 | C | A |
| Example 9 | 9 | 9% | 45 | Alignment film 1 | 1.51 | 0.034 | Toluene | 1.50 | 0.033 | C | C |
| Example 10 | 10 | 18% | 15 | Alignment film 1 | 1.51 | 0.101 | Alignment film 3-2 | 1.51 | 0.101 | A | C |
| Example 11 | 11 | 18% | 20 | Alignment film 1 | 1.51 | 0.076 | Alignment film 3-2 | 1.51 | 0.076 | A | A |
| Example 12 | 12 | 18% | 30 | Alignment film 1 | 1.51 | 0.050 | Alignment film 3-2 | 1.51 | 0.050 | B | A |
| Example 13 | 13 | 18% | 30 | Alignment film 1 | 1.51 | 0.050 | Alignment film 3-2 | 1.51 | 0.050 | C | A |
| Comparative Example 1 | 2 | 18% | 30 | Alignment film 1 | 1.51 | 0.050 | Pure water | 1.33 | 0.044 | C | D |
| Comparative Example 2 | 5 | 6% | 30 | Alignment film 1 | 1.51 | 0.050 | Paraffin | 1.47 | 0.049 | D | B |

As listed in Table 1, in a case where the optical laminates of Examples 1 to 13 according to the present invention were used, it was found that an image with an excellent contrast and excellent clearness was able to visually recognized, as compared with Comparative Examples 1 and 2.

Based on the comparison between Example 1 and Example 2, it was found that an image with more excellent clearness was able to be visually recognized in a case where both the refractive index n1 and the refractive index n2 were in a range of 1.50 to 1.65.

Based on the comparison between Example 3 and Example 8, it was found that an image with a more excellent contrast was able to be visually recognized in a case where the concentration of the dichroic substance was 10.0% by mass or greater with respect to the total solid content mass of the liquid crystal composition.

a first adjacent layer disposed in contact with one surface of the light absorption anisotropic layer; and
    a second adjacent layer disposed in contact with a surface of the light absorption anisotropic layer opposite to the one surface,
    wherein a content of the dichroic substance is 13.0% by mass or greater with respect to a total mass of a solid content of the liquid crystal composition,
    an angle θs between a transmittance central axis of the light absorption anisotropic layer and a surface of the light absorption anisotropic layer in a normal direction is in a range of 5° to 60°,
    both a refractive index n1 of the first adjacent layer and a refractive index n2 of the second adjacent layer are in a range of 1.46 to 1.72, at least one of the first adjacent layer and the second adjacent layer is an alignment film, the liquid crystal compound is a polymer liquid crystal compound, the weight-average molecular weight of the polymer liquid crystal compound is in a range of 1000 to 500000, the liquid crystal composition further contains an alignment agent, and the alignment agent is an onium compound or a boronic acid compound.

2. The optical laminate according to claim 1, wherein a relationship between the angle θs and the refractive index n1 and the refractive index n2 satisfies Expression (N1) and Expression (N2), $$0.037 \leq n1/\theta s \leq 0.083 \quad (N1)$$

$$0.037 \leq n2/\theta s \leq 0.083 \quad (N2).$$

3. The optical laminate according to claim 2, wherein at least one of the refractive index n1 or the refractive index n2 is in a range of 1.50 to 1.65.

4. The optical laminate according to claim 2, wherein both the refractive index n1 and the refractive index n2 are in a range of 1.50 to 1.65.

5. The optical laminate according to claim 2, wherein an absolute value of a difference between the refractive index n1 and the refractive index n2 is 0.21 or less.

6. The optical laminate according to claim 1, wherein at least one of the refractive index n1 or the refractive index n2 is in a range of 1.50 to 1.65.

7. The optical laminate according to claim 6, wherein both the refractive index n1 and the refractive index n2 are in a range of 1.50 to 1.65.

8. The optical laminate according to claim 6, wherein an absolute value of a difference between the refractive index n1 and the refractive index n2 is 0.21 or less.

9. The optical laminate according to claim 1, wherein both the refractive index n1 and the refractive index n2 are in a range of 1.50 to 1.65.

10. The optical laminate according to claim 9, wherein an absolute value of a difference between the refractive index n1 and the refractive index n2 is 0.21 or less.

11. The optical laminate according to claim 1, wherein an absolute value of a difference between the refractive index n1 and the refractive index n2 is 0.21 or less.

12. The optical laminate according to claim 1, wherein at least one of the first adjacent layer or the second adjacent layer contains polyvinyl alcohol, polyimide, or a derivative thereof.

13. A viewing angle control system comprising:
a polarizer having an absorption axis in an in-plane direction; and
the optical laminate according to claim 1.

14. An image display device comprising:
a display element; and
the viewing angle control system according to claim 13,
wherein the viewing angle control system is disposed on at least one main surface of the display element.

15. The image display device according to claim 14, wherein the optical laminate of the viewing angle control system is disposed on a viewing side with respect to the polarizer of the viewing angle control system.

16. An optical laminate comprising:
a light absorption anisotropic layer formed of a liquid crystal composition containing a liquid crystal compound and a dichroic substance;
a first adjacent layer disposed in contact with one surface of the light absorption anisotropic layer; and
a second adjacent layer disposed in contact with a surface of the light absorption anisotropic layer opposite to the one surface,
wherein a content of the dichroic substance is 7.0% by mass or greater with respect to a total mass of a solid content of the liquid crystal composition,
the liquid crystal compound is a polymer liquid crystal compound,
the weight-average molecular weight of the polymer liquid crystal compound is in a range of 1000 to 500000,
the liquid crystal composition further contains an alignment agent,
the alignment agent is an onium compound or a boronic acid compound,
an angle θs between a transmittance central axis of the light absorption anisotropic layer and a surface of the light absorption anisotropic layer in a normal direction is in a range of 5° to 60°,
at least one of the first adjacent layer and the second adjacent layer is an alignment film,
both a refractive index n1 of the first adjacent layer and a refractive index n2 of the second adjacent layer are in a range of 1.46 to 1.72, and
wherein a relationship between the angle θs and the refractive index n1 and the refractive index n2 satisfies Expression (N1) and Expression (N2), $$0.037 \leq n1/\theta s \leq 0.083 \quad (N1)$$

$$0.037 \leq n2/\theta s \leq 0.083 \quad (N2).$$

* * * * *